(12) United States Patent
Horiguchi et al.

(10) Patent No.: US 10,655,066 B2
(45) Date of Patent: May 19, 2020

(54) OPTICAL ISOMER

(71) Applicant: DIC Corporation, Tokyo (JP)

(72) Inventors: Masahiro Horiguchi, Saitama (JP); Sayaka Nose, Saitama (JP); Yasuhiro Kuwana, Saitama (JP); Kouichi Endo, Saitama (JP)

(73) Assignee: DIC Corporation, Tokyo (JP)

( * ) Notice: Subject to any disclaimer, the term of this patent is extended or adjusted under 35 U.S.C. 154(b) by 189 days.

(21) Appl. No.: 15/668,235

(22) Filed: Aug. 3, 2017

(65) Prior Publication Data

US 2018/0037819 A1 Feb. 8, 2018

(30) Foreign Application Priority Data

Aug. 3, 2016 (JP) ................................ 2016-152889
Jun. 8, 2017 (JP) ................................ 2017-113403

(51) Int. Cl.
*C09K 19/38* (2006.01)
*C08J 5/18* (2006.01)
*C09K 19/54* (2006.01)
*C09K 19/04* (2006.01)

(52) U.S. Cl.
CPC ............. *C09K 19/3857* (2013.01); *C08J 5/18* (2013.01); *C09K 19/3804* (2013.01); *C09K 19/3852* (2013.01); *C09K 19/54* (2013.01); *C08J 2335/02* (2013.01); *C09K 2019/0444* (2013.01); *C09K 2019/0448* (2013.01); *C09K 2219/03* (2013.01); *Y10T 428/10* (2015.01); *Y10T 428/105* (2015.01); *Y10T 428/1036* (2015.01)

(58) Field of Classification Search
CPC  C09K 19/3857; C09K 19/3852; C09K 19/54; C09K 19/3804; C09K 2019/0448; C09K 2019/0444; C09K 2219/03; C09J 5/18; C09J 235/02; Y10T 428/10; Y10T 428/1036; Y10T 428/105
USPC .......... 428/1.1, 1.3, 1.33; 427/162; 548/161; 549/32; 349/117
See application file for complete search history.

(56) References Cited

U.S. PATENT DOCUMENTS

2016/0108315 A1\* 4/2016 Matsuyama ....... C09K 19/3491
428/421
2017/0190821 A1\* 7/2017 Katoh .................... C08G 63/47

FOREIGN PATENT DOCUMENTS

WO 2005/054406 A1 6/2005
WO 2016/047648 A1 3/2016

\* cited by examiner

*Primary Examiner* — Ruiyun Zhang
(74) *Attorney, Agent, or Firm* — McDermott Will & Emery LLP

(57) ABSTRACT

The problem that the present invention is to solve is to provide an optical film that has less alignment defects and is less liable to cause variation in the optical characteristics when placed in a high temperature state. The present invention provides an optical film containing a structural unit derived from a specific compound, that is, an optical film containing a structural unit derived from a compound represented by the general formula (I), which has less alignment defects and is less liable to cause variation in the optical characteristics when placed in a high temperature state, and also provides a display device including the optical film.

8 Claims, No Drawings

OPTICAL ISOMER

TECHNICAL FIELD

The present invention relates to an optical film and a display device including the optical film.

BACKGROUND ART

Compounds (polymerizable compounds) having polymerizable groups are used as a raw material of various films. For example, a polymerizable composition containing a polymerizable compound is aligned in a liquid crystalline state and then polymerized, whereby a film-like polymer having a uniform alignment can be produced. A film produced in this manner can be used for a polarizing plate, a retardation film, and the like which are required in a display. In many cases, for satisfying the demanded optical characteristics, polymerization rate, solubility, melting point, glass transition temperature, film transparency, mechanical strength, surface hardness, heat resistance, and light resistance, a polymerizable composition containing two or more polymerizable compounds is used. In this case, the polymerizable compounds used are required to provide good physical properties to the polymerizable composition without any adverse effect on the other characteristics. In addition, by adding a chiral compound to such a polymerizable composition, aligning the polymerizable composition in a cholesteric liquid crystal state, and then polymerizing the composition, a film having a cholesteric structure can be produced. When production of a film having a cholesteric structure is intended, a polymerizable compound that can exist as a liquid crystal phase in a wide range of the temperature and has a high cholesteric alignment is required. When the polymerizable crystal liquid composition is used industrially, high storage stability is demanded so that the polymerizable compound in the components does not precipitate even when the composition is stored for a long period of time.

When a film having the cholesteric structure is used as an optical film in a display device or the like, it is required to have less alignment defects and to show small variation in selective reflection wavelength when placed in a high temperature state. However, when a polymerizable cholesteric liquid crystal composition is prepared to produce a film using a conventionally known material, there arise problems in that alignment defects are generated and the selective reflection wavelength greatly varies in storing the film at high temperature (PTL 1 and PTL 2). When such a film in which alignment defects are easily generated and the selective reflection wavelength is liable to vary is used, for example, in a display, there are problems in that the brightness of the screen becomes non-uniform, the color becomes unnatural, and intended optical characteristics become not achieved, after long term use, resulting in great deterioration in quality of a display product.

In addition, a retardation film which is used for optical compensation of a display and the like is intended to have less alignment defects and to show small variation in the phase difference when placed in a high temperature state. However, when a polymerizable liquid crystal composition is prepared to produce a film using a conventionally known material, there arise problems in that alignment defects are generated and the phase difference greatly varies in storing the film at high temperature (PTL 1 and PTL 2).

CITATION LIST

Patent Literature

[PTL 1] WO2005/054406A1
[PTL 2] WO2016/047648A1

SUMMARY OF INVENTION

Technical Problem

An object of the present invention is to provide an optical film which has less alignment defects and is less likely to cause variation in the optical characteristics when placed in a high temperature state.

Solution to Problem

As a result of intensive and extensive studies to solve the above problems, the present inventors have developed an optical film which contains a structural unit derived from a specific compound. Specifically, the present invention provides an optical film containing a structural unit derived from a compound represented by the general formula (I), and also provides a display device including the optical film.

Advantageous Effects of Invention

Since the optical film of the present invention has less alignment defects and is less likely to cause variation in the optical characteristics when placed in a high temperature state, the optical film is useful as a retardation film, a selective reflection film, and the like for use in a display device.

DESCRIPTION OF EMBODIMENTS

The present invention provides an optical film containing a structural unit derived from a specific compound, and also provide a display device including the optical film.

The optical film of the present invention contains a structural unit derived from a compound represented by the following general formula (I):

[Chem. 1]

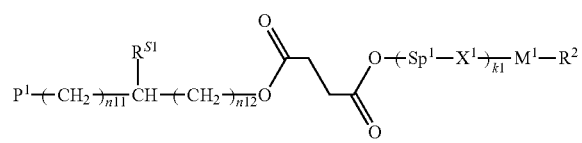

(I)

(wherein, $P^1$ represents a group selected from the following formulae (P-1) to (P-20):

[Chem. 2]

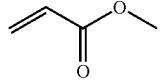

(P-1)

(P-2) 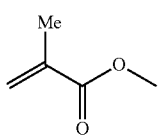

(P-3) 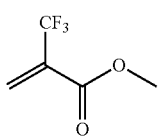

(P-4) 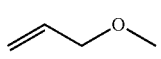

(P-5) 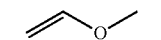

(P-6) 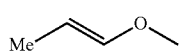

(P-7) 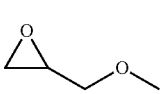

(P-8) 

(P-9) 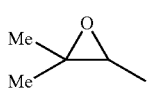

(P-10) 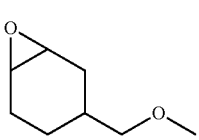

(P-11) 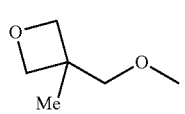

(P-12) 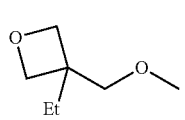

(P-13) 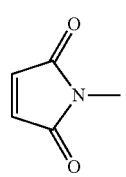

(P-14) 

(P-15) HS—

(P-16) 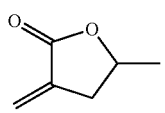

(P-17) 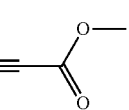

(P-18) 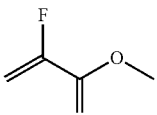

(P-19) 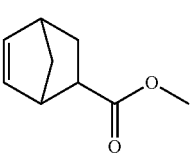

(P-20) 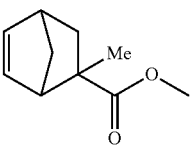

$R^{S1}$ represents a linear or branched alkyl group having 1 to 20 carbon atoms in which one —$CH_2$— group or two or more —$CH_2$— groups that are not adjacent to each other each may be independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C— and one or more of arbitrary hydrogen atoms in the alkyl group may be substituted by a fluorine atom or a chlorine atom, $Sp^1$ represents an alkylene group having 1 to 20 carbon atoms, wherein plural $Sp^1$ groups, if present, may be the same or different, $X^1$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, —C≡C—, or a single bond, wherein plural $X^1$ groups, if present, may be the same or different, k1 represents an integer of 0 to 10, n11 and n12 each independently represent an integer of 0 to 8, and $R^2$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one or more of arbitrary hydrogen atoms in the group may be substituted by a fluorine atom and one —$CH_2$— group or two or more —$CH_2$— groups that are not adjacent to each other each may be independently substituted by —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—N=CH—, —CF=CF—, or —C≡C—, or $R^2$ represents a group represented by the following formula (I-R2):

[Chem. 3]

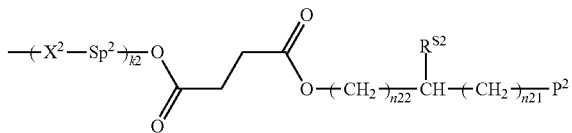

(I-R2)

(wherein, $P^2$ represents a group selected from the formulae (P-1) to (P-20) mentioned above, $R^{S2}$ represents a linear or branched alkyl group having 1 to 20 carbon atoms in which one —CH₂— group or two or more —CH₂— groups that are not adjacent to each other each may be independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C— and one or more of arbitrary hydrogen atoms in the alkyl group may be substituted by a fluorine atom or a chlorine atom, $Sp^2$ represents an alkylene group having 1 to 20 carbon atoms, wherein plural $Sp^2$ groups, if present, may be the same or different, $X^2$ represents —O—, —S—, —OCH₂—, —CH₂O—, —CO—, —COO—, —OCO—, —CO—S—, —S—CO—, —O—CO—O—, —CO—NH—, —NH—CO—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—N=CH—, —CF=CF—, —C≡C—, or a single bond, wherein plural $X^2$ groups, if present, may be the same or different, k2 represents an integer of 0 to 10, and n21 and n22 each independently represent an integer of 0 to 8), provided that the general formula (I) contains no —O—O-bond.

In the general formula (I), $P^1$, and $P^2$ if present, represent a group selected from the formulae (P-1) to (P-20), and particularly when ultraviolet polymerization is adopted as a polymerization method, the formula (P-1), (P-2), (P-3), (P-4), (P-5), (P-7), (P-11), (P-13), (P-15), or (P-18) is preferred, the formula (P-1), (P-2), (P-3), (P-8), (P-11), or (P-13) is more preferred, the formula (P-1), (P-2), or (P-3) is further preferred, and the formula (P-1) or (P-2) is especially preferred.

In the general formula (I), $R^{S1}$ represents a linear or branched alkyl group having 1 to 20 carbon atoms in which one or more of arbitrary hydrogen atoms in the group may be substituted by a fluorine atom or a chlorine atom and one —CH₂— group or two or more —CH₂— groups that are not adjacent to each other each may be independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—. From the viewpoints of the material availability, the easiness of synthesis, the liquid crystal property, the less alignment defects, and the stability of optical characteristics, $R^{S1}$ preferably represents a linear or branched alkyl group having 1 to 20 carbon atoms in which one or more of arbitrary hydrogen atoms in the group may be substituted by a fluorine atom or a chlorine atom and one —CH₂— group or two or more —CH₂— groups that are not adjacent to each other each may be independently substituted by —O—, —CO—, —COO—, —OCO—, or —O—CO—O—, $R^{S1}$ more preferably represents a linear or branched alkyl group having 1 to 10 carbon atoms in which one or more of arbitrary hydrogen atoms in the group may be substituted by a fluorine atom and one —CH₂— group or two or more —CH₂— groups that are not adjacent to each other each may be independently substituted by —O—, —CO—, —COO—, or —OCO—, $R^{S1}$ further preferably represents a linear alkyl group having 1 to 10 carbon atoms in which one or more of arbitrary hydrogen atoms in the group may be substituted by a fluorine atom and one —CH₂— group or two or more —CH₂— groups that are not adjacent to each other each may be independently substituted by —O—, $R^{S1}$ furthermore preferably represents a linear alkyl group having 1 to 3 carbon atoms, and $R^{S1}$ especially preferably represents a methyl group.

In the general formula (I), $Sp^1$ represents an alkylene group having 1 to 20 carbon atoms, wherein plural $Sp^1$ groups, if present, may be the same or different. From the viewpoints of the liquid crystal property, the material availability, and the easiness of synthesis, plural $Sp^1$ groups, if present, may be the same or different, and each preferably represent an alkylene group having 2 to 12 carbon atoms, more preferably represent an alkylene group having 2 to 10 carbon atoms, further preferably represent an alkylene group having 2 to 8 carbon atoms, furthermore preferably represent an alkylene group having 2 to 6 carbon atoms, and especially preferably represent an alkylene group having 2 carbon atoms.

In the general formula (I), $X^1$ represents —O—, —S—, —OCH₂—, —CH₂O—, —CO—, —COO—, —OCO—, —CO—S—, —S—CO—, —O—CO—O—, —CO—NH—, —NH—CO—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—N=CH—, —CF=CF—, —C≡C—, or a single bond, wherein plural $X^1$ groups, if present, may be the same or different. From the viewpoints of the material availability and the easiness of synthesis, $X^1$ groups, if present, may be the same or different, and each preferably represent —O—, —S—, —OCH₂—, —CH₂O—, —COO—, —OCO—, —CO—S—, —S—CO—, —O—CO—O—, —CO—NH—, —NH—CO—, —COO—CH₂CH₂—, —OCO—CH₂CH₂—, —CH₂CH₂—COO—, —CH₂CH₂—OCO—, or a single bond, more preferably represent —O—, —OCH₂—, —CH₂O—, —COO—, —OCO—, —COO—CH₂CH₂—, —OCO—CH₂CH₂—, —CH₂CH₂—COO—, —CH₂CH₂—OCO—, or a single bond, further preferably represent —O—, —COO—, —OCO—, or a single bond, furthermore preferably represent —O— or a single bond, and especially preferably represent a single bond.

In the general formula (I), k1 represents an integer of 0 to 10, and from the viewpoint of the easiness of synthesis and the liquid crystal property, preferably represents an integer of 0 to 5, more preferably represents an integer of 0 to 2, further preferably represents 0 or 1, and from the viewpoint of the small shrinkage on curing, especially preferably represents 1.

In the general formula (I), n11 and n12 each independently represent an integer of 0 to 8, and from the viewpoints of the material availability, the easiness of synthesis, the liquid crystal property, the less alignment defects, and the stability of optical characteristics, preferably each independently represent an integer of 0 to 6, more preferably each independently represent an integer of 0 to 4, further preferably each independently represent an integer of 0 to 2, and especially preferably each independently represent 0 or 1. Furthermore, in the case of giving weight on the storage stability when added to the polymerizable composition, n11 and n12 preferably represent different integers.

In the general formula (I), $R^2$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one or more of arbitrary hydrogen atoms in the group may be substituted by a fluorine atom and one —$CH_2$— group or two or more —$CH_2$— groups that are not adjacent to each other each may be independently substituted by —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, or —C≡C—, or $R^2$ represents a group represented by the following formula (I-R2):

[Chem. 4]

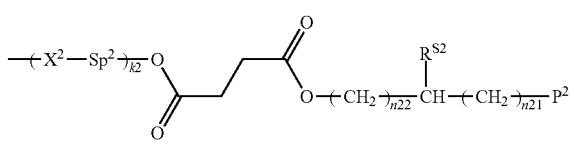

(I-R2)

In the case of giving weight on the flexibility when formed into a film, $R^2$ preferably represents a group other than the group represented by the formula (I-R2), and in the case of giving weight on the mechanical strength when formed into a film, $R^2$ preferably represents a group represented by the formula (I-R2).

When $R^2$ represents a group other than the group represented by the formula (I-R2), from the viewpoints of the liquid crystal property and the easiness of synthesis, $R^2$ preferably represents a hydrogen atom, a fluorine atom, a chlorine atom, a cyano group, or a linear or branched alkyl group having 1 to 12 carbon atoms in which one —$CH_2$— group or two or more —$CH_2$— groups that are not adjacent to each other each may be independently substituted by —O—, —CO—, —COO—, —OCO—, —O—CO—O—, —CO—NH—, —NH—CO—, —CH=CH—, —CF=CF—, or —C≡C—, $R^2$ more preferably represents a hydrogen atom, a fluorine atom, a chlorine atom, or a linear or branched alkyl group having 1 to 12 carbon atoms in which one —$CH_2$— group or two or more —$CH_2$— groups that are not adjacent to each other each may be independently substituted by —O—, —CO—, —COO—, —OCO— or —O—CO—O—, $R^2$ further preferably represents a hydrogen atom, a fluorine atom, a chlorine atom, or, a linear alkyl group or a linear alkoxy group having 1 to 12 carbon atoms, and $R^2$ especially preferably represents a linear alkyl group or a linear alkoxy group having 1 to 12 carbon atoms.

When $R^2$ represents a group represented by the formula (I-R2), preferred structures of $P^2$, $R^{S2}$, $Sp^2$, $X^2$, k2, n21, and n22 are respectively the same as the preferred structures adopted for $P^1$, $R^{S1}$, $Sp^1$, $X^1$, k1, n11, and n12.

In the general formula (I), $M^1$ represents a group represented by the following formula (I-M1).

[Chem. 5]

(I-M1)

$A^1$ and $A^2$ each independently represent a 1,4-phenylene group, a 1,4-cyclohexylene group, a bicyclo[2.2.2]octane-1,4-diyl group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, which may be unsubstituted or substituted with one or more substituents L's, wherein plural $A^1$ groups, if present, may be the same or different. From the viewpoints of the easiness of synthesis, the material availability, and the liquid crystal property, $A^1$ and $A^2$ more preferably each independently represent a 1,4-phenylene group, a 1,4-cyclohexylene group, a bicyclo[2.2.2]octane-1,4-diyl group, a naphthalene-2,6-diyl group which may be unsubstituted or substituted with one or more substituents L's, further preferably each independently represent a group selected from the following formulae (A-1) to (A-13):

[Chem. 6]

(A-1)

(A-2)

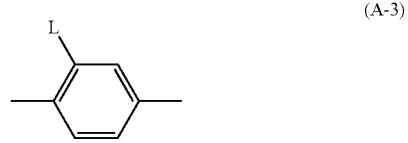

(A-3)

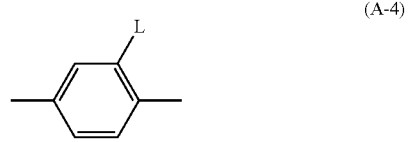

(A-4)

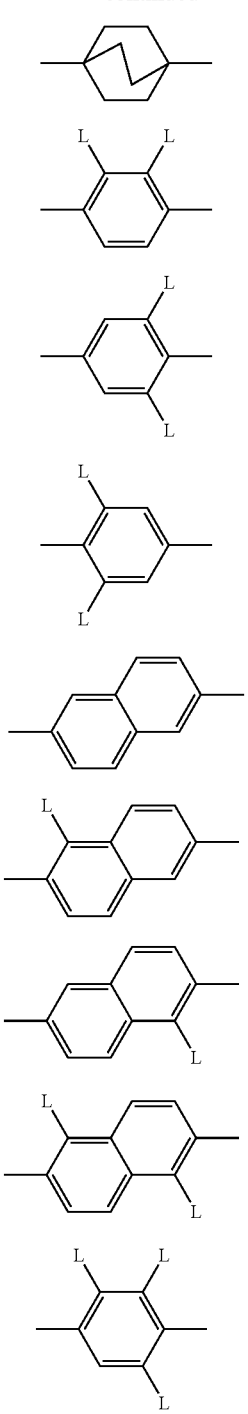

(A-5)
(A-6)
(A-7)
(A-8)
(A-9)
(A-10)
(A-11)
(A-12)
(A-13)

and in the case of giving weight on the low refractive index anisotropy, furthermore preferably each independently represent a group selected from the formulae (A-1) to (A-8) and (A-13), furthermore preferably each independently represent a group selected from the formulae (A-1) to (A-5) and (A-13), furthermore preferably each independently represent a group selected from the formulae (A-1) to (A-4) and (A-13), and especially preferably each independently represent a group selected from the formula (A-1), (A-2), or (A-13).

L represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —CH$_2$— group or two or more —CH$_2$— groups that are not adjacent to each other each may be independently substituted by —O—, —S—, —CO—, —COO—, —OCO—, —CO—S—, —S—CO—, —O—CO—O—, —CO—NH—, —NH—CO—, —CH═CH—COO—, —CH═CH—OCO—, —COO—CH═CH—, —OCO—CH═CH—, —CH═CH—, —CF═CF—, or —C≡C—, and one or more of arbitrary hydrogen atoms in the alkyl group may be substituted by a fluorine atom, or L represents a group represented by the following formula (I-RL):

[Chem. 7]

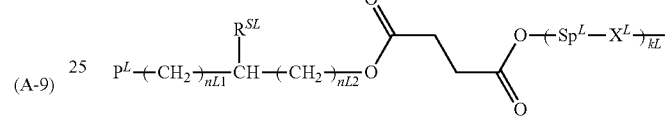

(I-RL)

and plural L groups, if present in the compound, may be the same or different. From the viewpoints of the liquid crystal property and the easiness of synthesis, the substituent L preferably represents a fluorine atom, a chlorine atom, a pentafluorosulfuranyl group, a nitro group, a methylamino group, a dimethylamino group, a diethylamino group, a diisopropylamino group, or a linear or branched alkyl group having 1 to 20 carbon atoms in which one or more of arbitrary hydrogen atoms may be substituted by a fluorine atom and one —CH$_2$— group or two or more —CH$_2$— groups that are not adjacent to each other each may be independently substituted by a group selected from —O—, —S—, —CO—, —COO—, —OCO—, —O—CO—O—, —CH═CH—, —CF═CF—, or —C≡C—, the substituent L more preferably represents a fluorine atom, a chlorine atom, or a linear or branched alkyl group having 1 to 12 carbon atoms in which one or more of arbitrary hydrogen atoms may be substituted by a fluorine atom and one —CH$_2$— group or two or more —CH$_2$— groups that are not adjacent to each other each may be independently substituted by a group selected from —O—, —COO—, or —OCO—, the substituent L further preferably represents a fluorine atom, a chlorine atom, or a linear or branched alkyl group or alkoxy group having 1 to 12 carbon atoms in which one or more of arbitrary hydrogen atoms may be substituted by a fluorine atom, the substituent L furthermore preferably represents a fluorine atom, a chlorine atom, or a linear alkyl group or a linear alkoxy group having 1 to 8 carbon atoms, and the substituent L especially preferably represents a fluorine atom, a chlorine atom, a methyl group, or a methoxy group. When L represents a group represented by the formula (I-RL), preferred structures of $P^L$, $R^{SL}$, $Sp^L$, $X^L$, kL, nL1, and nL2 are respectively the same as the preferred structures adopted for $P^1$, $R^{S1}$, $Sp^1$, $X^1$, k1, n11, and n12.

$Z^1$ represents —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—, —N=CH—, —CH=N—N=CH—, —CF=CF—, —C≡C—, or a single bond, wherein plural Z¹ groups, if present, may be the same or different. From the viewpoint of the liquid crystal property, the material availability, and the easiness of synthesis, Z¹ and Z² preferably each independently represent —OCH₂—, —CH₂O—, —COO—, —OCO—, —CF₂O—, —OCF₂—, —CH₂CH₂—, —CF₂CF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —CH=CH—, —CF=CF—, —C≡C—, or a single bond, more preferably represent —OCH₂—, —CH₂O—, —COO—, —OCO—, —CF₂O—, —OCF₂—, —CH₂CH₂—, —COO—CH₂CH₂—, —OCO—CH₂CH₂—, —CH₂CH₂—COO—, —CH₂CH₂—OCO—, —CH=CH—, —C≡C—, or a single bond, further preferably represent —OCH₂—, —CH₂O—, —COO—, —OCO—, —CF₂O—, —OCF₂—, or a single bond, furthermore preferably represent —OCH₂—, —CH₂O—, —COO—, —OCO—, or a single bond, and especially preferably represent —COO— or —OCO—.

m1 represents an integer of 0 to 5, and from the viewpoints of the solubility in solvent and the liquid crystal property, preferably represents an integer of 0 to 4, more preferably represents an integer of 1 to 4, further preferably represents 1, 2 or 4, and especially preferably represents 2 or 4.

The compound represented by the general formula (I) may be a chiral compound. In this case, preferred is a compound represented by the following general formula (I-C):

[Chem. 8]

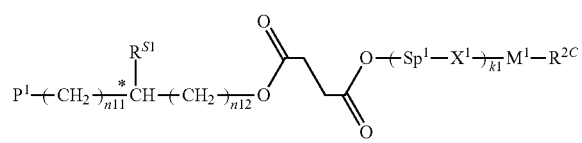

(I-C)

(wherein, $P^1$, $R^{S1}$, $Sp^1$, $X^1$, k1, n11, n12, and $M^1$ respectively represent the same meanings as in $P^1$, $R^{S1}$, $Sp^1$, $X^1$, k1, n11, n12, and $M^1$ in the general formula (I), C represents an asymmetric carbon atom, and $R^{2C}$ represents a hydrogen atom, a fluorine atom, a chlorine atom, a bromine atom, an iodine atom, a pentafluorosulfuranyl group, a cyano group, a nitro group, an isocyano group, a thioisocyano group, or a linear or branched alkyl group having 1 to 20 carbon atoms in which one or more of arbitrary hydrogen atoms in the group may be substituted by a fluorine atom and one —CH₂— group or two or more —CH₂— groups that are not adjacent to each other each may be independently substituted by —O—, —S—, —OCH₂—, —CH₂O—, —CO—, —COO—, —OCO—, —CO—S—, —S—CO—, —O—CO—O—, —CO—NH—, —NH—CO—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—N=CH—, —CF=CF—, or —C≡C—, or $R^{2C}$ is represented by the following formula (I-R2-C):

[Chem. 9]

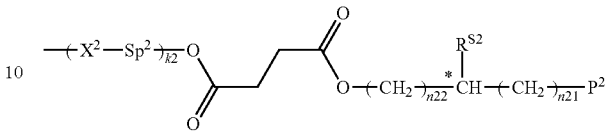

(I-R2-C)

(wherein, $P^2$, $R^{S2}$, $Sp^2$, $X^2$, k2, n21, and n22 respectively represent the same meanings as in $P^2$, $R^{S2}$, $Sp^2$, $X^2$, k2, n21, and n22 in the general formula (I), and *C represents an asymmetric carbon atom).

The preferred structures of the groups are the same as described above.

The compound represented by the general formula (I) is preferably a compound represented by the following general formula (I-A):

[Chem. 10]

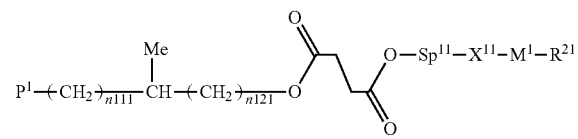

(I-A)

(wherein, $P^1$ and $M^1$ respectively represent the same meanings as in $P^1$ and $M^1$ in the general formula (I), $Sp^{11}$ and $X^{11}$ respectively represent the same meanings as in $Sp^1$ and $X^1$ in the general formula (I), n111 and n121 each independently represent 0 or 1, provided that n111+n121 is 1, and $R^{21}$ represents a group represented by the following formula (I-R2-A):

[Chem. 11]

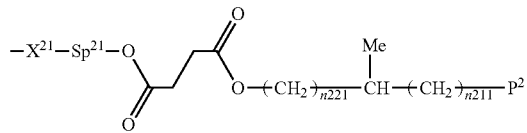

(I-R2-A)

(wherein, $P^2$ represents the same meaning as in $P^2$ in the general formula (I), $Sp^{21}$ and $X^{21}$ respectively represent the same meanings as in $Sp^2$ and $X^2$ in the general formula (I), and n211 and n221 each independently represent 0 or 1, provided that n211+n221 is 1)). In the case of especially giving weight on the storage stability when added into the polymerizable composition, in the general formula (I-A), it is preferred that n111 represents 0, n121 represents 1, $R^{21}$ represents a group represented by the formula (I-R2-A), n211 represents 1, and that n221 represents 0. In the case of giving weight on the easiness of synthesis and the material availability, the compound represented by the general formula (I) is preferably a mixture of a compound represented by the following general formula (I-A-11):

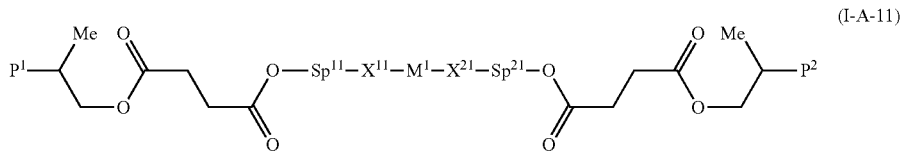

(I-A-11)

(wherein, $P^1$, $P^2$, $Sp^{11}$, $Sp^{21}$, $X^{11}$, $X^{21}$, and $M^1$ respectively represent the same meanings as in $P^1$, $P^2$, $Sp^{11}$, $Sp^{21}$, $X^{11}$, $X^{21}$, and $M^1$ in the general formula (I-A) or the general formula (I-R2-A)), a compound represented by the following general formula (I-A-22):

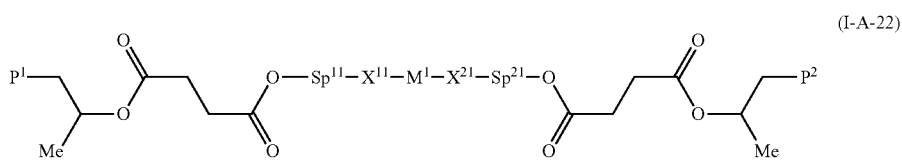

(I-A-22)

(wherein, $P^1$, $P^2$, $Sp^{11}$, $Sp^{21}$, $X^{11}$, $X^{21}$, and $M^1$ respectively represent the same meanings as in $P^1$, $P^2$, $Sp^{11}$, $Sp^{21}$, $X^{11}$, $X^{21}$, and $M^1$ in the general formula (I-A) or the general formula (I-R2-A)), a compound represented by the following general formula (I-A-12):

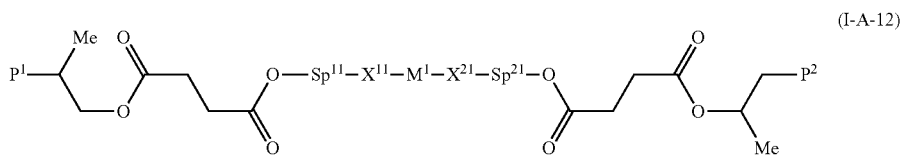

(I-A-12)

(wherein, $P^1$, $P^2$, $Sp^{11}$, $Sp^{21}$, $X^{11}$, $X^{21}$, and $M^1$ respectively represent the same meanings as in $P^1$, $P^2$, $Sp^{11}$, $Sp^{21}$, $X^{11}$, $X^{21}$, and $M^1$ in the general formula (I-A) or the general formula (I-R2-A)), and a compound represented by the following general formula (I-A-21):

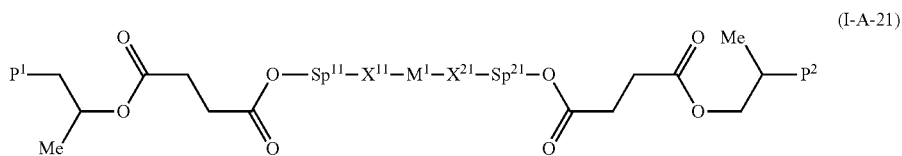

(I-A-21)

(wherein, $P^1$, $P^2$, $Sp^{11}$, $Sp^{21}$, $X^{11}$, $X^{21}$, and $M^1$ respectively represent the same meanings as in $P^1$, $P^2$, $Sp^{11}$, $Sp^{21}$, $X^{11}$, $X^{21}$, and $M^1$ in the general formula (I-A) or the general formula (I-R2-A)), more preferably a mixture of a compound represented by the following general formula (I-A-111):

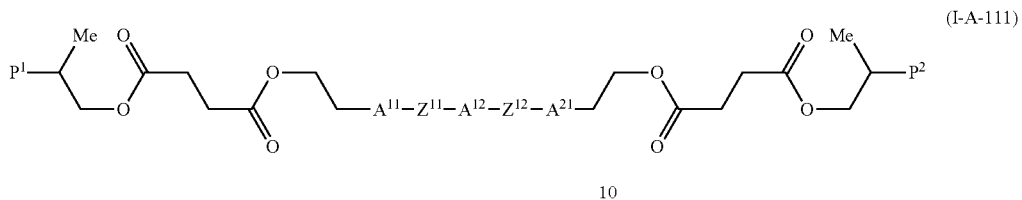

(I-A-111)

(wherein, $P^1$ and $P^2$ respectively represent the same meanings as in $P^1$ and $P^2$ in the general formula (I-A) or the general formula (I-R2-A), $A^{11}$, $A^{12}$, and $A^{21}$ each independently represent a 1,4-phenylene group or a 1,4-cyclohexylene group wherein the group may be unsubstituted or substituted with one or more substituents L's, and $Z^{11}$ and $Z^{12}$ each independently represent —OCH$_2$—, —CH$_2$O—, —CH$_2$CH$_2$—, —COO—, —OCO—, —CO—NH—, —NH—CO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, or a single bond), a compound represented by the following general formula (I-A-221):

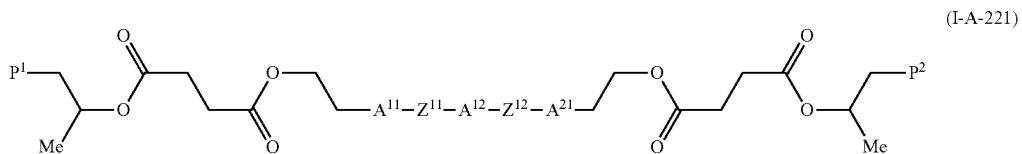

(I-A-221)

(wherein, $P^1$ and $P^2$ respectively represent the same meanings as in $P^1$ and $P^2$ in the general formula (I-A) or the general formula (I-R2-A), and $A^{11}$, $A^{12}$, $A^{21}$, $Z^{11}$, and $Z^{12}$ respectively represent the same meanings as in $A^{11}$, $A^{12}$, $A^{21}$, $Z^{11}$, and $Z^{12}$ in the general formula (I-A-111)), a compound represented by the following general formula (I-A-121):

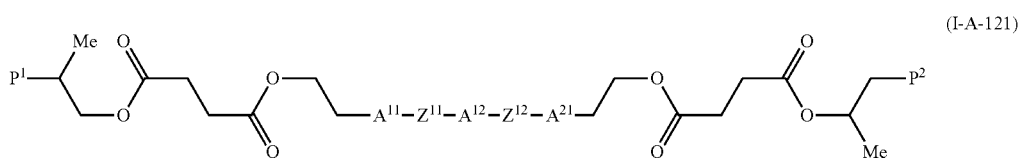

(I-A-121)

(wherein, $P^1$ and $P^2$ respectively represent the same meanings as in $P^1$ and $P^2$ in the general formula (I-A) or the general formula (I-R2-A), and $A^{11}$, $A^{12}$, $A^{21}$, $Z^{11}$, and $Z^{12}$ respectively represent the same meanings as in $A^{11}$, $A^{12}$, $A^{21}$, $Z^{11}$, and $Z^{12}$ in the general formula (I-A-111)), and a compound represented by the following general formula (I-A-211):

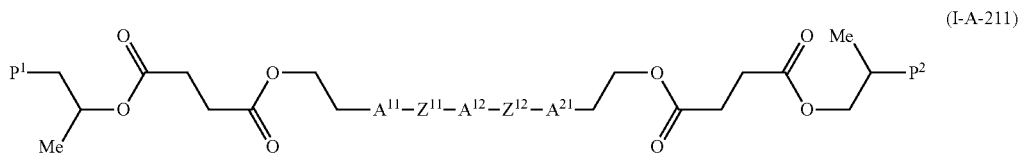

(I-A-211)

(wherein, $P^1$ and $P^2$ respectively represent the same meanings as in $P^1$ and $P^2$ in the general formula (I-A) or the general formula (I-R2-A), and $A^{11}$, $A^{12}$, $A^{21}$, $Z^{11}$, and $Z^{12}$ respectively represent the same meanings as in $A^{11}$, $A^{12}$, $A^{21}$, $Z^{11}$, and $Z^{12}$ in the general formula (I-A-111)), or a mixture of a compound represented by the following general formula (I-A-112):

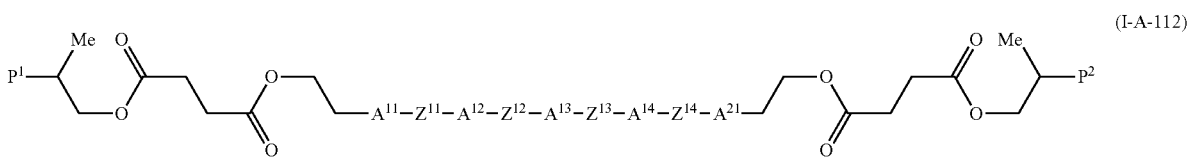

(I-A-112)

(wherein, $P^1$ and $P^2$ respectively represent the same meanings as in $P^1$ and $P^2$ in the general formula (I-A) or the general formula (I-R2-A), $A^{11}$, $A^{12}$, $A^{13}$, $A^{14}$, and $A^{21}$ each independently represent a 1,4-phenylene group or a 1,4-cyclohexylene group wherein the group may be unsubstituted or substituted with one or more substituents L's, and $Z^{11}$, $Z^{12}$, $Z^{13}$, and $Z^{14}$ each independently represent —OCH$_2$—, —CH$_2$O—, —CH$_2$CH$_2$—, —COO—, —OCO—, —CO—NH—, —NH—CO—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, or a single bond), a compound represented by the following general formula (I-A-222):

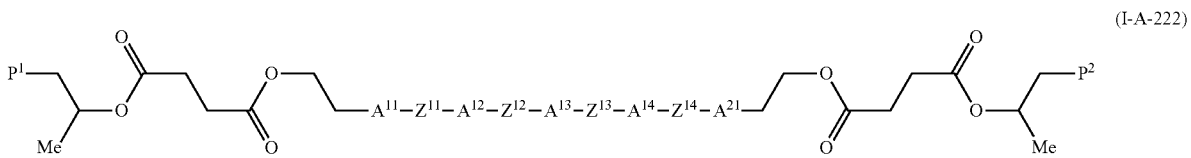

(I-A-222)

(wherein, $P^1$ and $P^2$ respectively represent the same meanings as in $P^1$ and $P^2$ in the general formula (I-A) or the general formula (I-R2-A), and $A^{11}$, $A^{12}$, $A^{13}$, $A^{14}$, $A^{21}$, $Z^{11}$, $Z^{12}$, $Z^{13}$, and $Z^{14}$ respectively represent the same meanings as in $A^{11}$, $A^{12}$, $A^{13}$, $A^{14}$, $A^{21}$, $Z^{11}$, $Z^{12}$, $Z^{13}$, and $Z^{14}$ in the general formula (I-A-112)) a compound represented by the following general formula (I-A-122):

[Chem. 22]

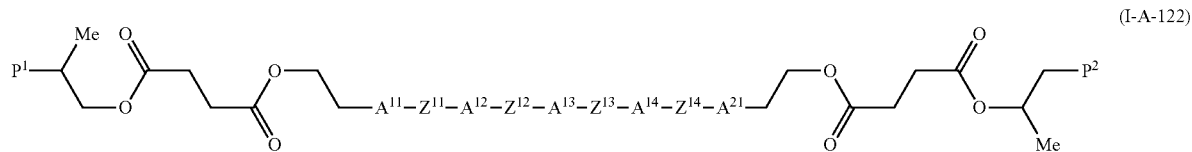
(I-A-122)

(wherein, $P^1$ and $P^2$ respectively represent the same meanings as in $P^1$ and $P^2$ in the general formula (I-A) or the general formula (I-R2-A), and $A^{11}, A^{12}, A^{13}, A^{14}, A^{21}, Z^{11}, Z^{12}, Z^{13}$, and $Z^{14}$ respectively represent the same meanings as in $A^{11}, A^{12}, A^{13}, A^{14}, A^{21}, Z^{11}, Z^{12}, Z^{13}$, and $Z^{14}$ in the general formula (I-A-112)), and a compound represented by the following general formula (I-A-212):

[Chem. 23]

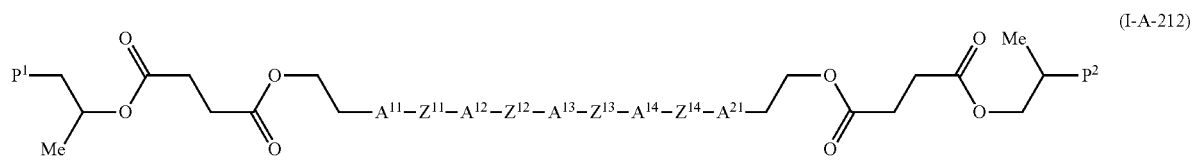
(I-A-212)

(wherein, $P^1$ and $P^2$ respectively represent the same meanings as in $P^1$ and $P^2$ in the general formula (I-A) or the general formula (I-R2-A), and $A^{11}, A^{12}, A^{13}, A^{14}, A^{21}, Z^{11}, Z^{12}, Z^{13}$, and $Z^{14}$ respectively represent the same meanings as in $A^{11}, A^{12}, A^{13}, A^{14}, A^{21}, Z^{11}, Z^{12}, Z^{13}$, and $Z^{14}$ in the general formula (I-A-112)), further preferably a mixture of a compound represented by the following general formula (I-A-1111):

[Chem. 24]

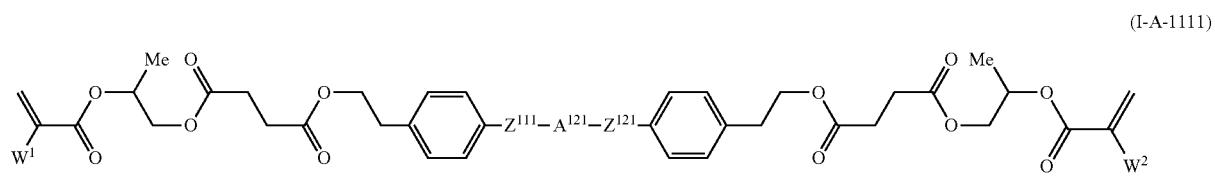
(I-A-1111)

(wherein, $W^1$ and $W^2$ each independently represent a hydrogen atom, a methyl group, a trifluoromethyl group, or a fluorine atom, $A^{121}$ represents a 1,4-phenylene group or a 1,4-cyclohexylene group wherein the group may be unsubstituted or substituted with one or more substituents L's, and $Z''$ and $Z^{121}$ each independently represent —OCH$_2$—, —CH$_2$O—, —COO—, or —OCO—), a compound represented by the following general formula (I-A-2211):

[Chem. 25]

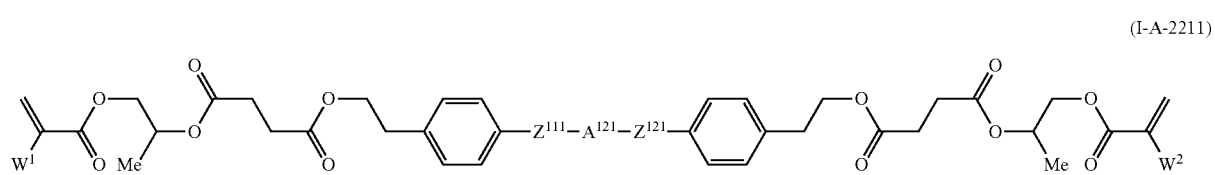
(I-A-2211)

(wherein, $W^1$, $W^2$, $A^{121}$, $Z^{111}$, and $Z^{121}$ respectively represent the same meanings as in $W^1$, $W^2$, $A^{121}$, $Z^{111}$, and $Z^{121}$ in the general formula (I-A-1111)), a compound represented by the following general formula (I-A-1211):

[Chem. 26]

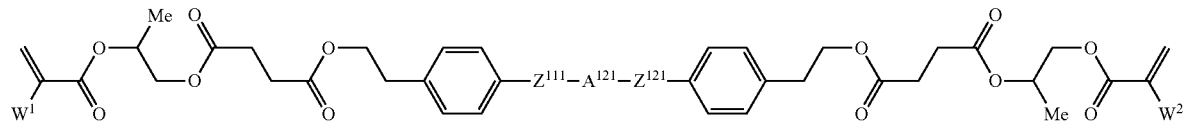

(I-A-1211)

(wherein, $W^1$, $W^2$, $A^{121}$, $Z^{111}$ and $Z^{121}$ respectively represent the same meanings as in $W^1$, $W^2$, $A^{121}$, $Z^{111}$, and $Z^{121}$ in the general formula (I-A-1111)), and a compound represented by the following general formula (I-A-2111):

[Chem. 27]

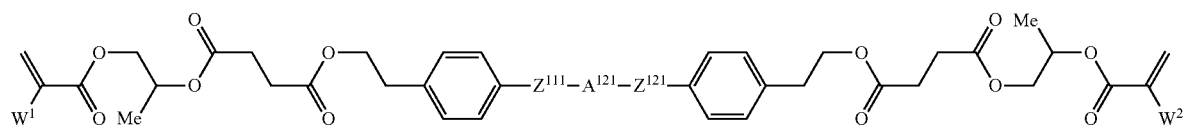

(I-A-2111)

(wherein, $W^1$, $W^2$, $A^{121}$, $Z^{111}$, and $Z^{121}$ respectively represent the same meanings as in $W^1$, $W^2$, $A^{121}$, $Z^{111}$, and $Z^{121}$ in the general formula (I-A-1111)), or a mixture of a compound represented by the following general formula (I-A-1121):

[Chem. 28]

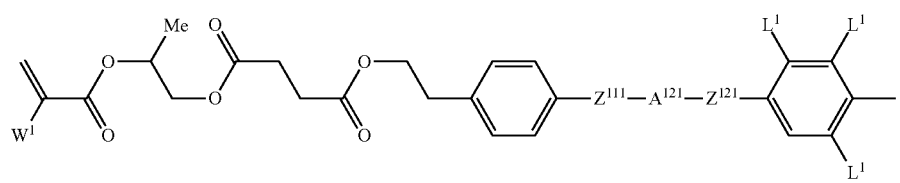

(I-A-1121)

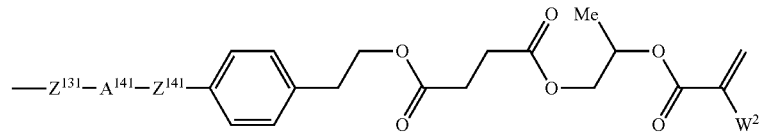

(wherein, $W^1$ and $W^2$ each independently represent a hydrogen atom, a methyl group, a trifluoromethyl group, or a fluorine atom, $A^{121}$ and $A^{141}$ represent a 1,4-phenylene group or a 1,4-cyclohexylene group wherein the group may be unsubstituted or substituted with one or more substituents L's, $Z^{111}$, $Z^{121}$, $Z^{131}$ and $Z^{141}$ each independently represent —OCH$_2$—, —CH$_2$O—, —COO—, or —OCO—, and $L^1$ represents a fluorine atom, a chlorine atom, or a linear alkyl group or a linear alkoxy group having 1 to 8 carbon atoms), a compound represented by the following general formula (I-A-2221):

[Chem. 29]

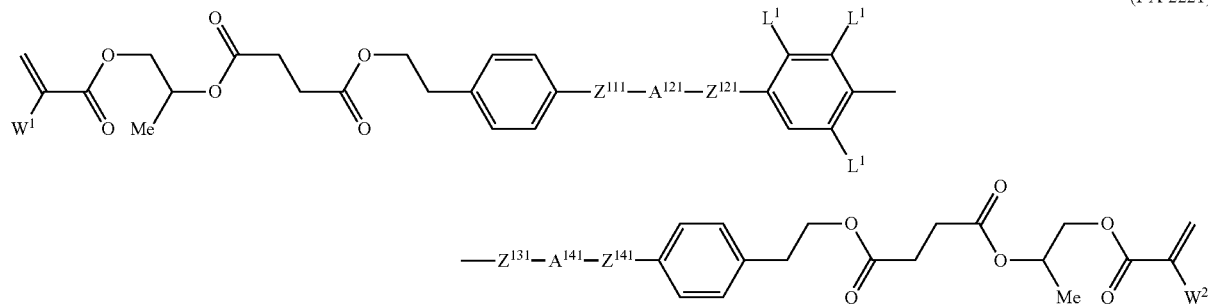

(I-A-2221)

(wherein, $W^1$, $W^2$, $A^{121}$, $A^{141}$, $Z^{111}$, $Z^{121}$, $Z^{131}$, $Z^{141}$, and $L^1$ respectively represent the same meanings as in $W^1$, $W^2$, $A^{121}$, $A^{141}$, $Z^{111}$, $Z^{121}$, $Z^{121}$, $Z^{141}$, and $L^1$ in the general formula (I-A-1121)), a compound represented by the following general formula (I-A-1221):

[Chem. 30]

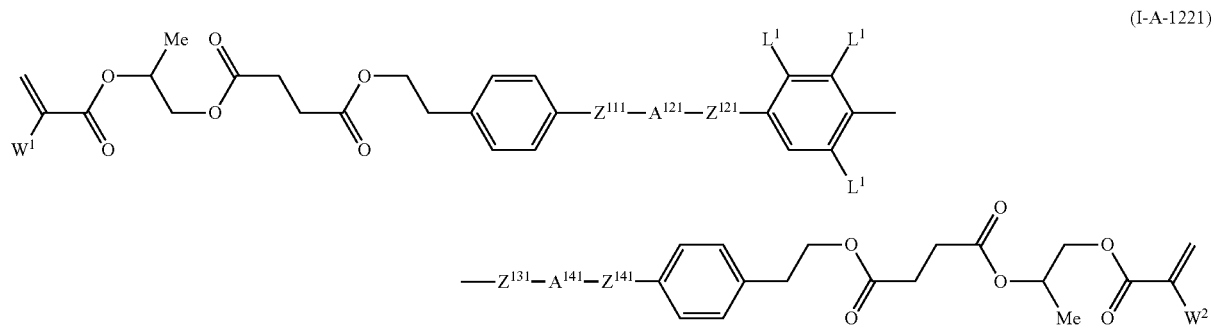

(I-A-1221)

(wherein, $W^1$, $W^2$, $A^{121}$, $A^{141}$, $Z^{111}$, $Z^{121}$, $Z^{131}$, $Z^{141}$, and $L^1$ respectively represent the same meanings as in $W^1$, $W^2$, $A^{121}$, $A^{141}$, $Z^{111}$, $Z^{121}$, $Z^{131}$, $Z^{141}$, and $L^1$ in the general formula (I-A-1121)), and a compound represented by the following general formula (I-A-2121):

[Chem. 31]

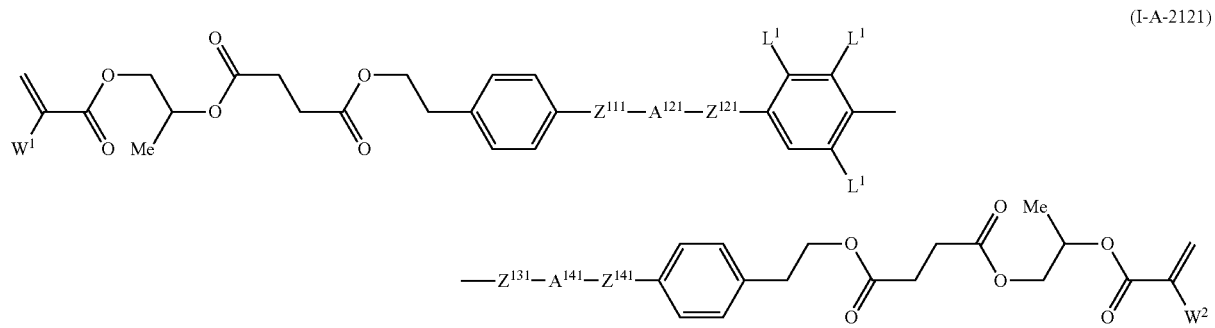

(I-A-2121)

(wherein, $W^1$, $W^2$, $A^{121}$, $A^{141}$, $Z^{111}$, $Z^{121}$, $Z^{131}$, $Z^{141}$, and $L^1$ respectively represent the same meanings as in $W^1$, $W^2$, $A^{121}$, $A^{141}$, $Z^{111}$, $Z^{121}$, $Z^{131}$, $Z^{141}$, and $L^1$ in the general formula (I-A-1121)), and especially preferably a mixture of a compound represented by the following general formula (I-A-11111):

[Chem. 32]

(I-A-11111)

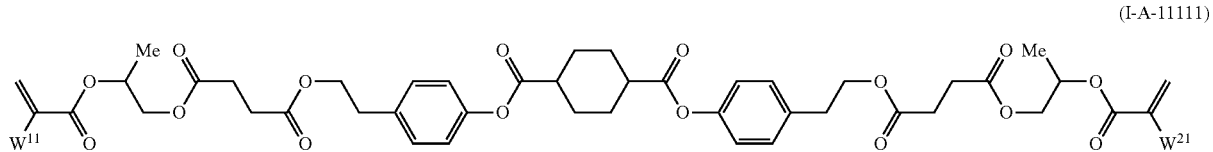

(wherein, $W^{11}$ and $W^{21}$ each independently represent a hydrogen atom or a methyl group), a compound represented by the following general formula (I-A-22111):

[Chem. 33]

(I-A-22111)

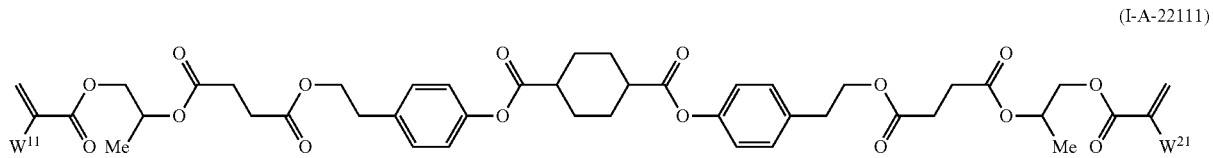

(wherein, $W^{11}$ and $W^{21}$ respectively represent the same meanings as in $W^{11}$ and $W^{21}$ in the general formula (I-A-11111)), and a compound represented by the following general formula (I-A-12111):

[Chem. 34]

(I-A-12111)

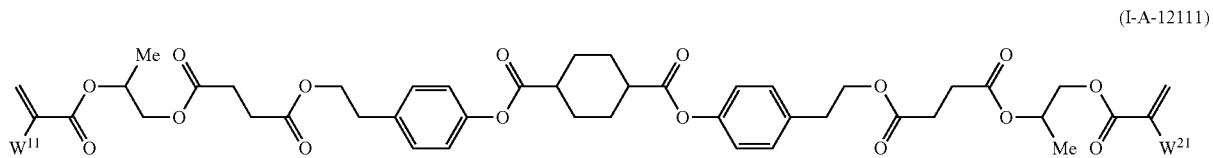

(wherein, $W^{11}$ and $W^{21}$ respectively represent the same meanings as in $W^{11}$ and $W^{21}$ in the general formula (I-A-11111)), or a mixture of a compound represented by the following general formula (I-A-11211):

[Chem. 35]

(I-A-11211)

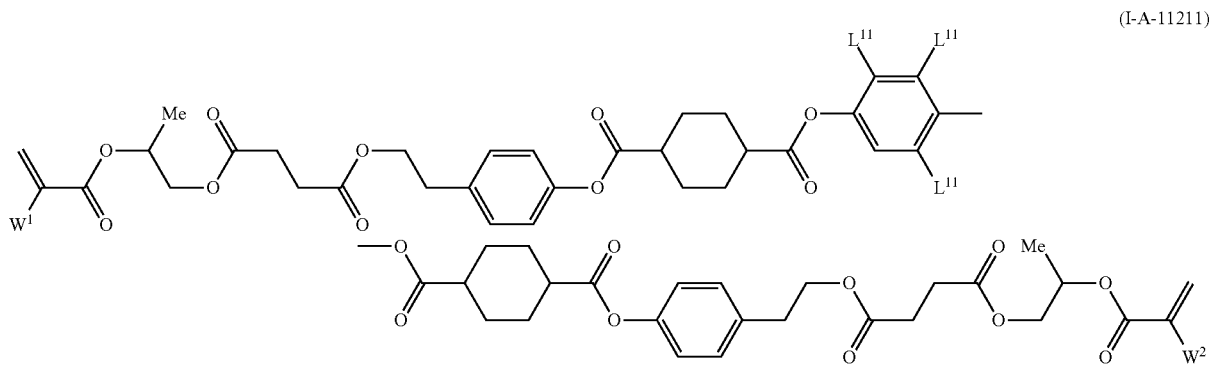

(wherein, $W^{11}$ and $W^{21}$ each independently represent a hydrogen atom or a methyl group, and $L^{11}$ represents a fluorine atom, a chlorine atom, a methyl group, or a methoxy group), a compound represented by the following general formula (I-A-22211):

[Chem. 36]

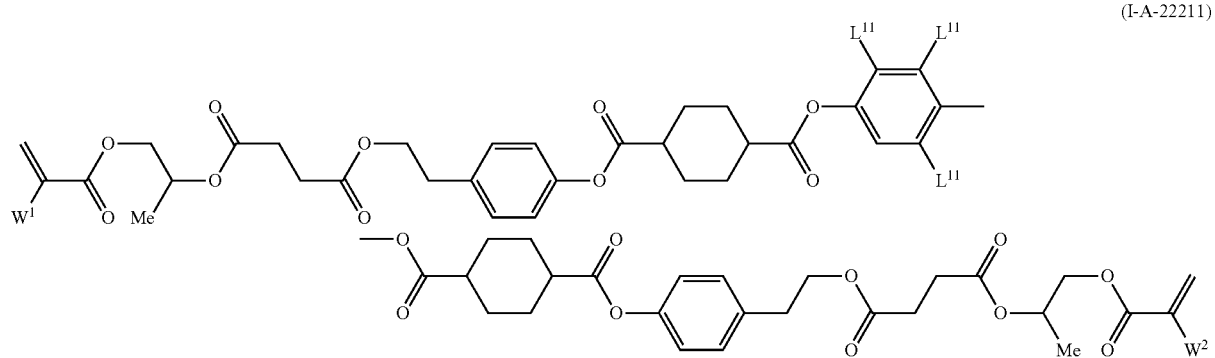

(I-A-22211)

(wherein, $W^{11}$, $W^{21}$, and $L^{11}$ respectively represent the same meanings as in $W^{11}$, $W^{21}$, and $L^{11}$ in the general formula (I-A-11211)), a compound represented by the following general formula (I-A-12211):

[Chem. 37]

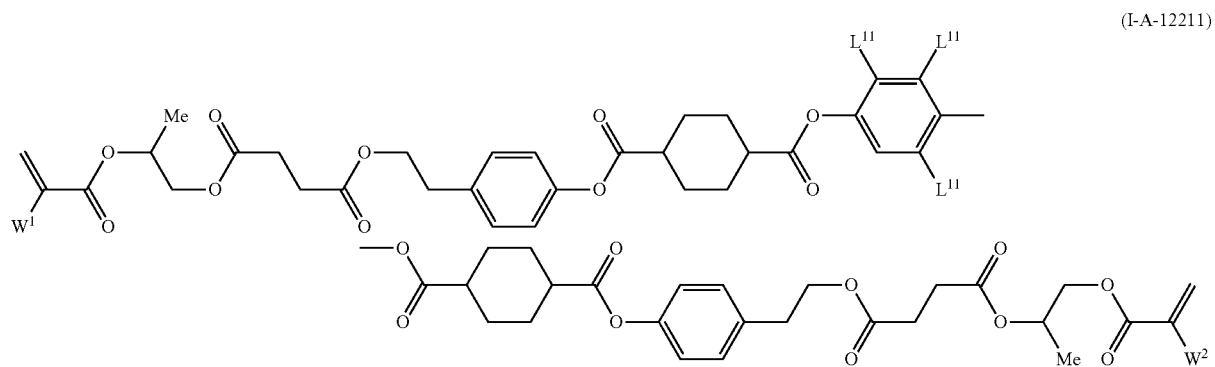

(I-A-12211)

(wherein, $W^{11}$, $W^{21}$, and $L^{11}$ respectively represent the same meanings as in $W^{11}$, $W^{21}$, and $L^{11}$ in the general formula (I-A-11211)), and a compound represented by the following general formula (I-A-21211):

[Chem. 38]

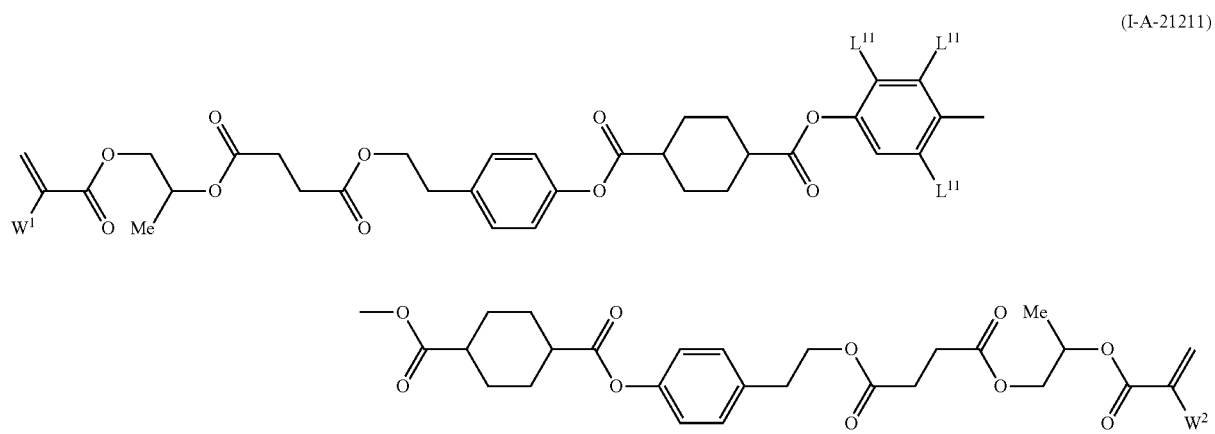

(I-A-21211)

(wherein, $W^{11}$, $W^{21}$, and $L^{11}$ respectively represent the same meanings as in $W^{11}$, $W^{21}$, and $L^{11}$ in the general formula (I-A-11211)).

In addition, from the viewpoint of the liquid crystal property, the 1,4-cyclohexylene group, the 1,3-dioxane-2,5-diyl group, and the decahydronaphthalene-2,6-diyl group included in the compound represented by the general formula (I) may be either one of the cis isomer and the trans isomer, or may be a mixture of both the isomers, and from the viewpoint of the liquid crystal property, the groups each preferably mainly include the trans isomer, and especially preferably include only the trans isomer. The same is applied to the compound described below.

The optical film of the present invention preferably has a nematic phase, a smectic phase, a chiral smectic phase, or a cholesteric phase structure, more preferably has a chiral smectic phase or a cholesteric phase structure, and especially preferably has a cholesteric phase structure.

One or two or more of the compounds represented by the general formula (I) may be used, but the total content of said polymerizable compounds used in production of an optical film is preferably 1 to 99% by mass, more preferably 10 to 90% by mass, and especially preferably 20 to 80% by mass, of the total amount of polymerizable compounds used in production of the optical film. In the case of giving weight on the alignment of the resulting optical film, the upper limit is preferably 80% by mass or less, more preferably 70% by mass or less, and especially preferably 60% by mass or less. In the case of giving weight on the storage stability of the liquid crystal composition, the lower limit is preferably 20% by mass or more, more preferably 30% by mass or more, and especially preferably 40% by mass or more. In the case where the compound represented by the general formula (I) is a chiral compound, the total content of the chiral compound represented by the general formula (I) used in production of an optical film is preferably 0.1 to 80% by mass, more preferably 1 to 70% by mass, and especially preferably 5 to 50% by mass, of the total amount of polymerizable compounds used in production of the optical film.

As a material of the optical film of the present invention, other compounds than the compound represented by the general formula (I) may be added. As the other polymerizable compounds used by being mixed with the compound represented by the general formula (I), preferred is a compound represented by the following general formula (II):

[Chem. 39]

$$P^3-(Sp^3-X^3)_{k3}-(A^3-Z^2)_{m2}-A^4-(X^4-Sp^4)_{k4}-P^4 \quad (II)$$

(wherein, $P^3$ and $P^4$ each independently represent a group which undergoes polymerization by radical polymerization, cation polymerization, or anion polymerization, $Sp^3$ and $Sp^4$ each independently represent a spacer group, wherein plural $Sp^3$ groups, if present, may be the same or different, and plural $Sp^4$ groups, if present, may be the same or different, $X^3$ and $X^4$ each independently represent —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —OCO—CH=CH—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH$_2$—CH$_2$—, —CH=CH—, —N=N—, —CH=N—, —N=CH—, —CH=N—N=CH—, —CF=CF—, —C≡C—, or a single bond, wherein plural $X^3$ groups, if present, may be the same or different, and plural $X^4$ groups, if present, may be the same or different, k3 and k4 each independently represent an integer of 0 to 10, $A^3$ and $A^4$ each independently represent a 1,4-phenylene group, a 1,4-cyclohexylene group, a bicyclo[2.2.2]octane-1,4-diyl group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group which may be unsubstituted or substituted with one or more substituents L's, wherein plural $A^3$ groups, if present, may be the same or different, $Z^2$ represents —O—, —S—, —OCH$_2$—, —CH$_2$O—, —CH$_2$CH$_2$—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—, —N=CH—, —CH=N—N=CH—, —CF=CF—, —C≡C—, or a single bond, wherein plural $Z^2$ groups, if present, may be the same or different, and m2 represents an integer of 0 to 5), provided that the compounds represented by the general formula (II) do not encompass the compounds represented by the general formula (I).

In the general formula (II), $P^3$ and $P^4$ each independently represent a group that undergoes polymerization by radical polymerization, cation polymerization, or anion polymerization, and preferably each independently represent a group selected from the formulae (P-1) to (P-20). Particularly in the case where ultraviolet polymerization is adopted as the polymerization method, the formula (P-1), (P-2), (P-3), (P-4), (P-5), (P-7), (P-11), (P-13), (P-15), or (P-18) is preferred, the formula (P-1), (P-2), (P-3), (P-8), (P-11), or (P-13) is more preferred, the formula (P-1), (P-2) or (P-3) is further preferred, and the formula (P-1) or (P-2) is especially preferred.

In the general formula (II), $Sp^3$ and $Sp^4$ each independently represent a spacer group, wherein plural $Sp^3$ groups, if present, may be the same or different, and plural $Sp^4$ groups, if present, may be the same or different, and from the viewpoints of the liquid crystal property, the material availability, and the easiness of synthesis, it is preferred that plural $Sp^3$ and $Sp^4$ groups, if present, each may be the same or different and each independently represent an alkylene group having 1 to 20 carbon atoms in which one —CH$_2$— group or two or more —CH$_2$— groups that are not adjacent to each other each may be independently substituted by —O—, —S—, —OCH$_2$—, —CH$_2$O—, —CO—, —COO—, —OCO—, —CO—S—, —S—CO—, —O—CO—O—, —CO—NH—, —NH—CO—, —SCH$_2$—, —CH$_2$S—, —CF$_2$O—, —OCF$_2$—, —CF$_2$S—, —SCF$_2$—, —CH=CH—COO—, —CH=CH—OCO—, —COO—CH=CH—, —OCO—CH=CH—, —COO—CH$_2$CH$_2$—, —OCO—CH$_2$CH$_2$—, —CH$_2$CH$_2$—COO—, —CH$_2$CH$_2$—OCO—, —COO—CH$_2$—, —OCO—CH$_2$—, —CH$_2$—COO—, —CH$_2$—OCO—, —CH=CH—, —N=N—, —CH=N—N=CH—, —CF=CF—, or —C≡C—, it is more preferred that plural $Sp^3$ and $Sp^4$ groups, if present, each may be the same or different and each independently represent an alkylene group having 1 to 20 carbon atoms in which one —$CH_2$— group or two or more —$CH_2$— groups that are not adjacent to each other each may be independently substituted by —O—, —COO—, —OCO—, —OCO—O—, —CO—NH—, —NH—CO—, —CH=CH—, or —C≡C—, and it is further preferred that plural $Sp^3$ and $Sp^4$ groups, if present, each may be the same or different and each independently represent a linear alkylene group having 1 to 20 carbon atoms in which one —$CH_2$— group or two or more —$CH_2$— groups that are not adjacent to each other each may be independently substituted by —O—, —COO—, —OCO—, or —OCO—O—, it is furthermore preferred that plural $Sp^3$ and $Sp^4$ groups, if present, each may be the same or different and each independently represent a linear alkylene group having 1 to 12 carbon atoms in which one —$CH_2$— group or two or more —$CH_2$— groups that are not adjacent to each other each may be independently substituted by —O—, and it is especially preferred that plural $Sp^3$ and $Sp^4$ groups, if present, each may be the same or different and each independently represent a linear alkylene group having 1 to 12 carbon atoms.

In the general formula (II), $X^3$ and $X^4$ each independently represent —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—OCO—, —CH=CH—OCO—, —COO—CH=CH—, —OCO—CH=CH—, —COO—$CH_2CH_2$—, —COO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, —C≡C—, or a single bond, wherein plural $X^3$ groups, if present, may be the same or different, and plural $X^4$ groups, if present, may be the same or different. From the viewpoints of the material availability and the easiness of synthesis, plural $X^3$ and $X^4$ groups, if present, each may be the same or different, and preferably each independently represent —O—, —S—, —$OCH_2$—, —$CH_2O$—, —COO—, —OCO—, —CO—S—, —S—CO—, —O—CO—O—, —CO—NH—, —NH—CO—, —COO—$CH_2CH_2$—, —OCO—$CH_2CH_2$—, —$CH_2CH_2$—COO—, —$CH_2CH_2$—OCO—, or a single bond, more preferably each independently represent —O—, —$OCH_2$—, —$CH_2O$—, —COO—, —OCO—, —COO—$CH_2CH_2$—, —OCO—$CH_2CH_2$—, —$CH_2CH_2$—COO—, —$CH_2CH_2$—OCO—, or a single bond, further preferably each independently represent —O—, —COO—, —OCO—, or a single bond, furthermore preferably each independently represent —O— or a single bond, and especially preferably each represent —O—.

In the general formula (II), k3 and k4 each independently represent an integer of 0 to 10, and from the viewpoints of the easiness of synthesis and the liquid crystal property, preferably each independently represent an integer of 0 to 5, more preferably each independently represent an integer of 0 to 2, further preferably each independently represent 0 or 1, and from the viewpoint of the less shrinkage on curing when formed into film, especially preferably each represent 1.

However, in the general formula (II), $P^3$—$(Sp^3$-$X^3)_{k3}$— and —$(X^4$—$Sp^4)_{k4}$-$P^4$ do not include a —O—O— bond.

In the general formula (II), the preferred structures of $A^3$, $A^4$, $Z^2$, and m2 are respectively the same as the preferred structures adopted for $A^1$, $A^2$, $Z^1$, and m1 in the general formula (I). The preferred structure of L is the same as described above.

The compound represented by the general formula (II) is preferably a compound represented by the following general formula (II-A):

[Chem. 40]

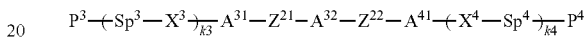

(II-A)

(wherein, $P^3$, $P^4$, $Sp^3$, $Sp^4$, $X^3$, $X^4$, k3, and k4 respectively represent the same meanings as in $P^3$, $P^4$, $Sp^3$, $Sp^4$, $X^3$, $X^4$, k3, and k4 in the general formula (II), $A^{31}$, $A^{32}$, and $A^{41}$ each independently represent a 1,4-phenylene group or a 1,4-cyclohexylene group wherein the group may be unsubstituted or substituted with one or more substituents L's, and $Z^{21}$ and $Z^{22}$ each independently represent —$OCH_2$—, —$CH_2O$—, —$CH_2CH_2$—, —COO—, —OCO—, —CO—NH—, —NH—CO—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, or a single bond), more preferably a compound represented by the following general formula (II-A-1):

[Chem. 41]

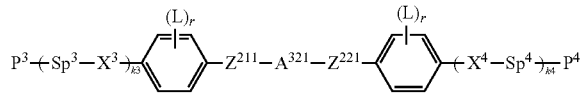

(II-A-1)

(wherein, $P^3$, $P^4$, $Sp^3$, $Sp^4$, $X^3$, $X^4$, k3, and k4 respectively represent the same meanings as in $P^3$, $P^4$, $Sp^3$, $Sp^4$, $X^3$, $X^4$, k3, and k4 in the general formula (II), $A^{321}$ represents a 1,4-phenylene group or a 1,4-cyclohexylene group wherein the group may be unsubstituted or substituted with one or more substituents L's, $Z^{211}$ and $Z^{221}$ each independently represent —$OCH_2$—, —$CH_2O$—, —COO—, —OCO—, or a single bond, and r represents an integer of 0 to 4), further preferably a compound represented by the following general formula (II-A-11):

[Chem. 42]

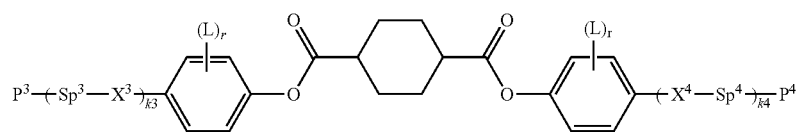

(II-A-11)

(wherein, $P^3$, $P^4$, $Sp^3$, $Sp^4$, $X^3$, $X^4$, k3, and k4 respectively represent the same meanings as in $P^3$, $P^4$, $Sp^3$, $Sp^4$, $X^3$, $X^4$, k3, and k4 in the general formula (II), and r represents an integer of 0 to 4), and especially preferably a compound represented by the following general formula (II-A-111):

[Chem. 43]

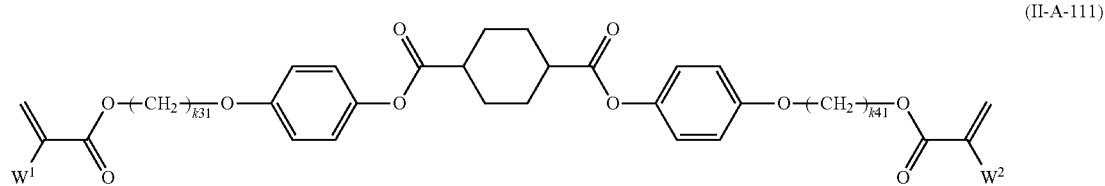

(II-A-111)

(wherein, $W^1$ and $W^2$ each independently represent a hydrogen atom, a methyl group, a trifluoromethyl group, or a fluorine atom, and k31 and k41 represents an integer of 2 to 10).

One or two or more of the compounds represented by the general formula (II), more preferably the compounds represented by the general formula (II-A), further preferably the compounds represented by the general formula (II-A-11), and especially preferably the compounds represented by the general formula (II-A-111), may be used, but the total content of said polymerizable compounds used in production of an optical film is 1 to 99% by mass, more preferably 10 to 90% by mass, and especially preferably 20 to 80% by mass, of the total amount of the polymerizable compounds used in production of the optical film. In the case of giving weight on the alignment of the resulting optical film, the lower limit is preferably 20% by mass or more, more preferably 30% by mass or more, and especially preferably 40% by mass or more. When in the case of giving weight on the storage stability of the liquid composition, the upper limit is preferably 80% by mass or less, more preferably 70% by mass or less, and especially preferably 60% by mass or less.

As other compounds represented by the general formula (II), for the purpose of regulating the cholesteric alignment, the liquid crystal phase temperature range, the film surface hardness, and the like, compounds represented by the following formulae (X-1-1) to (X-1-3):

[Chem. 44]

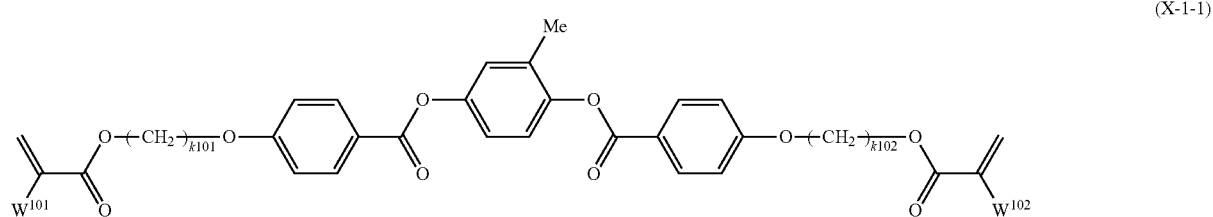

(X-1-1)

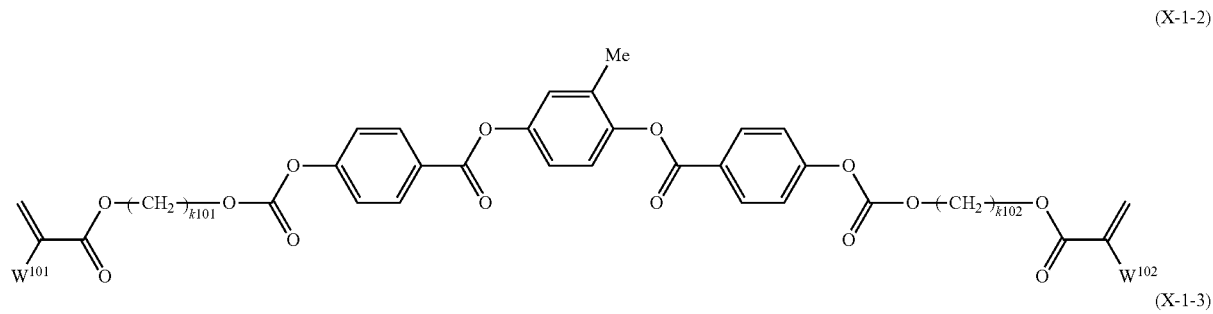

(X-1-2)

(X-1-3)

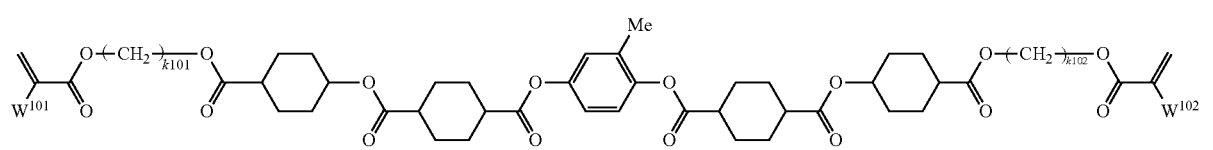

(wherein, $W^{101}$ and $W^{102}$ each independently represent a hydrogen atom, a methyl group, a trifluoromethyl group, or a fluorine atom, and k101 and k102 represent an integer of 2 to 10) may be added.

Furthermore, the other compound is preferably a compound represented by the following formulae (X-1-4) to (X-1-7):

[Chem. 45]

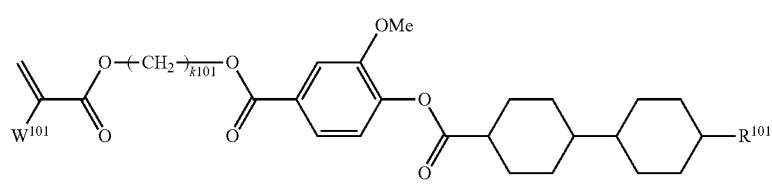
(X-1-4)

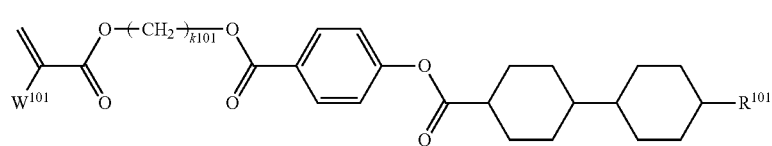
(X-1-5)

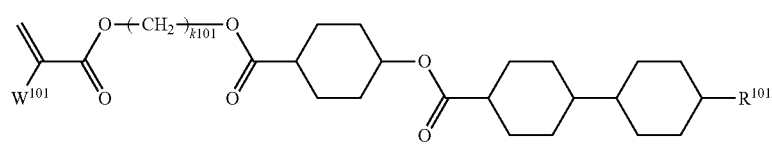
(X-1-6)

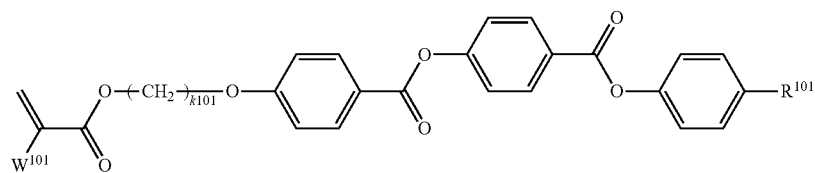
(X-1-7)

(wherein, $W^{101}$ and $W^{102}$ each independently represent a hydrogen atom, a methyl group, a trifluoromethyl group, or a fluorine atom, k101 and k102 represent an integer of 2 to 10, and $R^{101}$ represents a hydrogen atom, an alkyl group having 1 to 10 carbon atoms, or an alkoxy group having 1 to 10 carbon atoms).

In order to produce the optical film of the present invention, a chiral compound may be used. One or two or more of chiral compounds may be used, but the total content of the chiral compounds used in production of the optical film is preferably 0.1 to 30% by mass, more preferably 1 to 20% by mass, and especially preferably 5 to 10% by mass, relative to the total amount 1 of the polymerizable compounds used in production of the optical film.

The chiral compound is preferably a chiral compound having an isosorbide structure or a binaphthyl structure, and preferably a compound represented by the following formulae (X-2-1) to (X-2-3):

[Chem. 46]

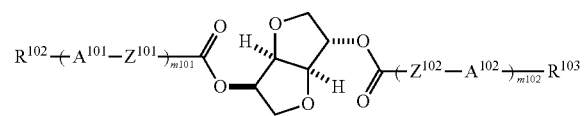
(X-2-1)

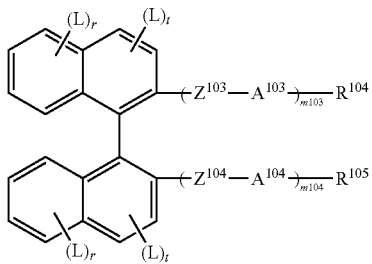
(X-2-2)

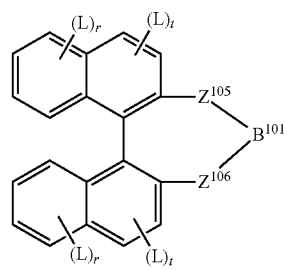
(X-2-3)

(wherein, L represents the same meaning as in L in the general formula (I), r represents an integer of 0 to 4, t represents an integer of 0 to 2, $A^{101}$, $A^{102}$, $A^{103}$, and $A^{104}$ each independently represent a 1,4-phenylene group, a 1,4-cyclohexylene group, or a naphthalene-2,6-diyl group wherein the group may be unsubstituted or substituted with one or more substituents L's, $Z^{101}$, $Z^{102}$, $Z^{103}$, $Z^{104}$, $Z^{105}$, and $Z^{106}$ each independently represent —OCH$_2$—, —CH$_2$O—, —COO—, —OCO—, —CF$_2$O—, —OCF$_2$—, —CH=CH—COO—, —OCO—CH=CH—, —COO—CH$_2$CH$_2$—, —OCO—CH$_2$CH$_2$—, —CH$_2$CH$_2$—COO—, —CH$_2$CH$_2$—OCO—, —CH=CH—, —C≡C—, or a single bond, m101, m102, m103, and m104 represents an integer of 0 to 5, $B^{101}$ represents a 1,4-phenylene group, a 1,4-cyclohexylene group, or a naphthalene-2,6-diyl group wherein the group may be unsubstituted or substituted with one or more substituents L's, or $B^{101}$ represents an alkylene group having 1 to 20 carbon atoms in which one —$CH_2$— group or two or more —$CH_2$— groups that are not adjacent to each other each may be independently substituted by —O—, —COO—, —OCO—, —OCO—O—, —CO—NH—, —NH—CO—, —CH=CH—, or —C≡C—, and $R^{102}$, $R^{103}$, $R^{104}$, and $R^{105}$ each independently represent a hydrogen atom, a fluorine atom, a chlorine atom, a cyano group, or a linear or branched alkyl group having 1 to 20 carbon atoms in which one or more of arbitrary hydrogen atoms in the group may be substituted by a fluorine atom and one —$CH_2$— group or two or more —$CH_2$— groups that are not adjacent to each other each may be independently substituted by —O—, —$OCH_2$—, —$CH_2O$—, —CO—, —COO—, —OCO—, —O—CO—O—, —CO—NH—, —NH—CO—, —CH=CH—COO—, —OCO— group represented by $P^{101}$-$(Sp^{101}$-$X^{101})_{k101}$— (wherein, $P^{101}$ represents a group that undergoes polymerization by radical polymerization, cation polymerization, or anion polymerization, $Sp^{101}$ represents a spacer group, wherein plural $Sp^{101}$ groups, if present, may be the same or different, $X^{101}$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —N=N—, —CH=N—N=CH—, —CF=CF—, —C≡C—, or a single bond, wherein plural $X^{101}$ groups, if present, may be the same or different, and k101 represents an integer of 0 to 10)), and more specifically, the chiral compounds is more preferably a compound represented by the following formula (X-2-1-1) to (X-2-3-2):

[Chem. 47]

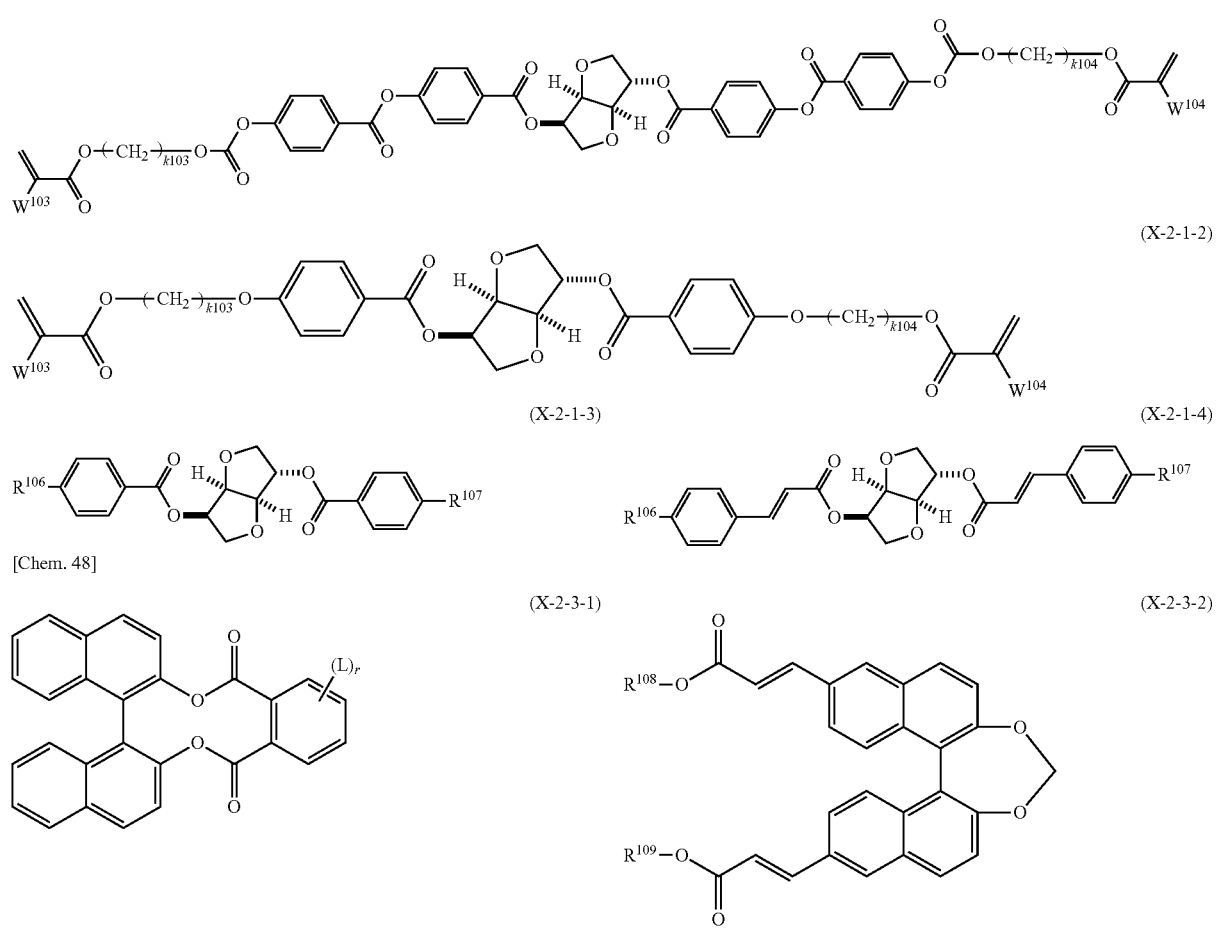

(X-2-1-1)

(X-2-1-2)

(X-2-1-3)

(X-2-1-4)

[Chem. 48]

(X-2-3-1)

(X-2-3-2)

—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —CF=CF—, or —C≡C—, or $R^{102}$, $R^{103}$, $R^{104}$, and $R^{105}$ each independently represent a (wherein, L represents the same meaning as in L in the general formula (I), r represents an integer of 0 to 4, $W^{103}$ and $W^{104}$ each independently represent a hydrogen atom, a methyl group, a trifluoromethyl group, or a fluorine atom, k103 and k104 represent an integer of 2 to 10, $R^{106}$ and $R^{107}$ represent a hydrogen atom, an alkyl group having 1 to 10 carbon atoms, or an alkoxy group having 1 to 10 carbon atoms, and $R^{108}$ and $R^{109}$ represent an alkyl group having 1 to 10 carbon atoms).

To the polymerizable composition used in production of the optical film of the present invention, a polymerizable compound that has no liquid crystal property may be added to the extent that does not largely impair the liquid crystal property of the composition. Specifically, any compound that is known as a polymer-forming monomer or a polymer-forming oligomer in the art may be used with no limitation. Specific examples include compounds listed in "Hikari-kouka gijutu detabukku, zairyo-hen (Photocuring technique data book, Material eddition)(monoma, origoma, hikari-jugo-kaishizai (monomer, oligomer, photoinitiator)" (supervised by ICHIMURA Kunihiro and KATOU Kiyoshi, TECHNONET Co., Ltd.).

While the polymerizable composition to be used in production of the optical film of the present invention can be polymerized without a photoinitiator, the photoinitiator may be added depending on the purpose. In this case, the concentration of the photoinitiator is preferably 0.1 parts by mass to 15 parts by mass relative to 100 parts by mass of the total amount of the polymerizable compound used in production of the optical film, more preferably 0.2 parts by mass to 10 parts by mass, and further preferably 0.4 parts by mass to 8 parts by mass. Examples of the photoinitiator include a benzoin ether, a benzophenone, an acetophenone, a benzylketal, and an acylphosphine oxide. Specific examples of the photoinitiator include 2-methyl-1-(4-methylthiophenyl)-2-morpholinopropan-1-one (IRGACURE 907) and [1-[4-(phenylthio)benzoyl]heptylidene]amino benzoate (IRGACURE OXE 01). As a thermal polymerization initiator, an azo compound and a peroxide are exemplified. Specific example of the thermal polymerization initiator include 2,2'-azobis(4-methoxy-2,4-dimethylvaleronitrile) and 2,2'-azobis(isobutyronitrile). One polymerization initiator may be used or two or more polymerization initiators may be used in combination.

To the polymerizable composition used in production of the optical film of the present invention, a stabilizer may be added for enhancing the storage stability. Examples of the usable stabilizer include a hydroquinone, a hydroquinone monoalkyl ether, a tert-butyl catechol, a pyrogallol, a thiophenol, a nitro compound, a β-naphthylamine, a β-naphthol, and a nitroso compound. The addition amount of the stabilizer, if used, is preferably in the range of 0.005 parts by mass to 1 parts by mass relative to 100 parts by mass of the total amount of the polymerizable compounds used in production of the optical film, more preferably 0.02 parts by mass to 0.8 parts by mass, and further preferably 0.03 parts by mass to 0.5 parts by mass. One stabilizer may be used or two or more stabilizers may be used in combination. As the stabilizer, specifically preferred is a compound represented by the formulae (X-13-1) to (X-13-35):

[Chem. 49]

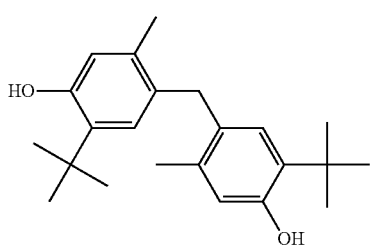

(X-13-1)

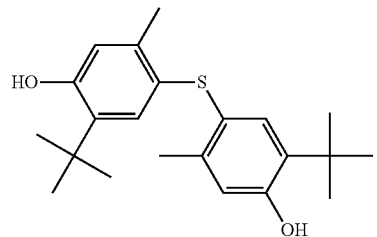

(X-13-2)

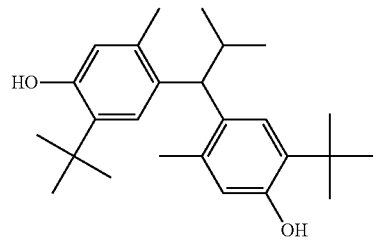

(X-13-3)

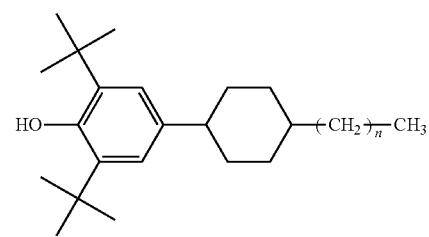

(X-13-4)

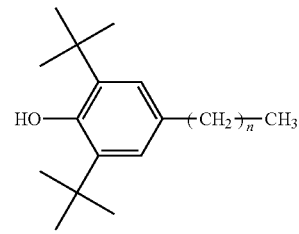

(X-13-5)

[Chem. 50]

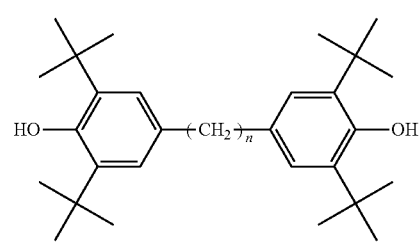

(X-13-6)

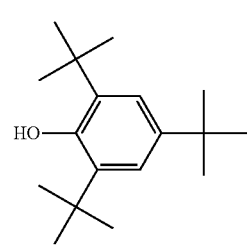

(X-13-7)

(X-13-8)
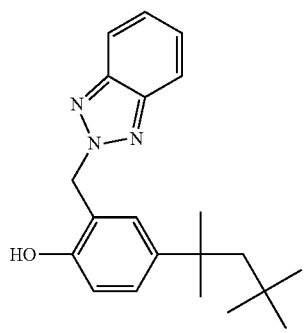
(X-13-9)
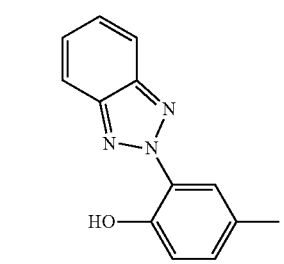
(X-13-10)
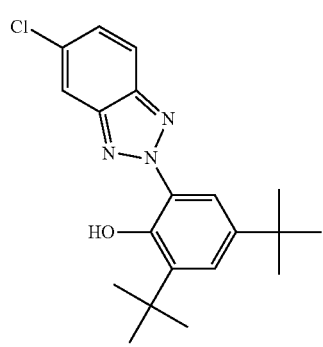
[Chem. 51]
(X-13-11)
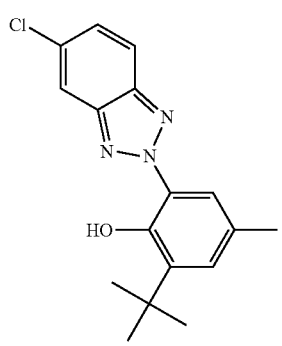
(X-13-12)
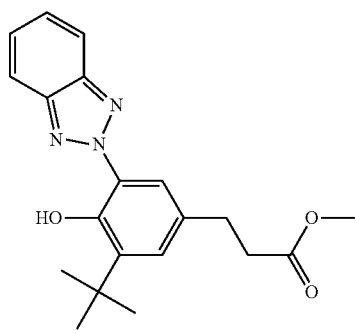
(X-13-13)
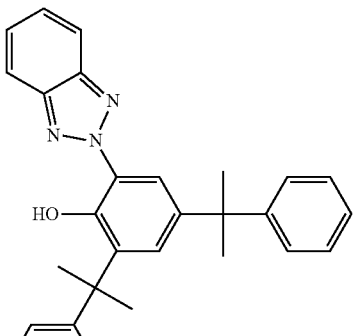
(X-13-14)
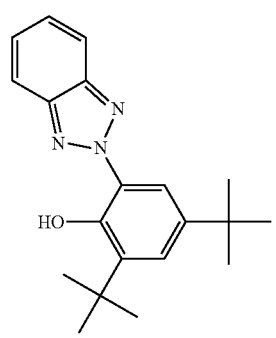
(X-13-15)
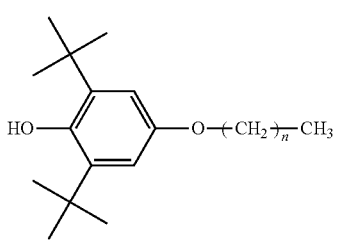
[Chem. 52]
(X-13-16)
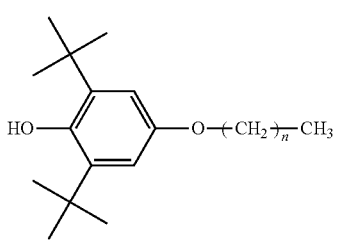
(X-13-17)
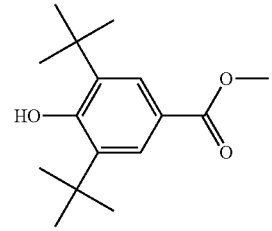

(X-13-18)
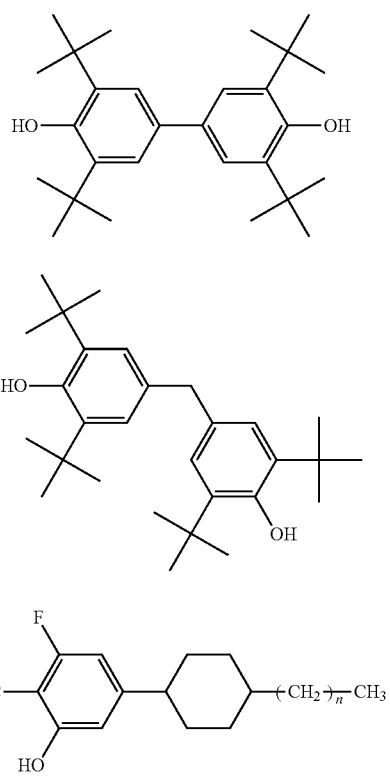
(X-13-19)
(X-13-20)
[Chem. 53]
(X-13-21)
(X-13-22)
(X-13-23)
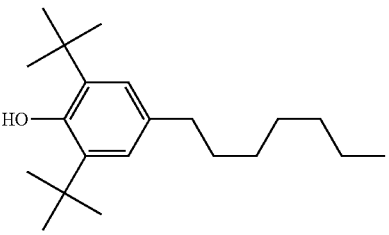
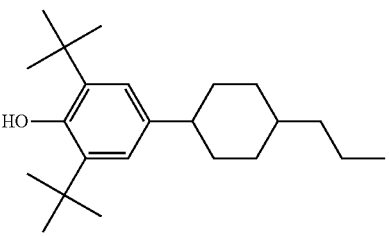
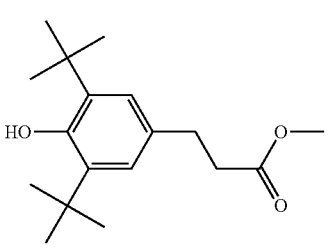
(X-13-24)
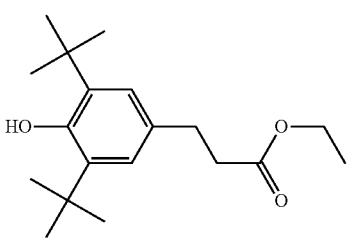
(X-13-25)
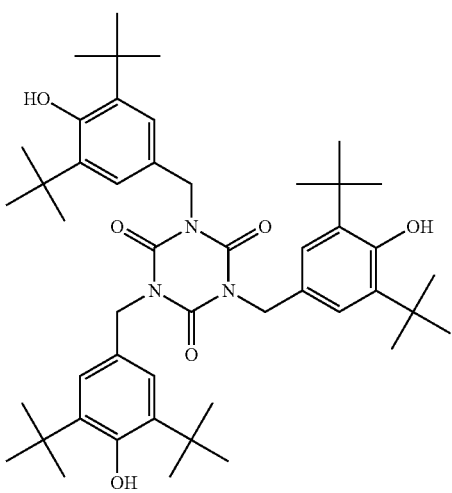
[Chem. 54]
(X-13-26)
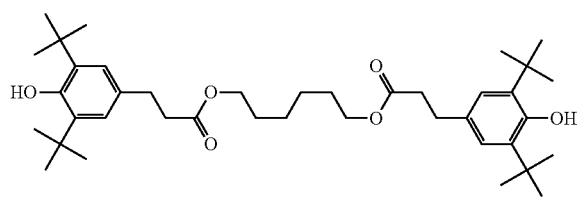
(X-13-27)
(X-13-28)

(X-13-29)

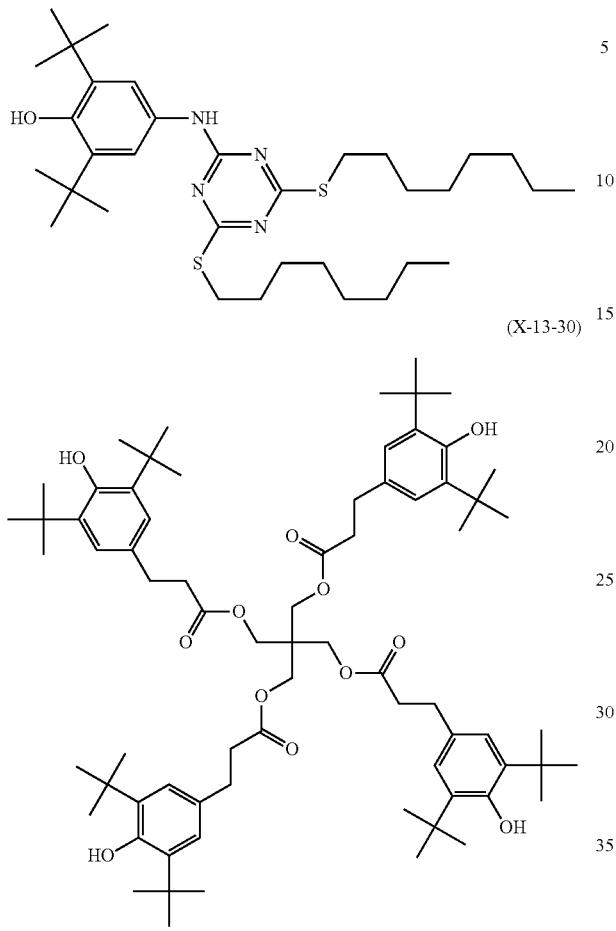

[Chem. 55]

(X-13-30)

(X-13-31)

(X-13-32)

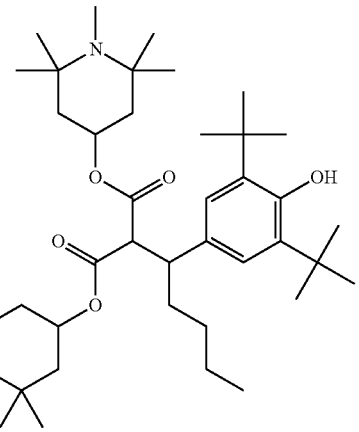

(X-13-33)

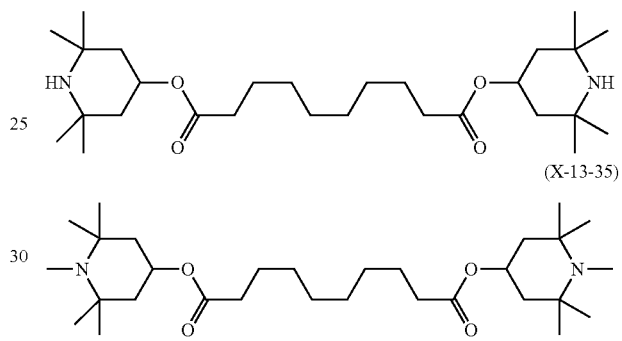

(X-13-34)

(X-13-35)

(wherein n represents an integer of 0 to 20).

In addition, to the polymerizable composition used in production of the optical film of the present invention, in the case of being used for an application in a film, an optical element, a functional pigment, a medicine, a cosmetic, a coating agent, a synthetic resin, and the like, a metal, a metal complex, a dye, a pigment, a colorant, a fluorescent material, a phosphorescent material, a surfactant, a leveling agent, a thixotropic agent, a gelling agent, a polysaccharide, a UV absorber, an infrared absorber, an antioxidant, an ion exchange resin, a metal oxide such as titanium oxide, etc. may be added depending on the purpose.

The polymer that can be obtained by polymerizing the polymerizable composition to be used in production of the optical film of the present invention may be used for a variety of applications. For example, a polymer obtained by polymerizing the polymerizable composition used in production of the optical film of the present invention without aligning the composition can be used as a light scattering plate, a depolarization plate, and a moire fringe prevention plate. A polymer obtained by aligning and then polymerizing the composition has optical anisotropy, which is useful. Such optical isomers can be produced, for example, in such a manner that the polymerizable composition used in production of the optical film of the present invention is supported on a substrate subjected to a rubbing treatment with a fabric or the like, a substrate having an organic thin film formed thereon, or a substrate including an aligned film having $SiO_2$ deposited obliquely, or interposed between the substrates, and then the polymerizable composition is polymerized.

Examples of a method for supporting the polymerizable composition on the substrate include spin coating, die coating, extrusion coating, roll coating, wire bar coating, gravure coating, spray coating, dipping, and printing method. In coating, an organic solvent may be added to the polymerizable liquid crystal composition. As the organic solvent, a hydrocarbon solvent, a halogenated hydrocarbon solvent, an ether solvent, an alcohol solvent, a ketone solvent, an ester solvent, and an aprotic solvent can be used, and examples include: toluene and hexane as the hydrocarbon solvent; methylene chloride as the halogenated hydrocarbon solvent; tetrahydrofuran, acetoxy-2-ethoxyethane, and propylene glycol monomethyl ether acetate as the ether solvent; methanol, ethanol, and isopropanol as the alcohol solvent; acetone, methyl ethyl ketone, cyclohexanone, γ-butyrolactone, and N-methylpyrrolidinone as the ketone solvent; ethyl acetate and cellosolve as the ester solvent; and dimethylformamide and acetonitrile as the aprotic solvent. The solvents may be used alone or in combination, and may be appropriately selected by taking the vapor pressure and the solubility of the polymerizable composition into consideration. As a method for vaporizing the added organic solvent, natural dry, dry with heat, dry with reduced pressure, and dry with heat and reduced pressure may be used. For further enhancing application property of the polymerizable liquid crystal material, it is efficient to provide an intermediate layer such as a polyimide thin film on a substrate or to add a leveling agent to the polymerizable liquid crystal material. The method of providing an intermediate layer such as a polyimide thin film on the substrate is effective since adhesiveness between the substrate and the polymer obtained by polymerizing the polymerizable liquid crystal material is increased.

Other alignment treatments than the above include one utilizing fluid flow alignment of a liquid crystal material and one utilizing electric field or magnetic field. The alignment means may be used alone or in combination. Furthermore, as an alignment method that can replace rubbing, a photo-alignment method may be used. The substrate may have a shape of, aside from a flat plate, a curved surface as a constituting part. As a material forming the substrate, any material may be used regardless of organic or inorganic. Examples of an organic material as a substrate material include polyethylene terephthalate, polycarbonate, polyimide, polyamide, poly(methyl methacrylate), polystyrene, poly(vinyl chloride), polytetrafluoroethylene, polychlorotrifluoroethylene, polyallylate, polysulfone, triacetylcellulose, cellulose, and poly(ether ether ketone), and examples of the inorganic material include silicon, glass, and calcite.

When the polymerizable composition used in production of the optical film of the present invention is polymerized, since it is desired that the polymerization proceeds rapidly, the composition is preferably polymerized by a method of irradiating the composition with an active energy ray such as an ultraviolet ray or an electron beam. When an ultraviolet ray is used, a polarized light source or a non-polarized light source may be used. When the liquid crystal composition is polymerized in a state where the composition is interposed between two substrates, at least a substrate on the irradiated side must have appropriate transparency to the active energy ray. Furthermore, a method may be used in which after a certain part of the composition is polymerized using a mask during irradiation with light, conditions such as the electric field, magnetic field, and temperature are changed, whereby the alignment state of the non-polymerized part is changed, and further irradiation with an active energy ray is performed to effect polymerization. The temperature during irradiation is preferably within a range that can maintain the liquid crystal state of the polymerizable composition used in production of the optical film of the present invention. In particular, in the case of producing an optical isomer by photopolymerization, the polymerization is preferably performed at a temperature as close to room temperature as possible, that is, typically a temperature of 25° C., also in terms of avoiding induction of unintended heat polymerization. The intensity of the active energy ray is preferably 0.1 mW/cm$^2$ to 2 W/cm$^2$. In the case of an intensity of 0.1 mW/cm$^2$ or less, it takes a huge period of time to complete the photopolymerization, leading to deterioration of productivity, and in the case of 2 W/cm$^2$ or more, the polymerizable crystal compound or the polymerizable composition is possibly degraded.

The optical isomer obtained by polymerization may be subjected to heat treatment for the purpose of reducing initial variation in characteristics to achieve stable development of the characteristics. The temperature of the heat treatment is preferably within the range of 50 to 250° C., and the time for the heat treatment is preferably in the range of 30 seconds to 12 hours.

The optical isomer produced by the above method may be used alone after being peeled from the substrate or may be used without being peeled. In addition, the obtained optical isomer may be laminated or bonded with another substrate before use.

EXAMPLES

Hereinunder, the present invention will be described with reference to examples, but the present invention is not limited to the examples. In addition, "%" in the compositions of the Examples and Comparative Examples below means "% by mass". When handling a substance susceptible to oxygen and/or moisture in each step, the operation is preferably conducted in an inert gas such as nitrogen gas and argon gas. An ordinary post-treatment refers to an operation that is generally conducted by persons skilled in the art for obtaining an intended compound from the reaction liquid, such as quenching of the reaction, liquid separation, extraction, neutralization, washing, drying, and concentration.

(Synthesis Example 1) Production of Mixture (A-1) Composed of Compounds Represented by the Formulae (A-1-1) to (A-1-3)

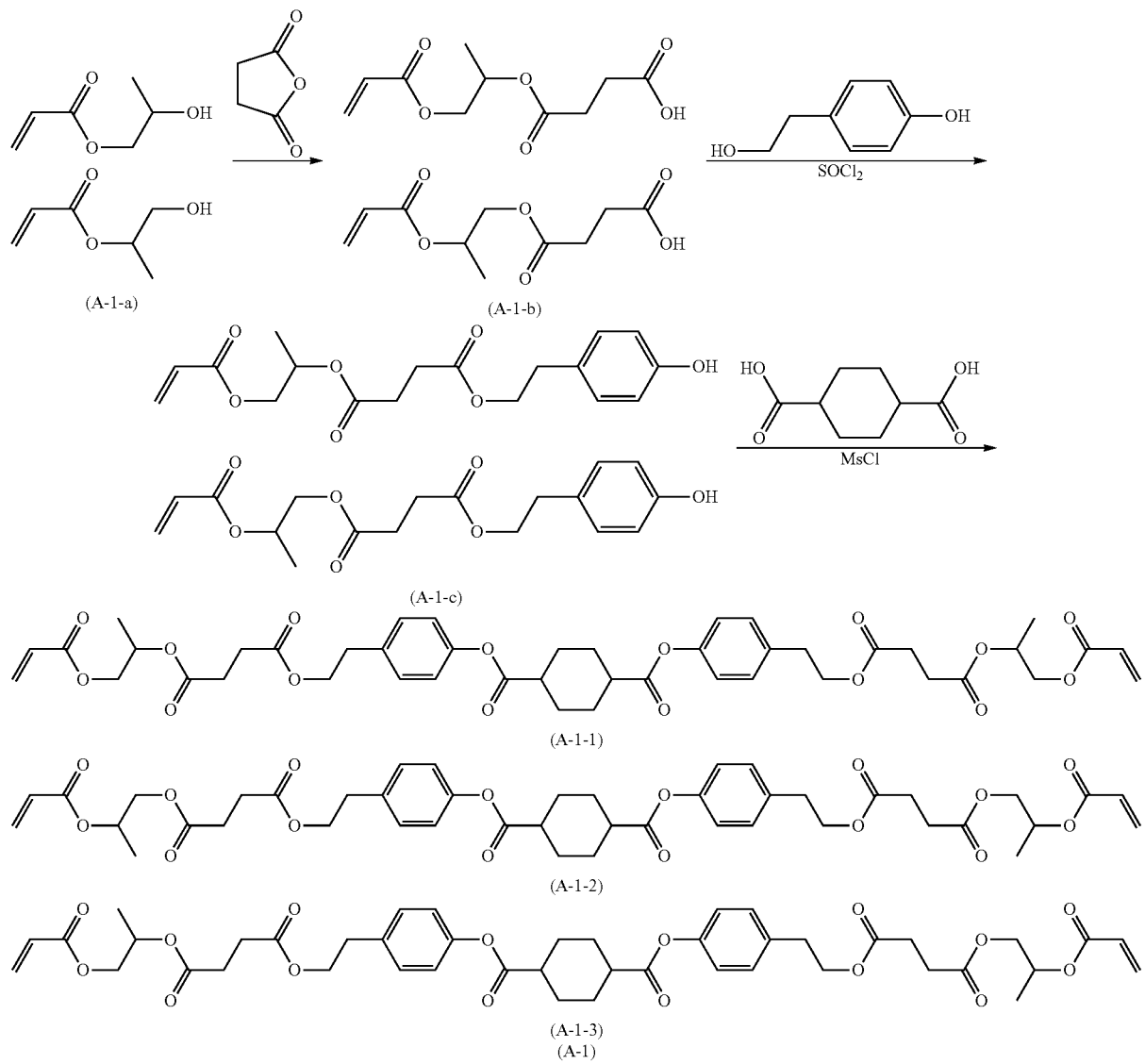

Into a reaction vessel, 5.0 g of compounds (mixture) represented by the formula (A-1-a), 4.2 g of succinic anhydride, 0.5 g of N,N-dimethylaminopyridine, 25 mg of 2,6-di-tert-butyl-4-methylphenol, and 40 mL of dichloromethane were added and stirred with heat at 40° C. for 12 hours. The resultant was cooled, 40 mL of water was added, and the mixture was stirred at room temperature for 1 hour. After a liquid separation treatment, the resultant was sequentially washed with 5% hydrochloric acid and a saturated saline solution. After drying over sodium sulfate, the solvent was removed by distillation, thereby yielding 8.4 g of compounds (a mixture) represented by the formula (A-1-b).

Into a reaction vessel, 8.4 g of the compounds (mixture) represented by the formula (A-1-b), 42 mg of 2,6-di-tert-butyl-4-methylphenol, 24 mL of ethyl acetate, and 8 mL of N,N-dimethylacetamide were added. The mixture was cooled to 5° C., 4.6 g of thionyl chloride was dropwise added, and the mixture was stirred at 5° C. for 1 hour. A solution in which 5.0 g of 2-(4-hydroxyphenyl)ethanol was dissolved in 25 mL of N,N-dimethylacetamide was dropwise added and the mixture was stirred at room temperature for 12 hours. The reaction liquid was poured into water, extracted with ethyl acetate, and then sequentially washed with 5% hydrochloric acid, water, and a saline solution. After drying over sodium sulfate, the solvent was removed by distillation, thereby yielding 12.1 g of compounds (a mixture) represented by the formula (A-1-c).

Into a reaction vessel, 1.0 g of trans-1,4-cyclohexane dicarboxylic acid, 1.3 g of methanesulfonic acid chloride, 5 mL of tetrahydrofuran, and 5 mL of N,N-dimethylacetamide were added. Triethylamine 1.2 g was dropwise added and the mixture was stirred at room temperature for 2 hours. A solution in which 4.1 g of the compounds (mixture) represented by the formula (A-1-c) and 20 mg of 2,6-di-tertbutyl-4-methylphenol were dissolved in 12 mL of tetrahydrofuran was added dropwise. Triethylamine 1.2 g was dropwise added and the mixture was stirred at room temperature for 12 hours. The reaction liquid was poured into water, extracted with dichloromethane and sequentially washed with 5% hydrochloric acid and a saline solution. Purification by column chromatography (silica gel, dichloromethane) and recrystallization (dichloromethane/methanol) was performed, thereby yielding compounds (a mixture) represented by the formula (A-1).

LCMS: m/z 837 [M+1]

(Synthesis Example 2) Production of Mixture (A-2) Composed of Compounds Represented by the Formulae (A-2-1) to (A-2-3)

[Chem. 57]

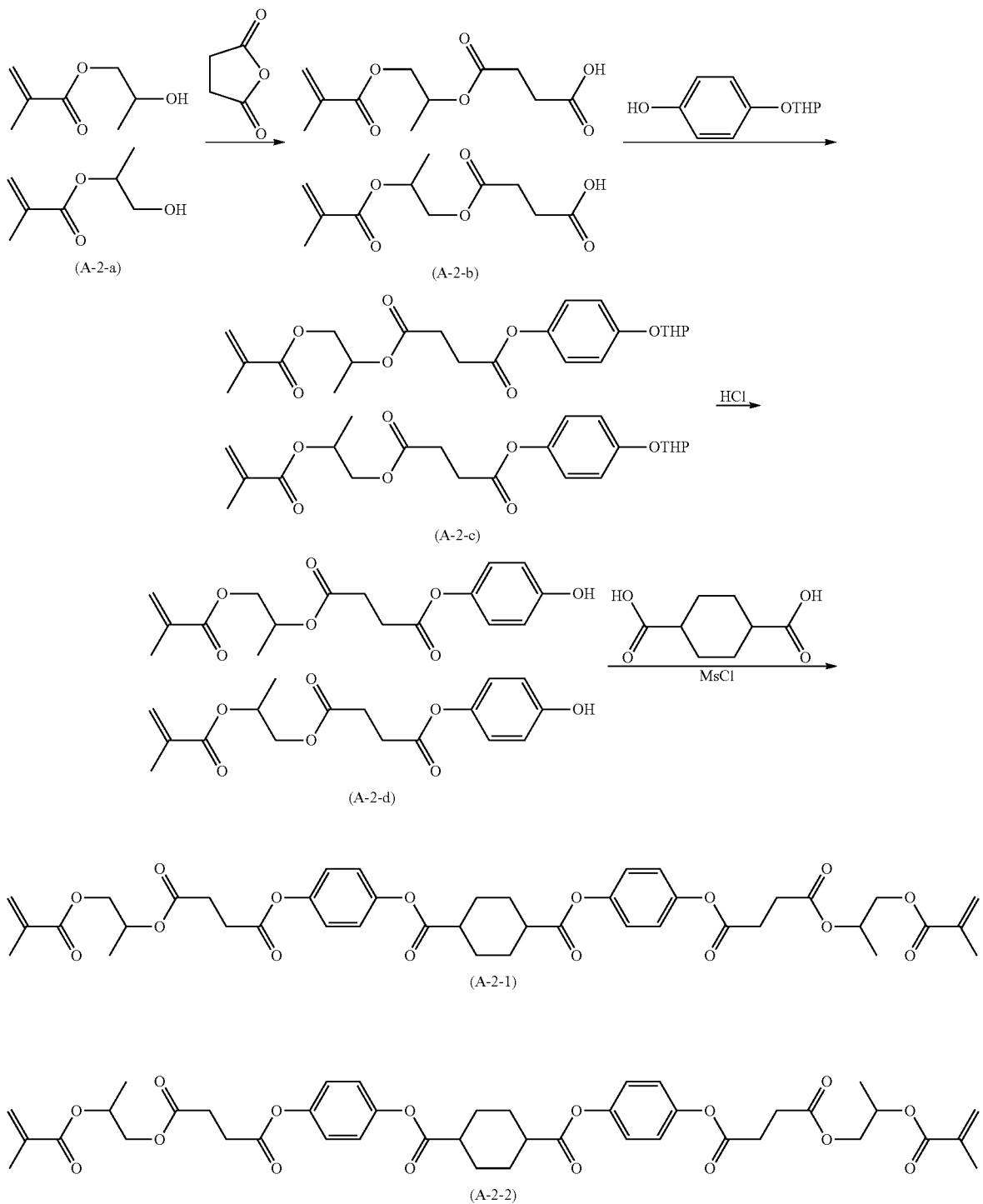

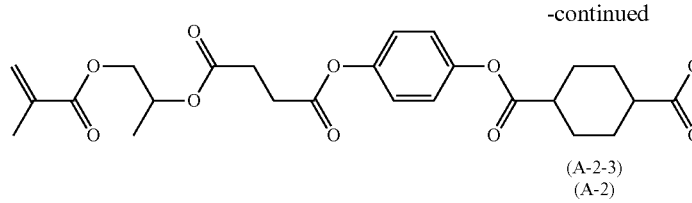
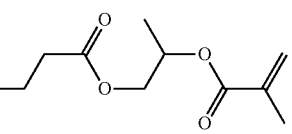

(A-2-3)
(A-2)

Compounds (a mixture) represented by the formula (A-2-b) were produced in the same manner as in Synthesis Example 1, except that the compounds (mixture) represented by the formula (A-1-a) were replaced by compounds (a mixture) represented by the formula (A-2-a).

Under nitrogen atmosphere, into a reaction vessel, 3.0 g of the compounds (mixture) represented by the formula (A-2-b), 2.4 g of 4-tetrahydropyranyloxyphenol, 0.1 g of N,N-dimethylaminopyridine, and 30 mL of dichloromethane were added. While cooling the mixture, 1.7 g of diisopropylcarbodiimide was added dropwise and the mixture was stirred at room temperature for 8 hours. After washing with 1% hydrochloric acid, water, and a saline solution, purification by column chromatography (alumina, dichloromethane) was performed, thereby yielding 4.1 g of compounds (a mixture) represented by the formula (A-2-c).

Into a reaction vessel, 4.1 g of the compounds (mixture) represented by the formula (A-2-c), 20 mL of tetrahydrofuran, and 20 mL of methanol were added. Concentrated hydrochloric acid 0.2 mL was added and the mixture was stirred at room temperature for 8 hours. The resultant was diluted with ethyl acetate, and then washed with water and a saline solution. Purification by column chromatography (silica gel, ethyl acetate) was performed, thereby yielding 3.0 g of compounds (a mixture) represented by the formula (A-2-d).

Compounds (a mixture) represented by the formula (A-2) were produced in the same manner as in Synthesis Example 1, except that the compounds (mixture) represented by the formula (A-1-c) were replaced by the compounds (mixture) represented by the formula (A-2-d).

LCMS: m/z 809 [M+1]

(Synthesis Example 3) Production of Mixture (A-3) Composed of Compounds Represented by the Formulae (A-3-1) to (A-3-3)

[Chem. 58]

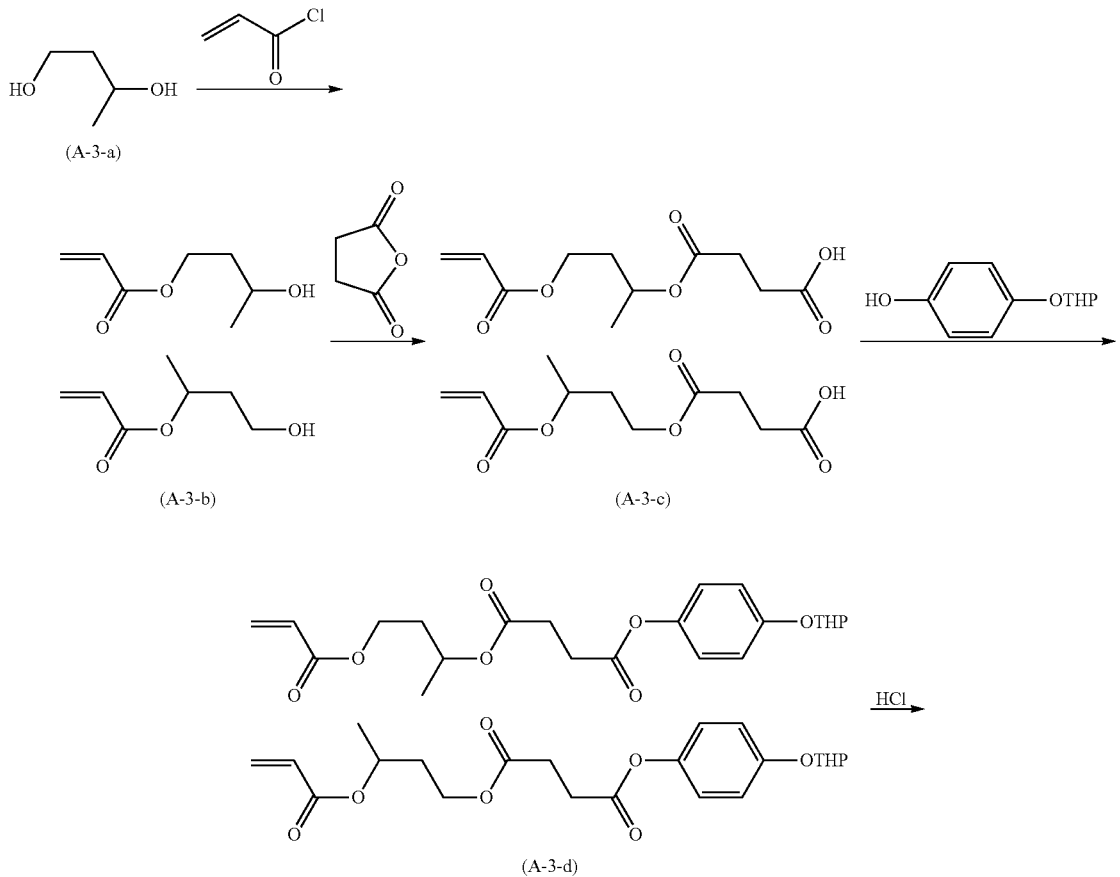

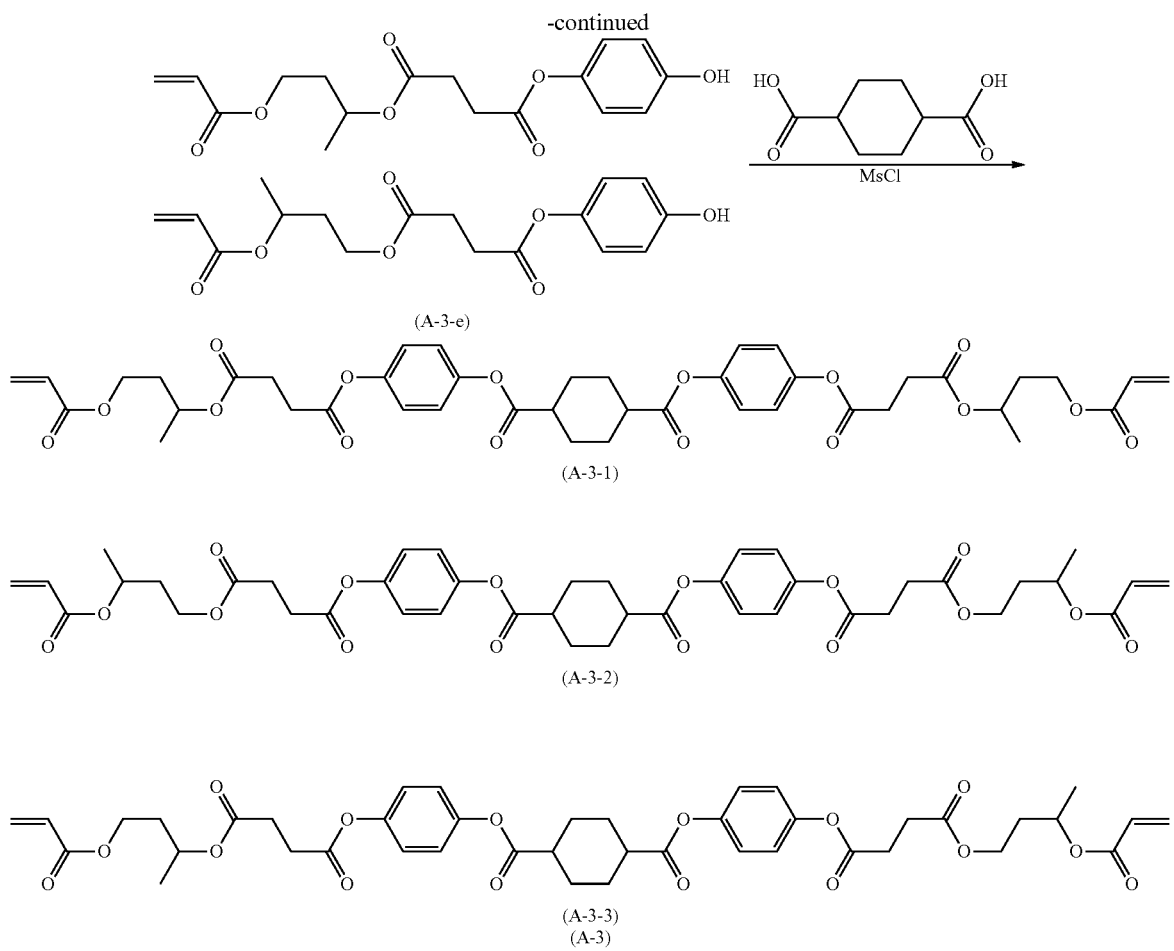

(A-3)

Under nitrogen atmosphere, into a reaction vessel, 20.0 g of a compound represented by the formula (A-3-a), 14.3 g of diisopropylethylamine, and 200 mL of dichloromethane were added. While cooling the mixture with ice, 10.0 g of acryloyl chloride was dropwise added and the mixture was stirred at room temperature for 6 hours. The reaction liquid was poured into water to perform a liquid separation treatment, and then sequentially washed with a mixed solvent of methanol and water and a saline solution. Purification by column chromatography (silica gel, ethyl acetate) was performed, thereby yielding 11.5 g of compounds (a mixture) represented by the formula (A-3-b).

Compounds (a mixture) represented by the formula (A-3) were produced in the same manner as in Synthesis Example 2, except that the compounds (mixture) represented by the formula (A-2-a) were replaced by the compounds (mixture) represented by the formula (A-3-b).

LCMS: m/z 809 [M+1]

(Synthesis Example 4) Production of Compound Represented by the Formula (A-4)

[Chem. 59]

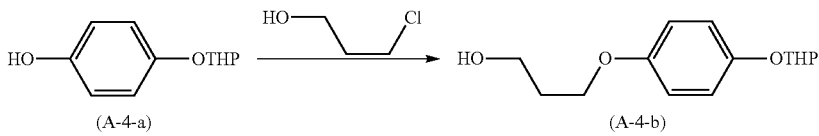

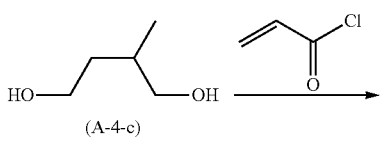

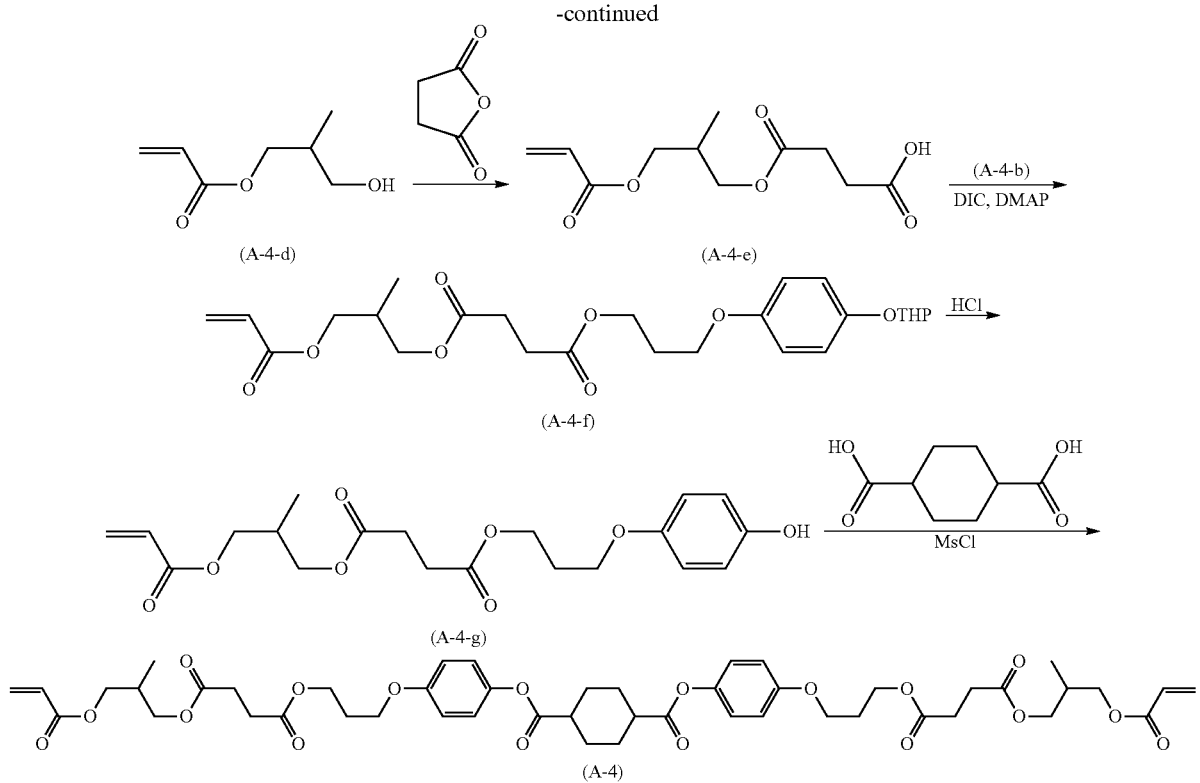

Into a reaction vessel, 5.0 g of a compound represented by the formula (A-4-a), 2.4 g of 3-chloropropanol, 5.3 g of potassium carbonate, and 40 mL of N,N-dimethylformamide were added, and stirred with heat at 90° C. for 12 hours. The mixture was cooled, poured into water, and then extracted with ethyl acetate. The resultant was sequentially washed with water and a saline solution. Purification by column chromatography (alumina, ethyl acetate) was performed, thereby yielding 5.2 g of a compound represented by the formula (A-4-b).

A compound represented by the formula (A-4) was produced in the same manner as in Synthesis Example 3, except that the compound represented by the formula (A-3-a) was replaced by a compound represented by the formula (A-4-c).

LCMS: m/z 925 [M+1]

(Synthesis Example 5) Production of Mixture (A-5) Composed of Compounds Represented by the Formulae (A-5-1) to (A-5-3)

[Chem. 60]

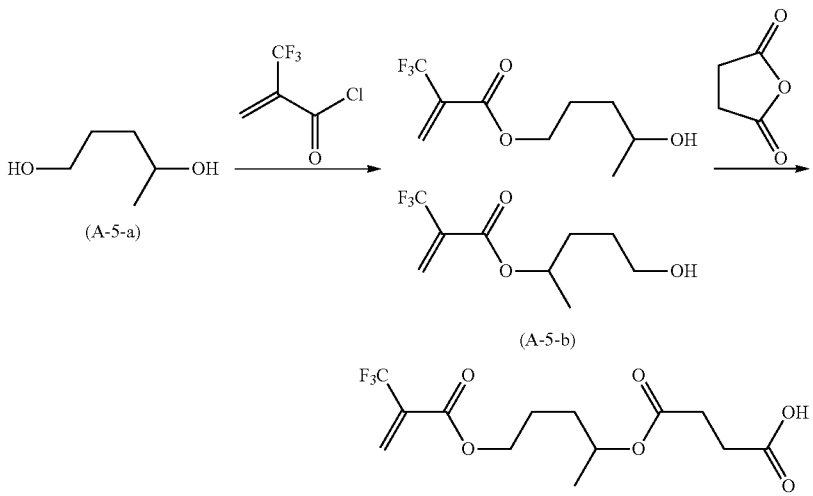

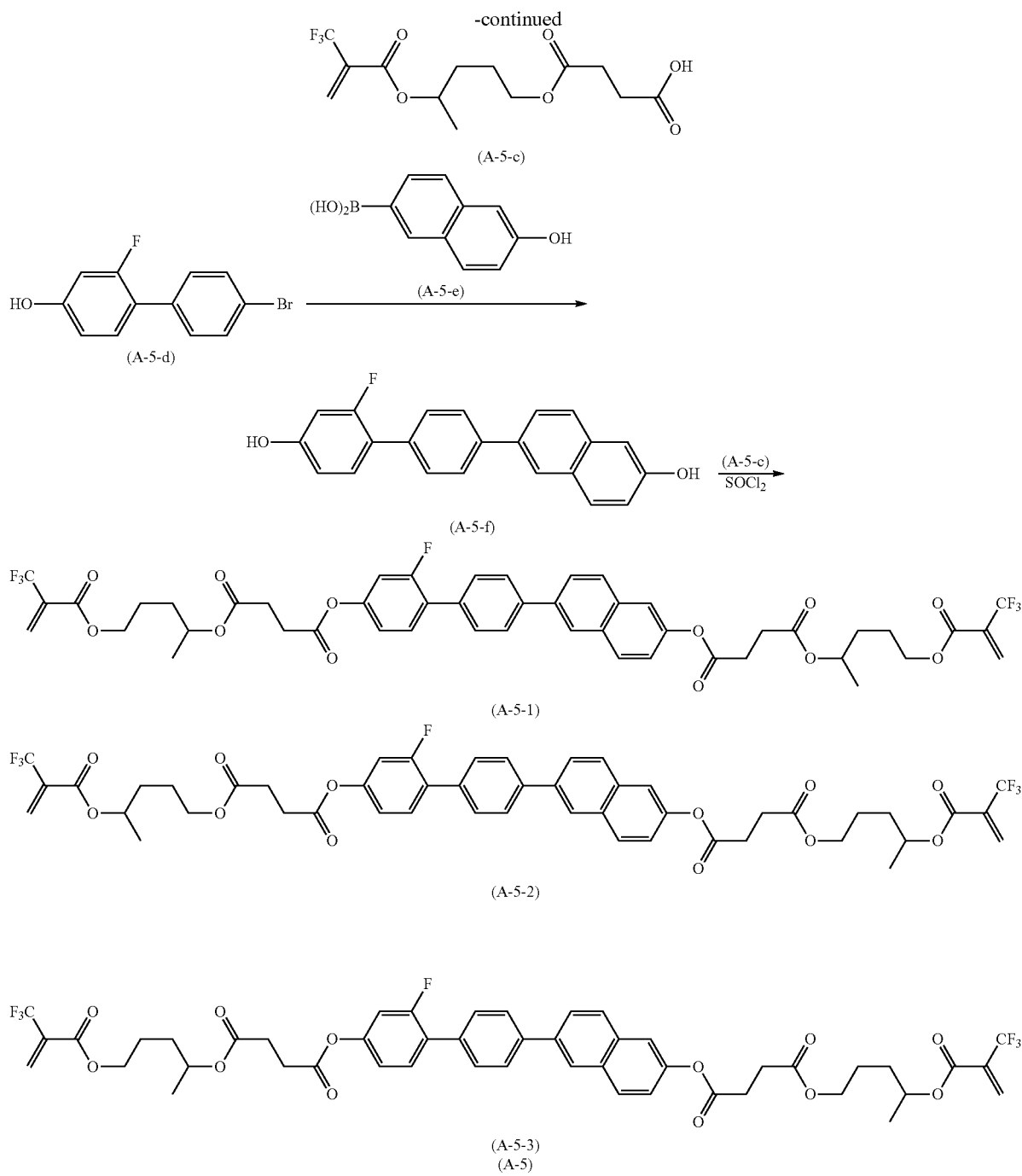

Compounds (a mixture) represented by the formula (A-5-c) were produced in the same manner as in Synthesis Example 3, except that the compound represented by the formula (A-3-a) was replaced by a compound represented by the formula (A-5-a).

Under nitrogen atmosphere, into a reaction vessel, 5.0 g of a compound represented by the formula (A-5-d), 3.5 g of a compound represented by the formula (A-5-e), 3.9 g of potassium carbonate, 50 mL of ethanol, 30 mL of water, and 0.4 g of tetrakis(triphenylphosphine)palladium (0) were added, and refluxed with heat for 12 hours. The resultant was cooled, then diluted with ethyl acetate, and washed with 5% hydrochloric acid, water, and a saline solution. Purification by column chromatography (alumina, ethyl acetate) and recrystallization (toluene/ethanol) was performed, thereby yielding 4.3 g of a compound represented by the formula (A-5-f).

Compounds (a mixture) represented by the formula (A-5) were produced in the same manner as in Synthesis Example 1, except that the compounds (mixture) represented by the formula (A-1-b) were replaced by the compounds (mixture) represented by the formula (A-5-c) and that 2-(4-hydroxyphenyl) ethanol was replaced by the compound represented by the formula (A-5-f).

LCMS: m/z 947 [M+1]

(Synthesis Example 6) Production of Mixture (A-6) Composed of Compounds Represented by the Formulae (A-6-1) to (A-6-3)
[Chem. 61]
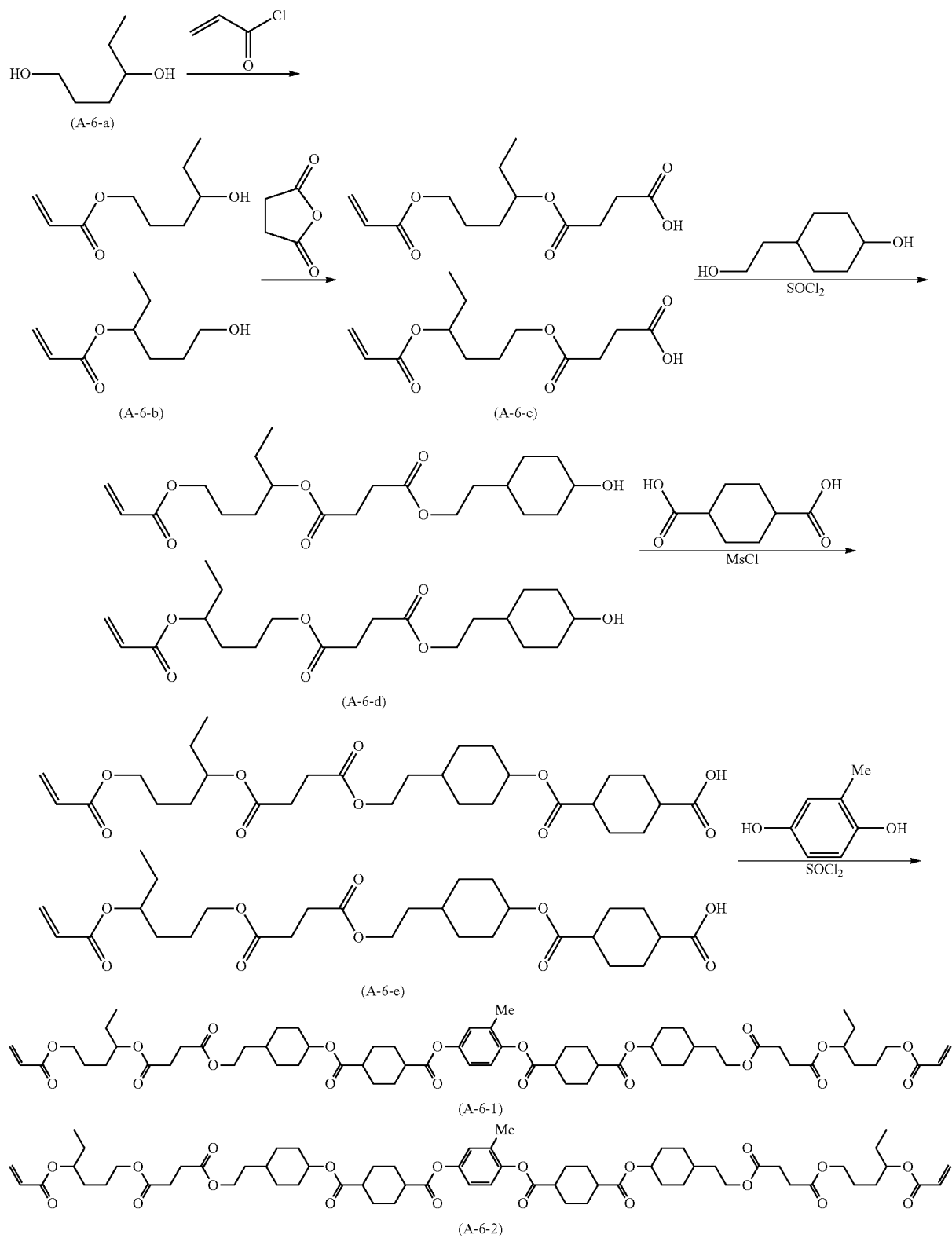

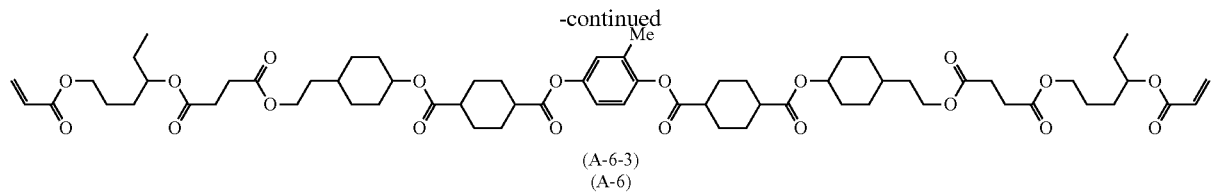

(A-6-3)
(A-6)

Compounds (a mixture) represented by the formula (A-6-c) were produced in the same manner as in Synthesis Example 3, except that the compound represented by the formula (A-3-a) was replaced by a compound represented by the formula (A-6-a).

Compounds (a mixture) represented by the formula (A-6-d) were produced in the same manner as in Synthesis Example 1, except that the compounds represented by the formula (A-1-b) were replaced by the compounds (mixture) represented by the formula (A-6-c) and that 2-(4-hydroxyphenyl) ethanol was replaced by trans-4-(2-hydroxyethyl) cyclohexanol.

Into a reaction vessel, 9.0 g of trans-1,4-cyclohexane dicarboxylic acid, 2.0 g of methanesulfonic acid chloride, 20 mL of tetrahydrofuran, and 20 mL of N, N-dimethylacetamide were added. Triethylamine 1.8 g was added dropwise and the mixture was stirred at room temperature for 2 hours. A solution in which 6.3 g of the compounds (mixture) represented by the formula (A-6-d) and 20 mg of 6-di-tert-butyl-4-methylphenol were dissolved in 12 mL of tetrahydrofuran was added dropwise. After 0.6 g of N,N-dimethylaminopyridine was added, 1.8 g of triethylamine was added dropwise and the mixture was stirred at room temperature for 12 hours. The reaction liquid was poured into water, extracted with ethyl acetate, and sequentially washed with 5% hydrochloric acid and a saline solution. Purification by column chromatography (silica gel, ethyl acetate) and recrystallization (ethyl acetate/hexane) was performed, thereby yielding 6.8 g of compounds (a mixture) represented by the formula (A-6-e).

Into a reaction vessel, 6.8 g of compounds (a mixture) represented by the formula (A-6-e), 7 mg of 2,6-di-tert-butyl-4-methylphenol, 35 mL of ethyl acetate, and 14 mL of N,N-dimethylacetamide were added. The mixture was cooled to 5° C., 2.7 g of thionyl chloride was added dropwise and the mixture was stirred at 5° C. for 1 hour. N,N-Diisopropylethylamine 2.0 g was added dropwise. A solution in which 0.9 g of 2-methyl-1,4-hydroquinone was dissolved in 5 mL of tetrahydrofuran and 0.2 g of N,N-dimethylaminopyridine were added. At 5° C., 4.7 g of N,N-diisopropylethylamine was added dropwise and the mixture was stirred at room temperature for 5 hours. The reaction liquid was poured into water, extracted with dichloromethane, and sequentially washed with 5% hydrochloric acid, water, and a saline solution. Purification by column chromatography (silica gel, dichloromethane) and recrystallization (dichloromethane/methanol) was performed, thereby yielding 6.9 g of compounds (a mixture) represented by the formula (A-6).

LCMS: m/z 1193[M+1]

(Synthesis Example 7) Production of Mixture (A-7) Composed of Compounds Represented by the Formulae (A-7-1) to (A-7-3)

[Chem. 62]

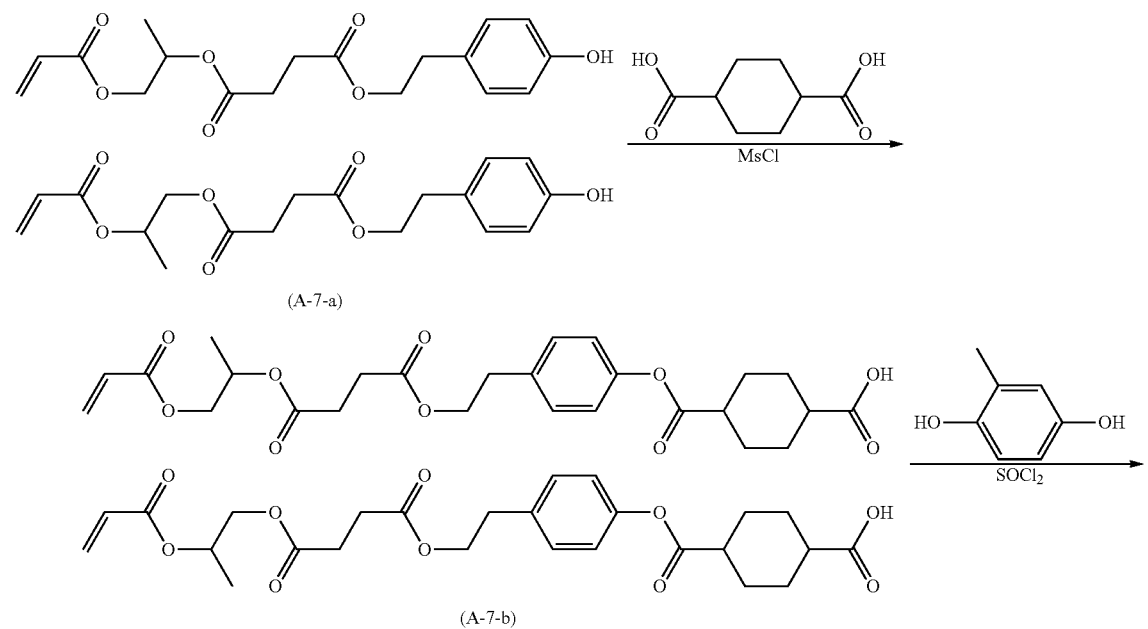

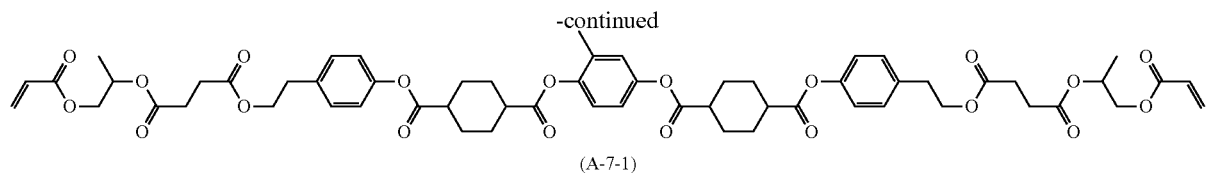
(A-7-1)

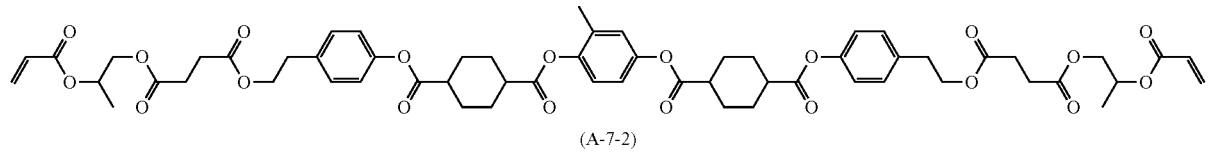
(A-7-2)

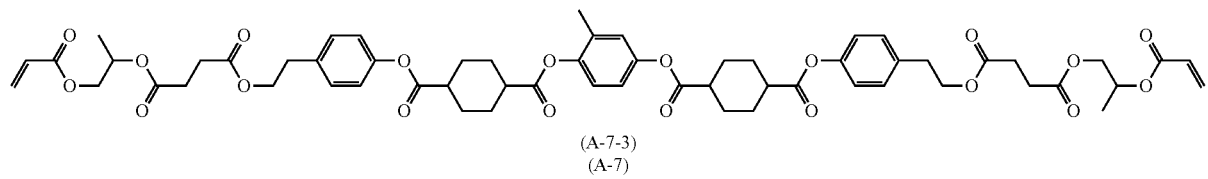
(A-7-3)
(A-7)

Compounds (a mixture) represented by the formula (A-7) were produced in the same manner as in Synthesis Example 6, except that the compounds (mixture) represented by the formula (A-6-d) were replaced by compounds (a mixture) represented by the formula (A-7-a).
LCMS: m/z 1097[M+1]

(Synthesis Example 8) Production of Mixture (A-8) Composed of Compounds Represented by the Formulae (A-8-1) to (A-8-3)

[Chem. 63]

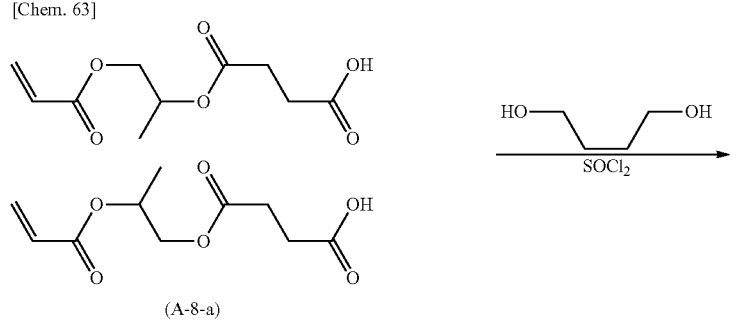
(A-8-a)

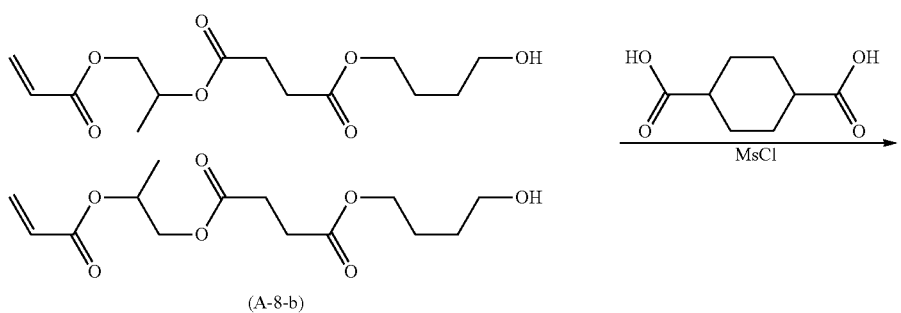
(A-8-b)

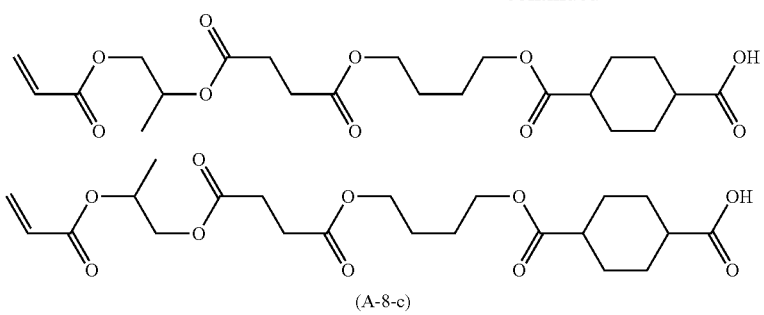

(A-8-c)

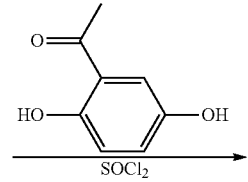

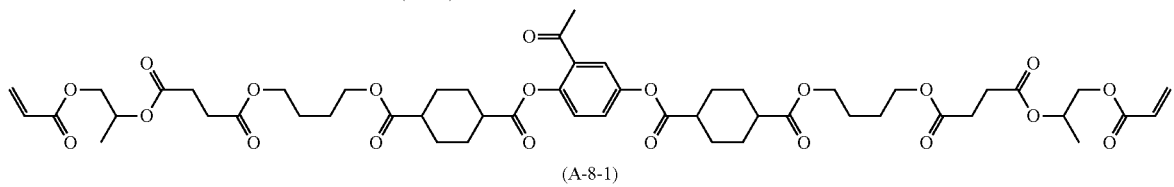

(A-8-1)

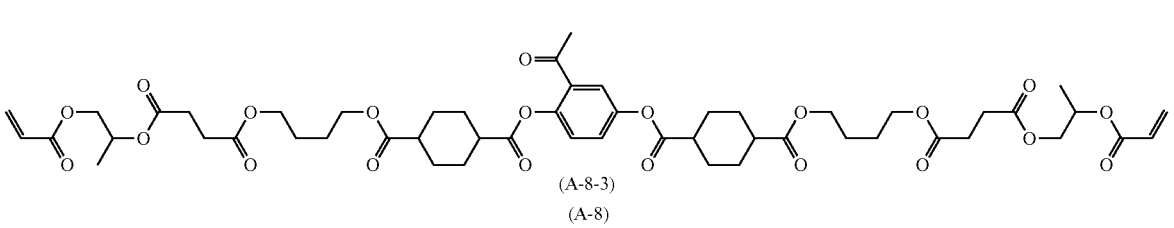

(A-8-2)

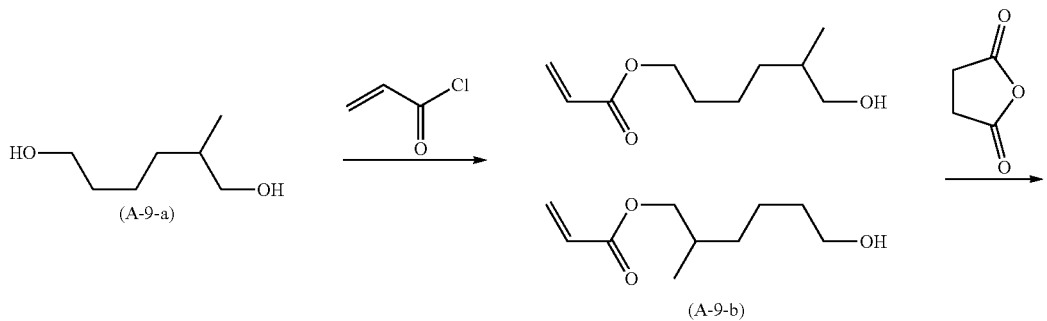

(A-8-3)
(A-8)

Compounds (a mixture) represented by the formula (A-8-b) were produced in the same manner as in Synthesis Example 1, except that 2-(4-hydroxyphenyl) ethanol was replaced by 1,4-butanediol.

Compounds (a mixture) represented by the formula (A-8) were produced in the same manner as in Synthesis Example 6, except that the compounds (mixture) represented by the formula (A-6-d) were replaced by the compounds (mixture) represented by the formula (A-8-b), and that 2-methyl-1,4-hydroquinone was replaced by 2-acetyl-1,4-hydroquinone.

LCMS: m/z 1029 [M+1]

(Synthesis Example 9) Production of Mixture (A-9) Composed of Compounds Represented by the Formulae (A-9-1) to (A-9-3)

[Chem. 64]

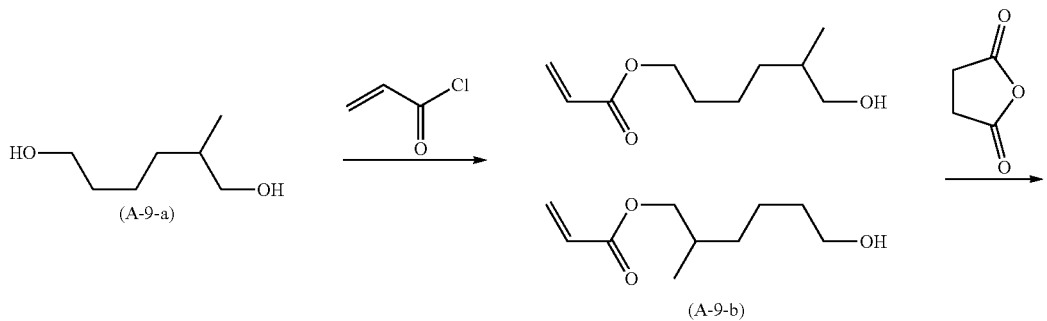

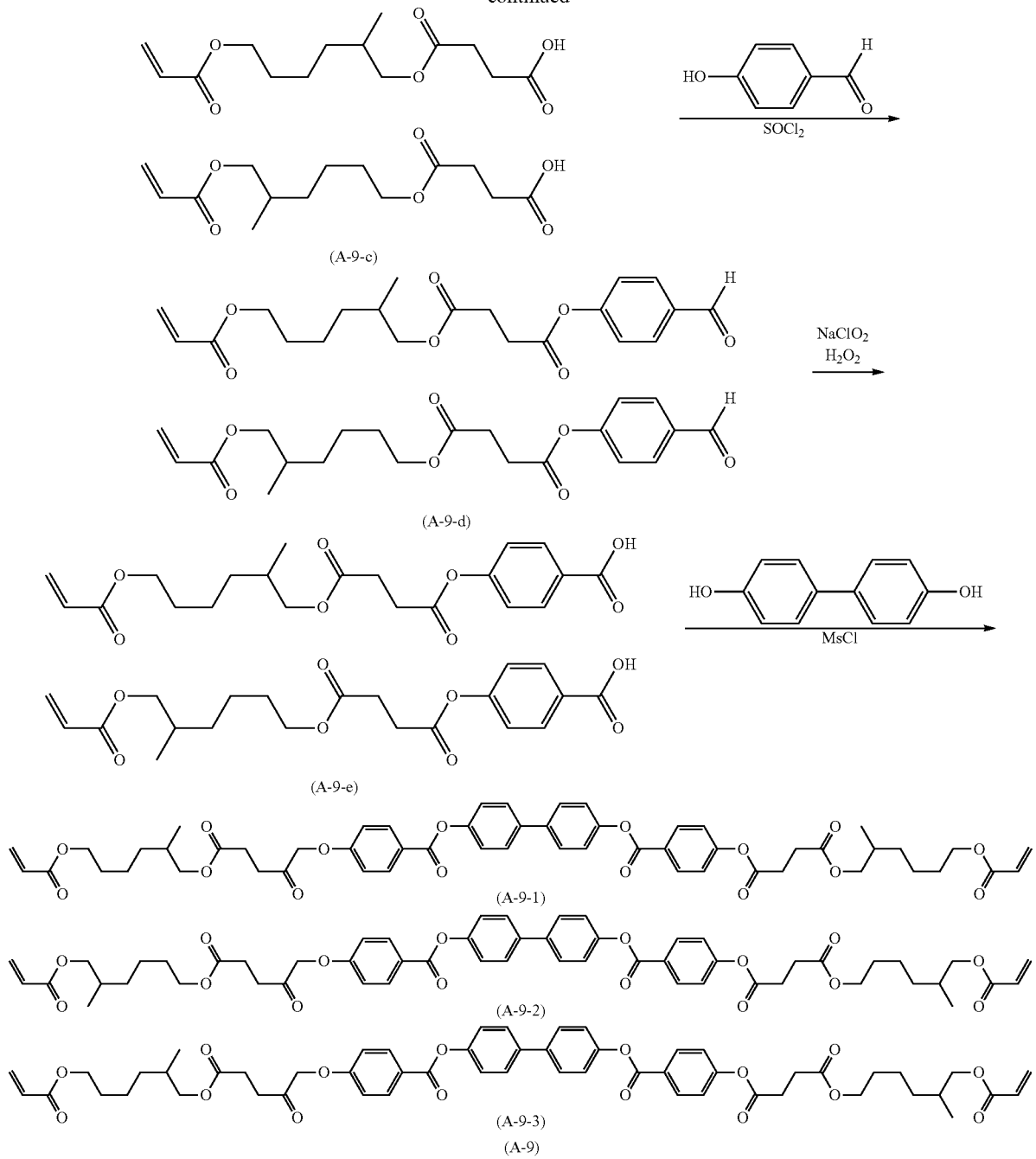

Compounds (a mixture) represented by the formula (A-9-d) were produced in the same manner as in Synthesis Example 3, except that the compound represented by the formula (A-3-a) was replaced by a compound represented by the formula (A-9-a), and that 4-tetrahydropyranyloxyphenol was replaced by 4-hydroxybenzaldehyde.

Into a reaction vessel, 5.0 g of the compounds (mixture) represented by the formula (A-9-d), 20 mL of methanol, an aqueous solution in which 1.6 g of sodium dihydrogen phosphate dihydrate was dissolved in 20 mL of water and 2.3 g of 30% hydrogen peroxide water were added. An aqueous solution in which 1.5 g of sodium chlorite was dissolved in 15 mL of water was added dropwise and the mixture was stirred with heat at 50° C. for 10 hours. The mixture was cooled, and water was added, followed by extraction with ethyl acetate. The resultant was washed with 5% hydrochloric acid and a saline solution, and then dried over sodium sulfate, and the solvent was removed by distillation, thereby yielding 4.2 g of compounds (a mixture) represented by the formula (A-9-e).

Compounds (a mixture) represented by the formula (A-9) were produced in the same manner as in Synthesis Example 1, except that the compounds (mixture) represented by the formula (A-1-c) were replaced by 4,4'-dihydroxybiphenyl, and that trans-1,4-cyclohexane dicarboxylic acid was replaced by the compounds represented by the formula (A-9-e).

LCMS: m/z 963 [M+1]

(Synthesis Example 10) Production of Mixture (A-10) Composed of Compounds Represented by the Formulae (A-10-1) to (A-10-3)
[Chem. 65]
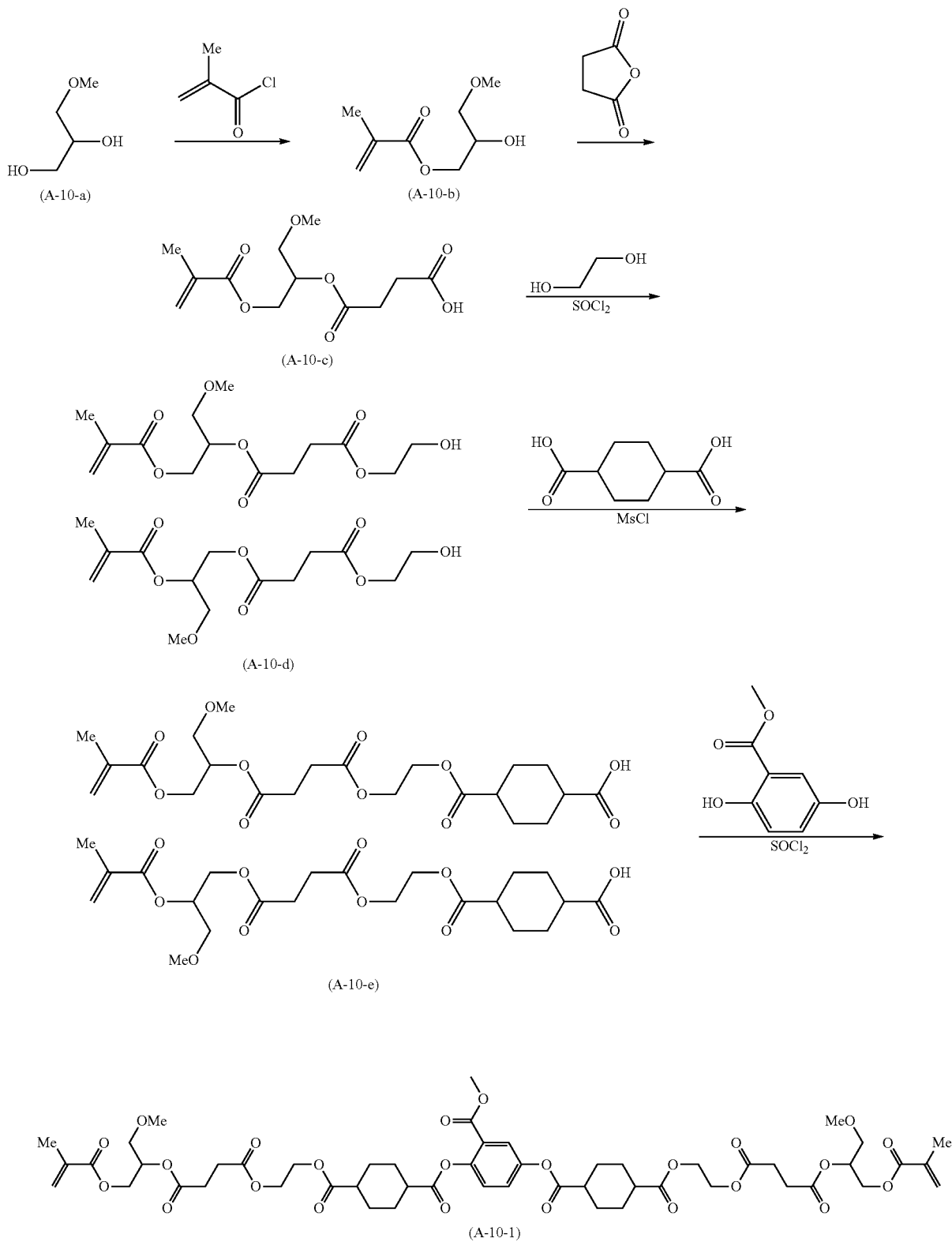

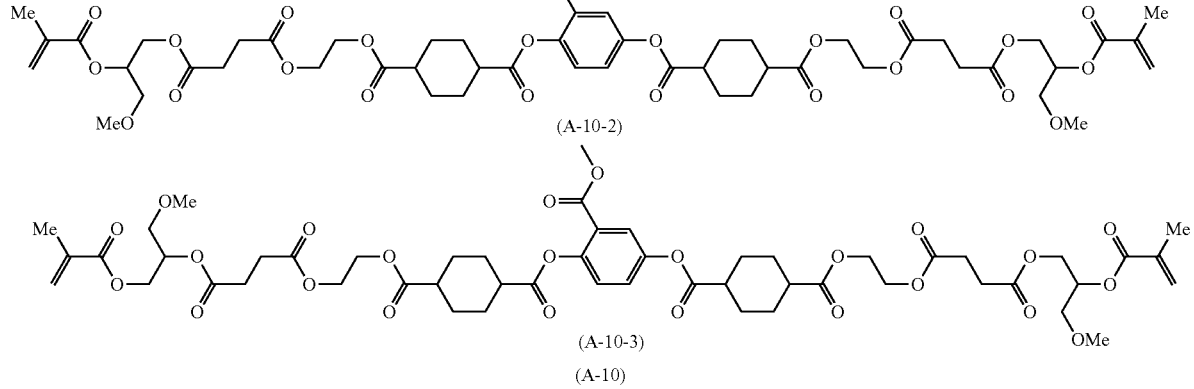

(A-10-2)

(A-10-3)

(A-10)

Compounds (a mixture) represented by the formula (A-10) were produced in the same manner as in Synthesis Example 6, except that the compound represented by the formula (A-6-a) was replaced by a compound represented by the formula (A-10-a), that acryloyl chloride was replaced by methacryloyl chloride, that trans-4-(2-hydroxyethyl)cyclohexanol was replaced by ethylene glycol, and that 2-methyl-1,4-hydroquinone was replaced by methyl 2,5-dihydroxybenzoate.

LCMS: m/z 1077[M+1]

(Synthesis Example 11) Production of Mixture (B-1) Composed of Compounds Represented by the Formulae (B-1-1) and (B-1-2)

Into a reaction vessel, 3.0 g of trans-4-(trans-4-propylcyclohexyl) cyclohexane carboxylic acid, 1.4 g of methanesulfonic acid chloride, 20 mL of tetrahydrofuran, and 20 mL of N, N-dimethylacetamide were added. Triethylamine 1.3 g was added dropwise and the mixture was stirred at room temperature for 2 hours. A solution in which 4.2 g of compounds (a mixture) represented by the formula (B-1-a) and 20 mg of 2,6-di-tert-butyl-4-methylphenol were dissolved in 12 mL of tetrahydrofuran was added dropwise. After 0.6 g of N,N-dimethylaminopyridine was added, 1.5 g of triethylamine was added dropwise and the mixture was stirred at room temperature for 12 hours. The reaction liquid was poured into water, extracted with dichloromethane, and sequentially washed with 5% hydrochloric acid and a saline solution. Purification by column chromatography (silica gel,

[Chem. 66]

(B-1-a)

(B-1-1)

(B-1-2)

(B-1)

dichloromethane) and recrystallization (dichloromethane/methanol) was performed, thereby yielding 4.9 g of compounds (a mixture) represented by the formula (B-1).

LCMS: m/z 585[M+1]

(Synthesis Example 12) Production of Mixture (B-2) Composed of Compounds Represented by the Formulae (B-2-1) and (B-2-2)

[Chem. 67]

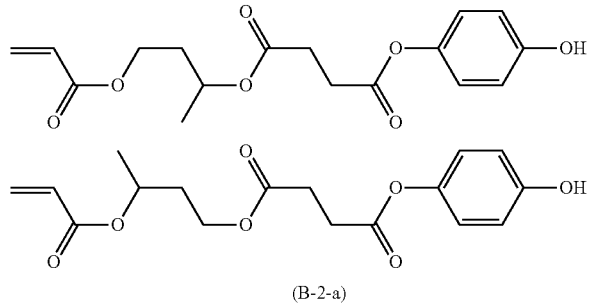

(B-2-a)

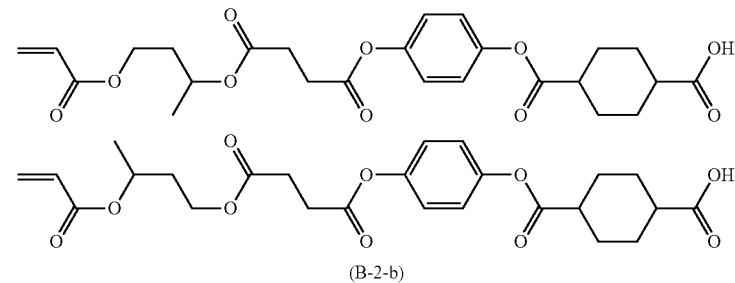

(B-2-b)

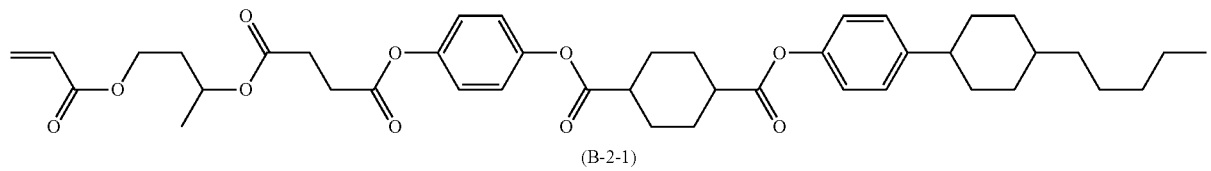

(B-2-1)

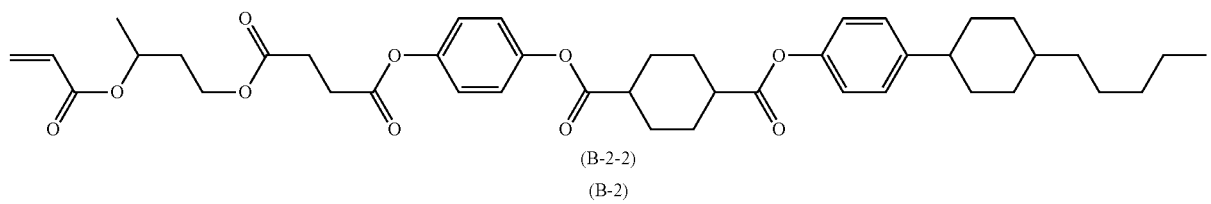

(B-2-2)

(B-2)

Compounds (a mixture) represented by the formula (B-2-b) were produced in the same manner as in Synthesis Example 6, except that the compounds represented by the formula (A-6-d) were replaced by compounds (a mixture) represented by the formula (B-2-a).

Into a reaction vessel, 5.0 g of the compounds (a mixture) represented by the formula (B-2-b), 7 mg of 2,6-di-tert-butyl-4-methylphenol, 35 mL of ethyl acetate, and 14 mL of N,N-dimethylacetamide were added. The mixture was cooled to 5° C., 1.5 g of thionyl chloride was added dropwise, and the mixture was stirred at 5° C. for 1 hour. N,N-Diisopropylethylamine 2.0 g was added dropwise. A solution in which 2.5 g of 4-(trans-4-pentylcyclohexyl)phenol was dissolved in 5 mL of tetrahydrofuran and 0.2 g of N,N-dimethylaminopyridine were added. At 5° C., 4.7 g of N, N-diisopropylethylamine was added dropwise, and the mixture was stirred at room temperature for 5 hours. The reaction liquid was poured into water, extracted with dichloromethane, and then sequentially washed with 5% hydrochloric acid, water, and a saline solution. Purification by column chromatography (silica gel, dichloromethane) and recrystallization (dichloromethane/methanol) was performed, thereby yielding 5.9 g of compounds (a mixture) represented by the formula (B-2).

LCMS: m/z 719 [M+1]

(Synthesis Example 13) Production of Mixture (B-3) Composed of Compounds Represented by the Formulae (B-3-1) and (B-3-2)
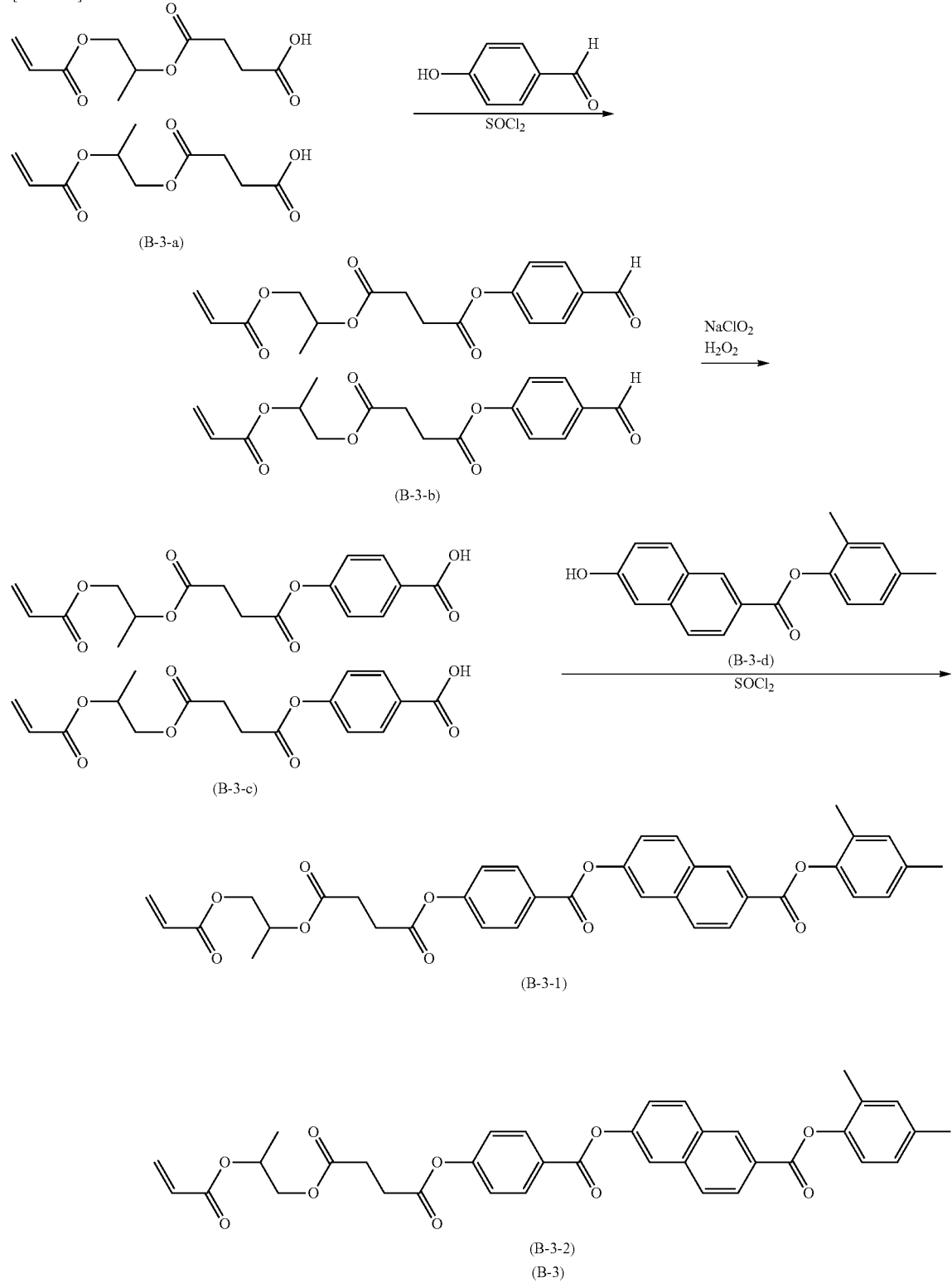

Compounds (a mixture) represented by the formula (B-3-c) were produced in the same manner as in Synthesis Example 9, except that the compounds (mixture) represented by the formula (A-9-c) were replaced by compounds (a mixture) represented by the formula (B-3-a).

A compound represented by the formula (B-3-d) was produced according to a method described in JP-A-2013-253041.

Compounds (a mixture) represented by the formula (B-3) were produced in the same manner as in Synthesis Example 12, except that the compounds (mixture) represented by the formula (B-2-b) were replaced by the compounds (mixture) represented by the formula (B-3-c), and that 4-(trans-4-pentylcyclohexyl)phenol was replaced by the compound represented by the formula (B-3-d).

LCMS: m/z 625 [M+1]

(Synthesis Example 14) Production of Mixture (B-4) Composed of Compounds Represented by the Formulae (B-4-1) and (B-4-2)

[Chem. 69]

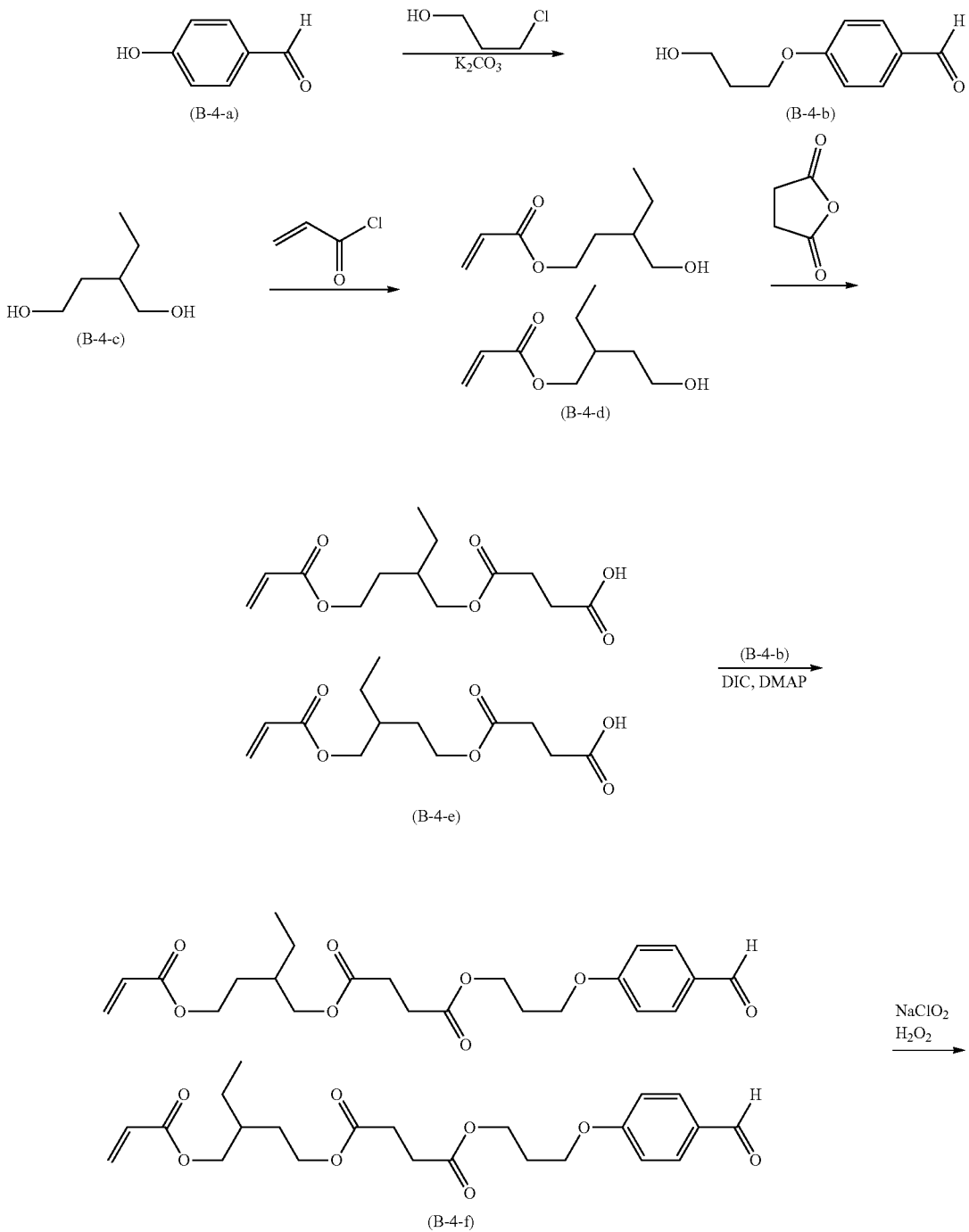

-continued

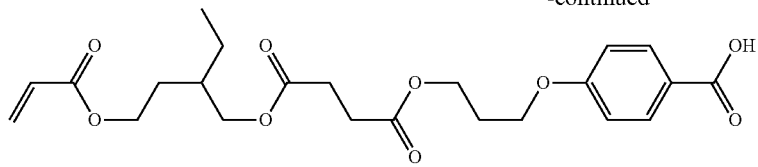

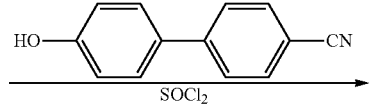

(B-4-g)

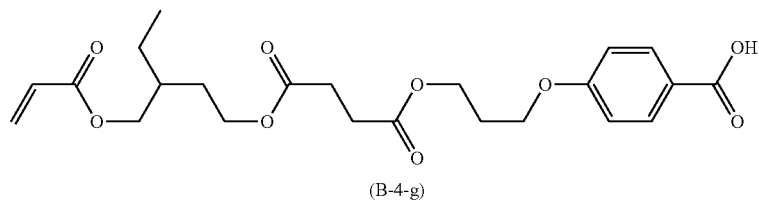

(B-4-1)

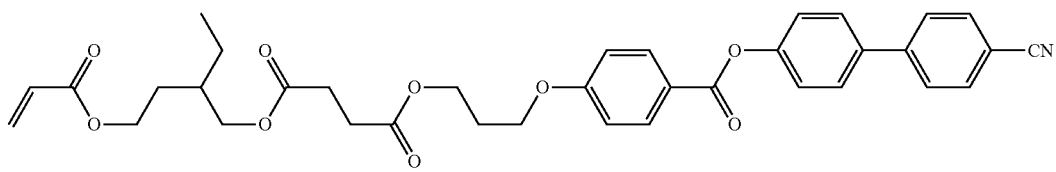

(B-4-2)
(B-4)

Into a reaction vessel, 5.0 g of a compound represented by the formula (B-4-a), 4.6 g of 3-chloropropanol, 8.5 g of potassium carbonate, and 50 mL of N,N-dimethylformamide were added, and stirred with heat at 90° C. for 12 hours. The reaction liquid was poured into water, and extracted with dichloromethane. Purification by column chromatography (silica gel, dichloromethane) was performed, thereby yielding 5.9 g of a compound represented by the formula (B-4-b).

Compounds (a mixture) represented by the formula (B-4-f) were produced in the same manner as in Synthesis Example 4, except that the compound represented by the formula (A-4-c) were replaced by compound represented by the formula (B-4-c), and that the compound represented by the formula (A-4-b) was replaced by the compound represented by the formula (B-4-b).

Compounds (a mixture) represented by the formula (B-4) were produced in the same manner as in Synthesis Example 13, except that the compounds (mixture) represented by the formula (B-3-b) were replaced by compounds (a mixture) represented by the formula (B-4-f), and that the compound represented by the formula (B-3-d) was replaced by 4-cyano-4'-hydroxybiphenyl.

LCMS: m/z 628 [M+1]

(Synthesis Example 15) Production of Mixture (B-5) Composed of Compounds Represented by the Formulae (B-5-1) and (B-5-2)

[Chem. 70]

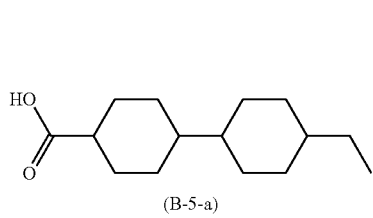

(B-5-a)

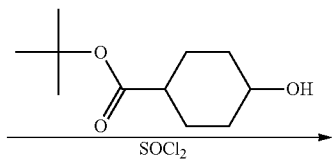

-continued

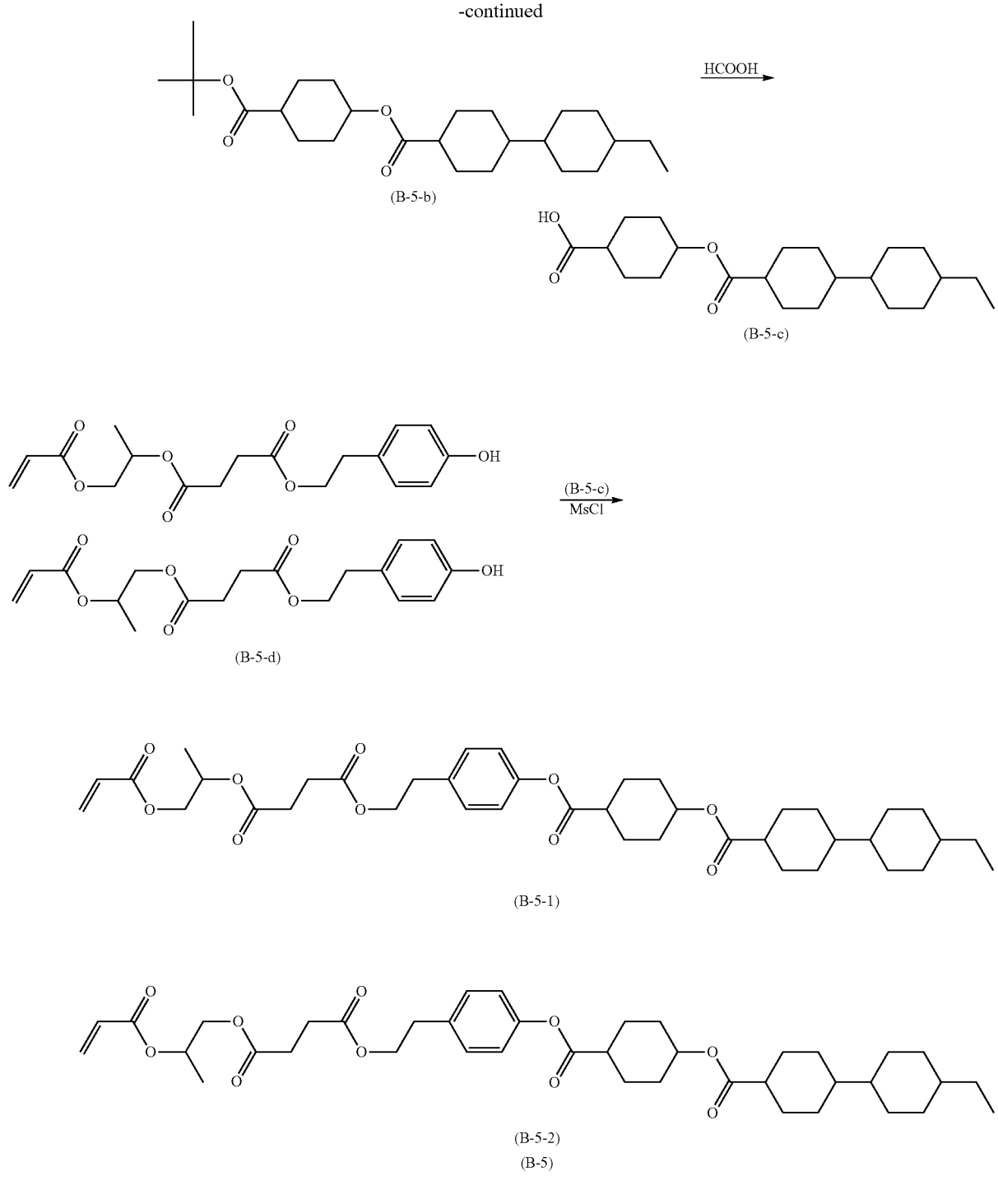

A compounds represented by the formula (B-5-b) were produced in the same manner as in Synthesis Example 12, except that the compounds (mixture) represented by the formula (B-2-a) were replaced by tert-butyl trans-4-hydroxycyclohexane carboxylate, and that trans-1,4-cyclohexane dicarboxylic acid was replaced by trans-4-(trans-4-ethylcyclohexyl) cyclohexane carboxylic acid.

Into a reaction vessel, 5.0 g of the compound represented by the formula (B-5-b), 25 mL of dichloromethane, and 25 mL of formic acid were added, and stirred with heat at 40° C. for 10 hours. The solvent was removed by distillation, and the resultant was dispersed and washed with diisopropyl ether, thereby yielding 3.9 g of a compound represented by the formula (B-5-c).

Compounds represented by the formula (3-5) were produced in the same manner as in Synthesis Example 11, except that trans-4-(trans-4-propylcyclohexyl) cyclohexane carboxylic acid was replaced by the compound represented by the formula (B-5-c).

LCMS: m/z 697 [M+1]

(Synthesis Example 16) Production of Mixture (B-6) Composed of Compounds Represented by the Formulae (B-6-1) and (B-6-2)

[Chem. 71]

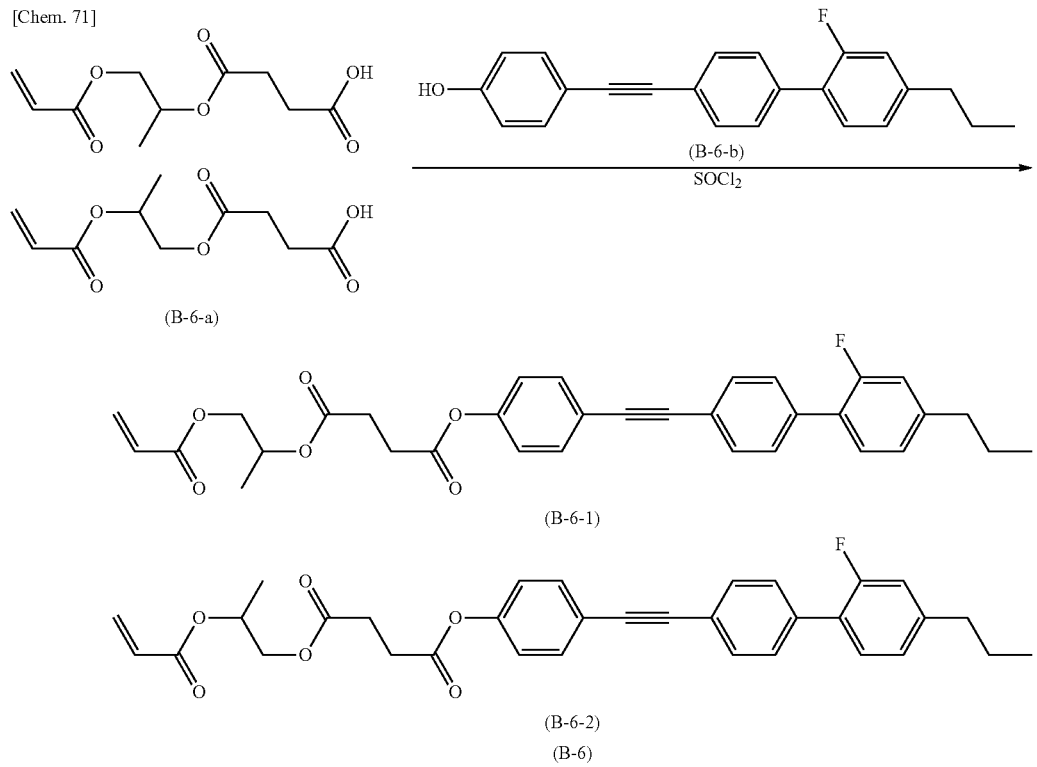

A compound represented by the formula (B-6-b) was produced according to a method described in JP-A-11-147853.

Compounds represented by the formula (B-6) were produced in the same manner as in Synthesis Example 9, except that the compounds represented by the formula (A-9-c) were replaced by the compounds represented by the formula (B-6-a), and that 4-hydroxybenzaldehyde was replaced by the compound represented by the formula (B-6-b).

LCMS: m/z 543 [M+1]

(Synthesis Example 17) Production of Compound Represented by the Formula (C-1)

[Chem. 72]

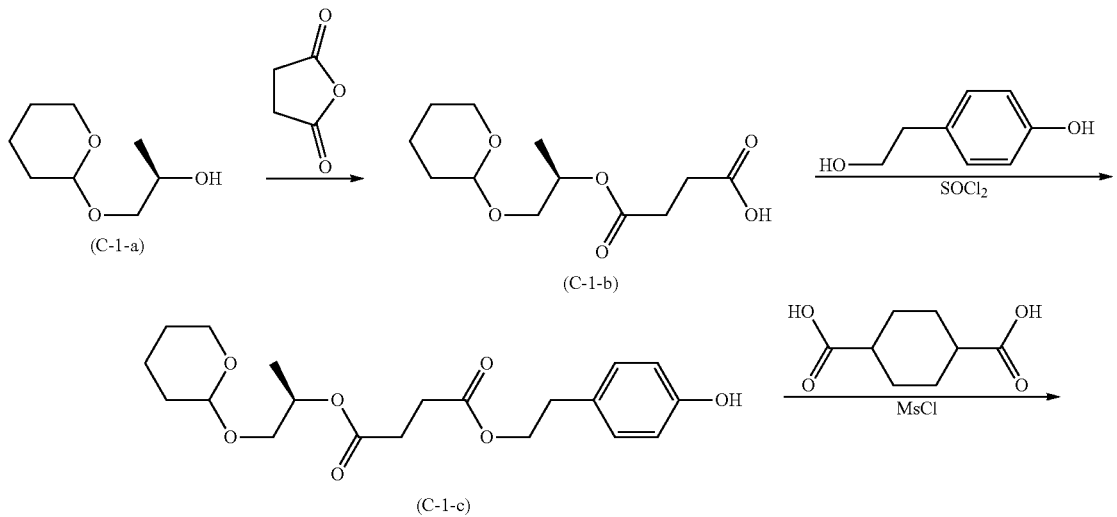

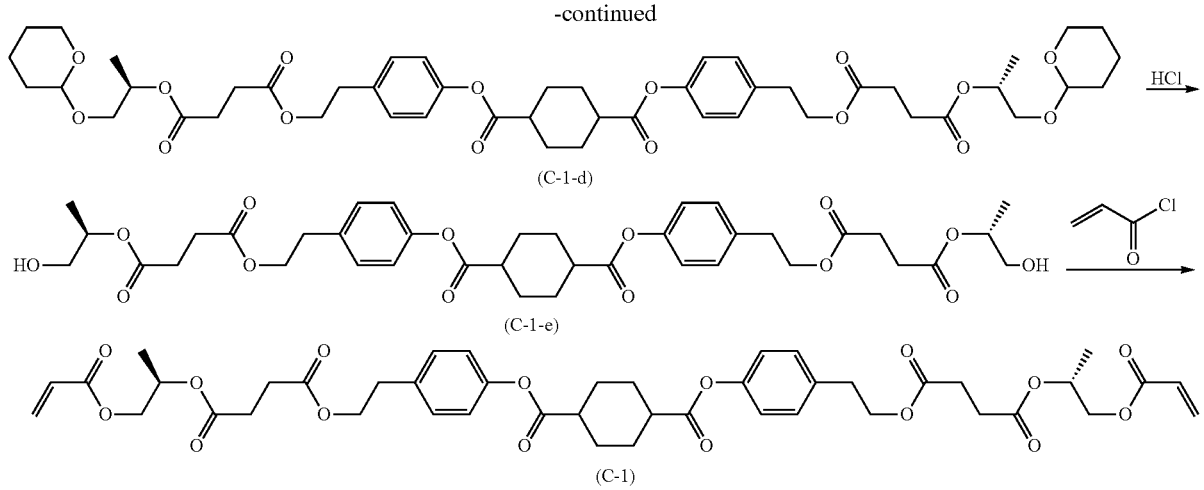

(C-1-d)

(C-1-e)

(C-1)

A compound represented by the formula (C-1-d) was produced in the same manner as in Synthesis Example 1, except that the compounds represented by the formula (A-1-a) were replaced by a compound represented by the formula (C-1-a).

Into a reaction vessel, 5.0 g of the compound represented by the formula (C-1-d), 20 mL of tetrahydrofuran, 20 mL of methanol, and 0.2 mL of concentrated hydrochloric acid were added, and stirred at room temperature for 8 hours. After diluted with ethyl acetate, the solution was washed with water and a saline solution. Purification by column chromatography (silica gel, hexane/ethyl acetate) was performed, thereby yielding 3.7 g of a compound represented by the formula (C-1-e).

Under nitrogen atmosphere, into a reaction vessel, 3.7 g of the compound represented by the formula (C-1-e), 1.6 g of diisopropylethylamine, and 40 mL of dichloromethane were added. While cooling the mixture with ice, 1.0 g of acryloyl chloride was added dropwise, and the mixture was stirred at room temperature for 6 hours. The reaction liquid was poured into water to perform a liquid separation treatment, and then sequentially washed with 1% hydrochloric acid and a saline solution. Purification by column chromatography (silica gel, dichloromethane) and recrystallization (dichloromethane/methanol) was performed, thereby yielding 2.9 g of a compound represented by the formula (C-1).

LCMS: m/z 837 [M+1]

(Synthesis Example 18) Production of a Compound Represented by the Formula (C-2)

[Chem. 73]

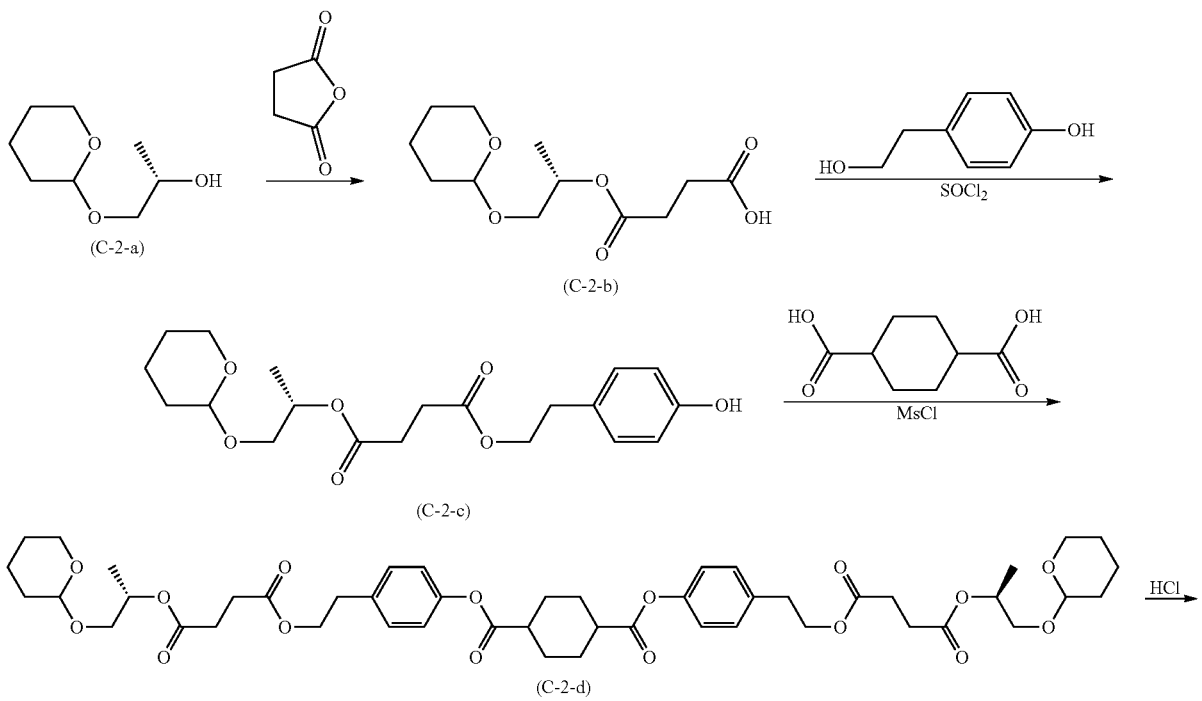

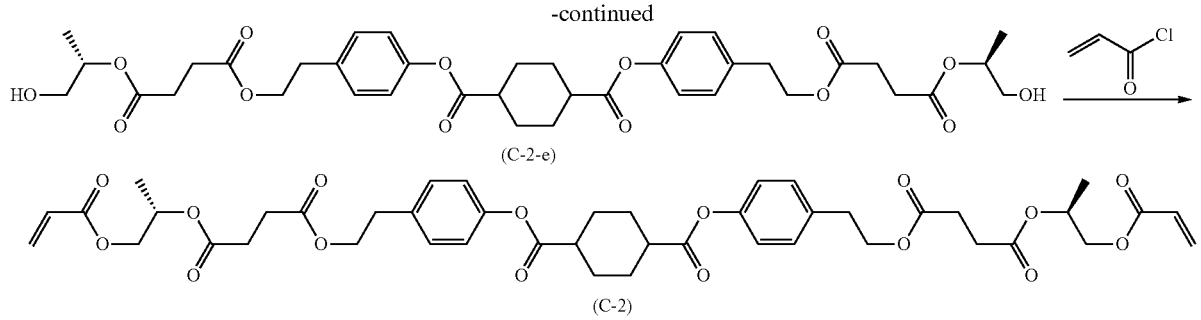

(C-2-e)

(C-2)

A compound represented by the formula (C-2) was produced in the same manner as in Synthesis Example 17, except that the compound represented by the formula (C-1-a) was replaced by a compound represented by the formula (C-2-a).

LCMS: m/z 837[M+1]

(Synthesis Example 19) Production of Compound Represented by the Formula (C-3)

[Chem. 74]

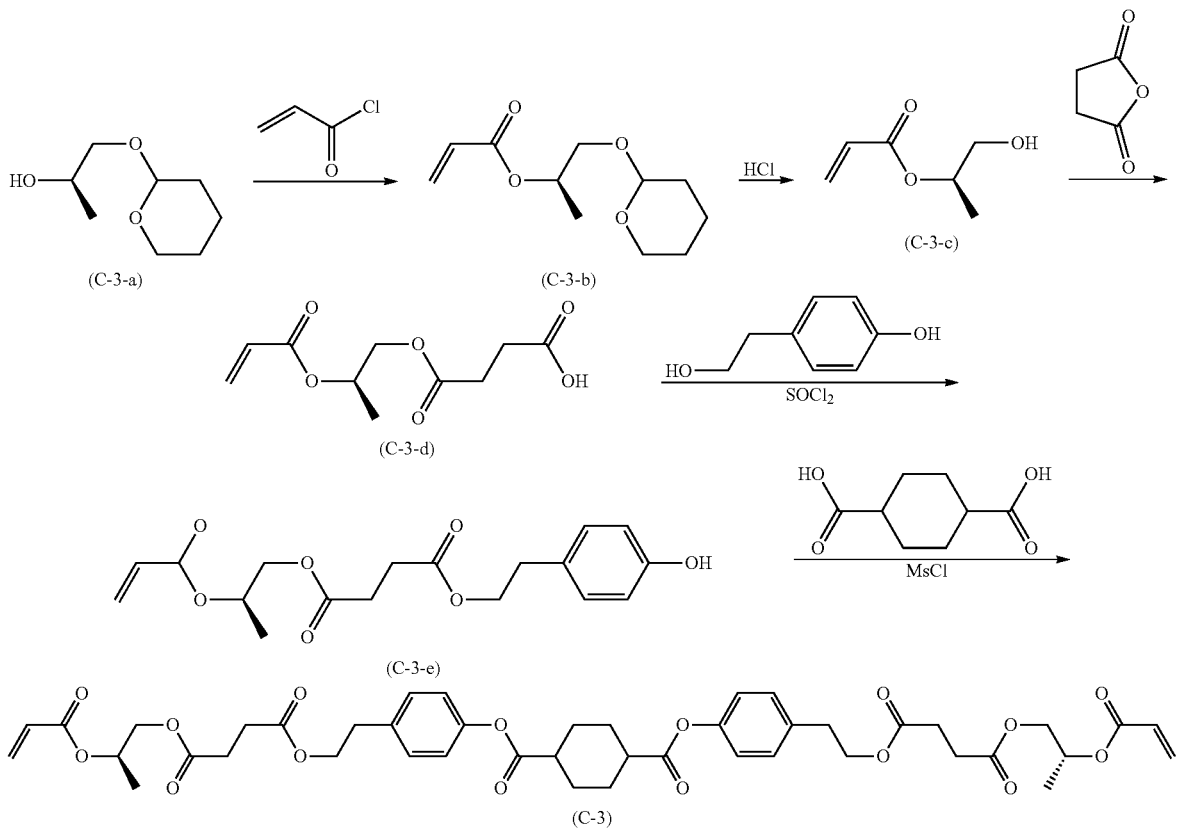

Under nitrogen atmosphere, into a reaction vessel, 5.0 g of a compound represented by the formula (C-3-a), 6.0 g of diisopropylethylamine, and 40 mL of dichloromethane were added. While cooling with ice, 3.1 g of acryloyl chloride was added dropwise, and the mixture was stirred at room temperature for 6 hours. The reaction liquid was poured into water to perform a liquid separation treatment, and then sequentially washed with 1% hydrochloric acid and a saline solution. Purification by column chromatography (silica gel, hexane/ethyl acetate) was performed, thereby yielding 5.3 g of a compound represented by the formula (C-3-b).

Into a reaction vessel, 5.3 g of the compound represented by the formula (C-3-b), 20 mL of tetrahydrofuran, 20 mL of methanol, and 0.2 mL of concentrated hydrochloric acid were added, and stirred at room temperature for 8 hours. After diluted with ethyl acetate, the solution was washed with water and a saline solution. Purification by column chromatography (silica gel, hexane/ethyl acetate) was performed, thereby yielding 2.9 g of a compound represented by the formula (C-3-c).

A compound represented by the formula (C-3) was produced in the same manner as in Synthesis Example 1, except that the compounds (mixture) represented by the formula (A-1-a) were replaced by the compound represented by the formula (C-3-c).

LCMS: m/z 837 [M+1]

(Synthesis Example 20) Production of Compound Represented by the Formula (C-4)

[Chem. 75]

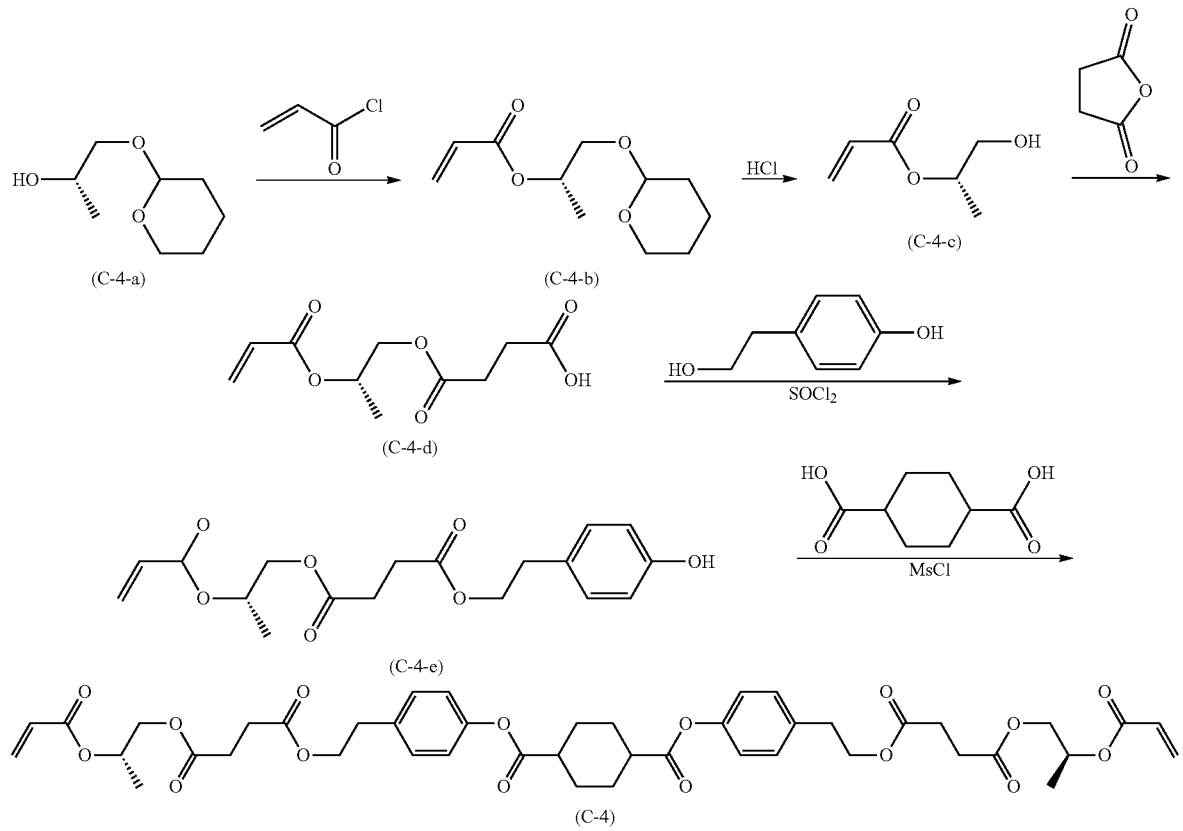

A Compound represented by the formula (C-4) were produced in the same manner as in Synthesis Example 19, except that the compound represented by the formula (C-3-a) was replaced by a compound represented by the formula (C-4-a).

LCMS: m/z 837 [M+1]

(Synthesis Example 21) Production of Mixture (A-11) Composed of Compounds Represented by the Formulae (A-11-1) to (A-11-4)

[Chem.76]

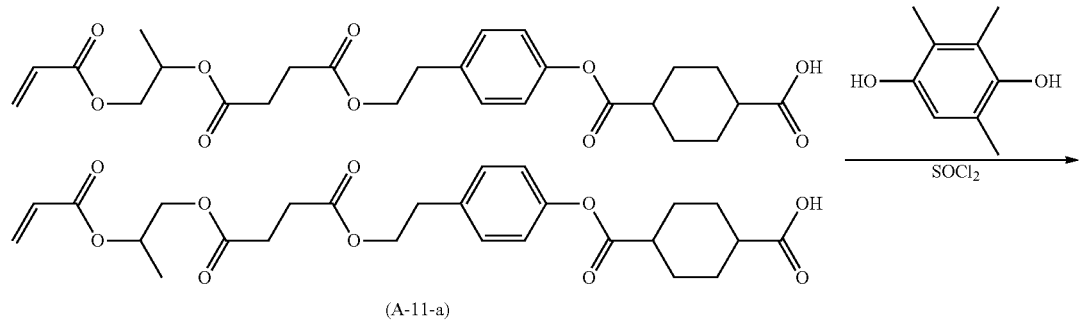

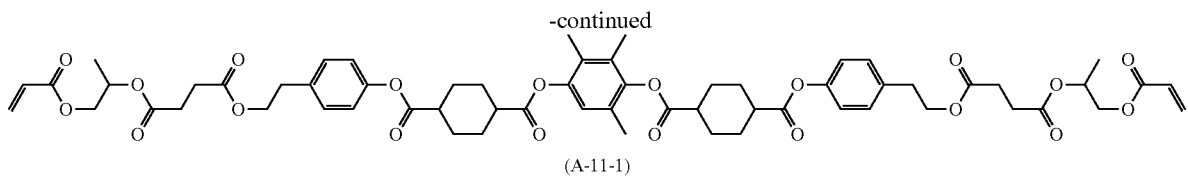

(A-11-1)

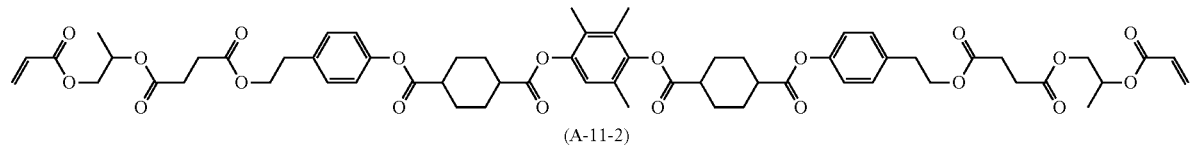

(A-11-2)

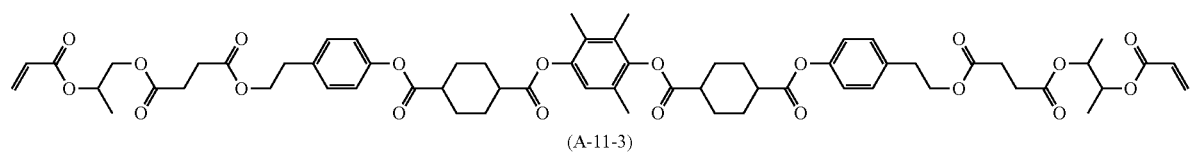

(A-11-3)

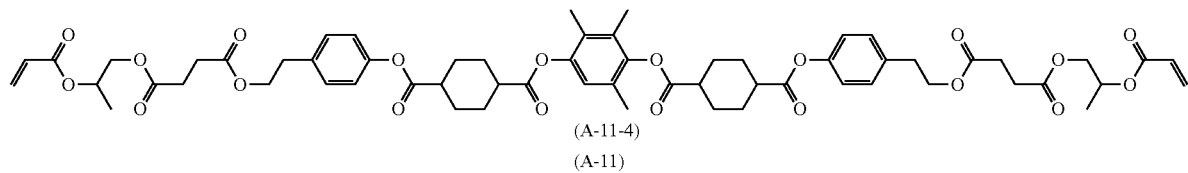

(A-11-4)

(A-11)

Compounds (a mixture) represented by the formula (A-11-a) were produced in the same manner as in Synthesis Example 7.

Into a reaction vessel, 5.0 g of the compounds (a mixture) represented by the formula (A-11-a), 7 mg of 2,6-di-tert-butyl-4-methylphenol, 35 mL of ethyl acetate, and 14 mL of N,N-dimethylacetamide were added. The mixture was cooled to 5° C., 1.4 g or thionyl chloride was added dropwise, and the mixture was stirred at 5° C. for 1 hour. N,N-Diisopropylethylamine 2.0 g was added dropwise. A solution in which 0.8 g of trimethylhydroquinone was dissolved in 5 mL of tetrahydrofuran and 0.2 g of N,N-dimethylaminopyridine were added. At 5° C., 4.7 g of N,N-diisopropylethylamine was added dropwise, and the mixture was stirred at room temperature for 5 hours. The reaction liquid was poured into water, extracted with dichloromethane, and then sequentially washed with 5% hydrochloric acid, water, and a saline solution. Purification by column chromatography (silica gel, dichloromethane) and recrystallization (dichloromethane/methanol) was performed, thereby yielding 4.5 g of compounds (a mixture) represented by the formula (A-11).

LCMS: m/z 1125 [M+1]

Examples 1 to 156, Comparative Examples 1 to 16

The compounds and/or the mixtures represented by the formulae (A-1) to (C-4) described in Synthesis Examples 1 to 21, a compound (R-1) described in PTL 1, and a compound (R-2) described in PTL 2 were subjected to the evaluation.

[Chem. 77]

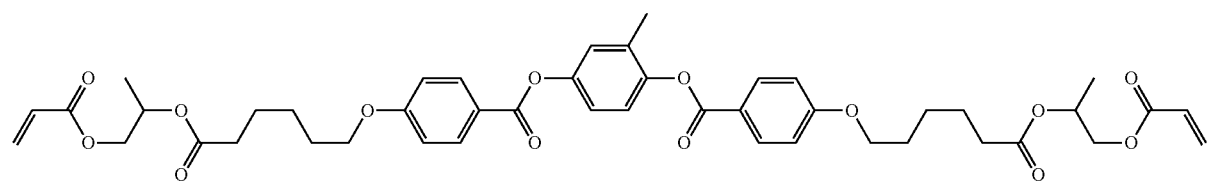

(R-1)

(R-2)

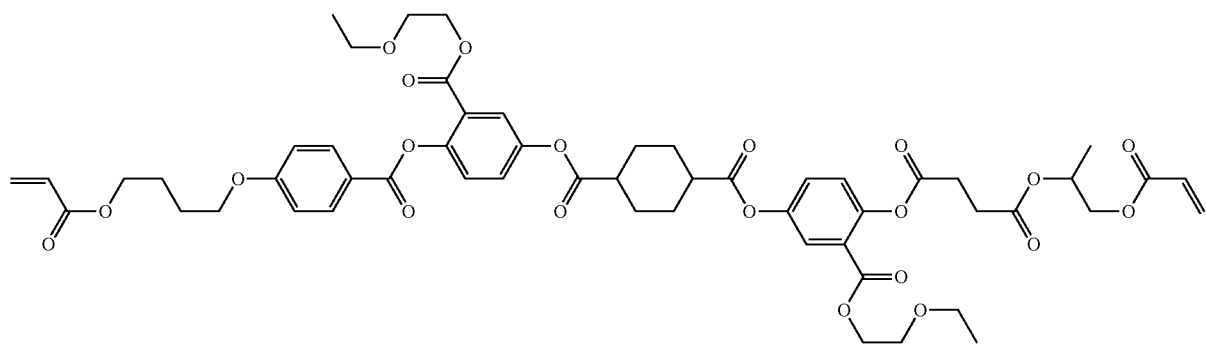

Compounds represented by the following formulae (D-1) to (D-12) were used as other bifunctional polymerizable compounds, compounds represented by the following formulae (E-1) to (E-8) were as other monofunctional polymerizable compounds, compounds represented by the following formulae (F-1) to (F-3) and the formulae (F-5) to (F-7) were as other chiral compounds, and LC756 (manufactured by BASF) was as a compound (F-4), compounds represented by the following formulae (G-1) to (G-3) were as other additives, and polypropylene (weight average molecular weight 1275) was used as a compound (G-4).

[Chem. 78]

(D-1)

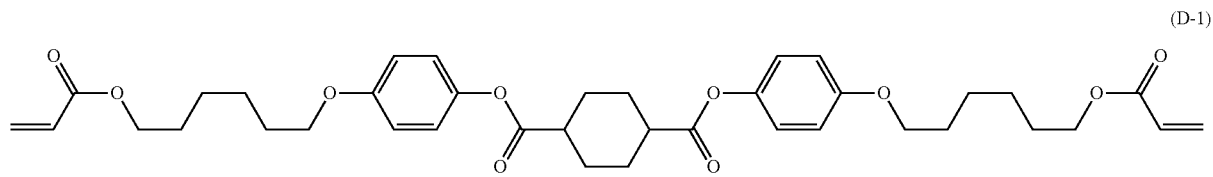

(D-2)

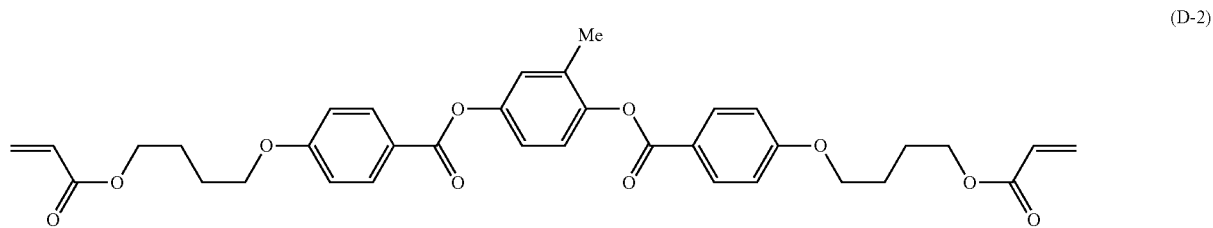

(D-3)

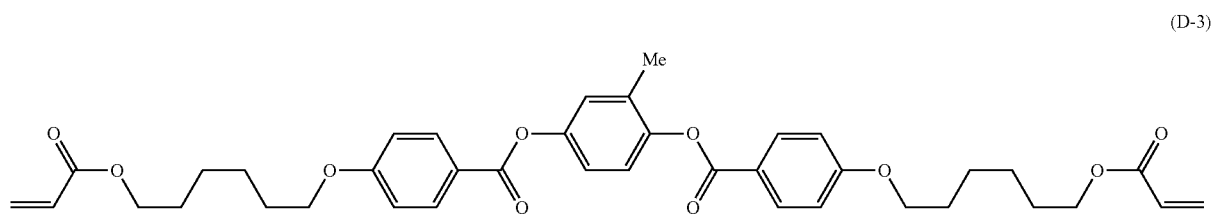

(D-4)

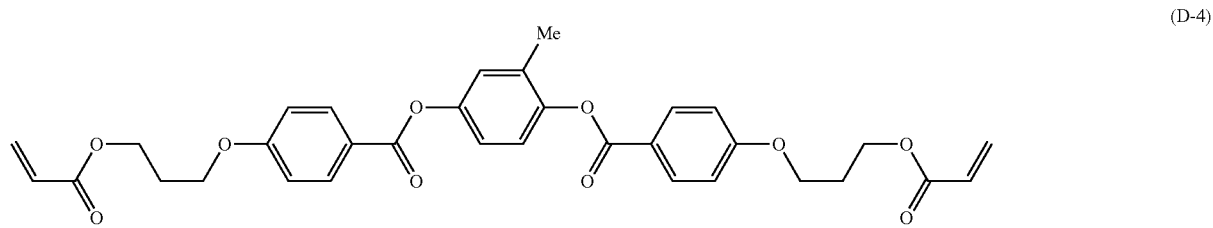

(D-5)
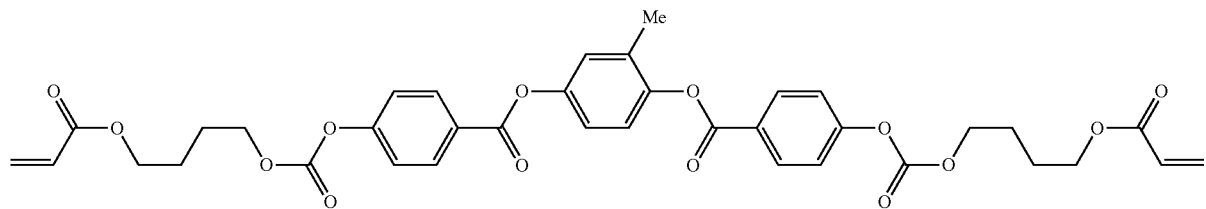
[Chem. 79]
(D-6)
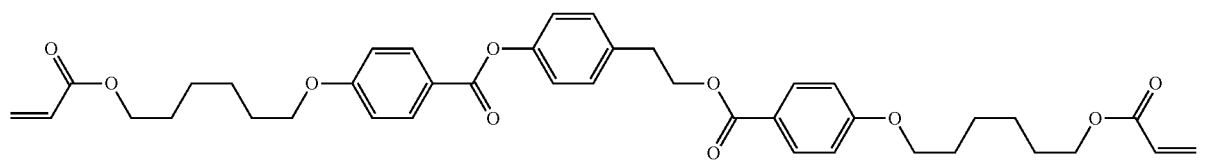
(D-7)
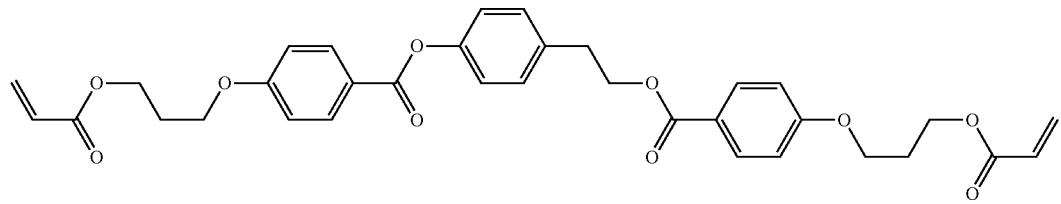
(D-8)
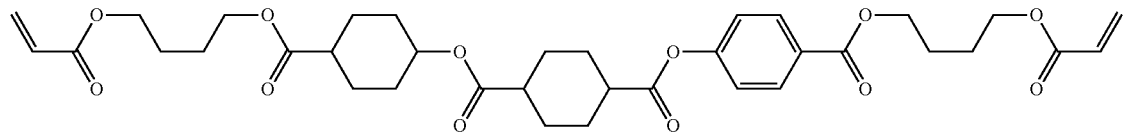
(D-9)
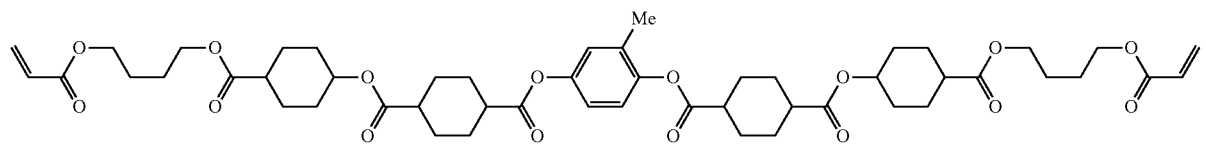
(D-10)
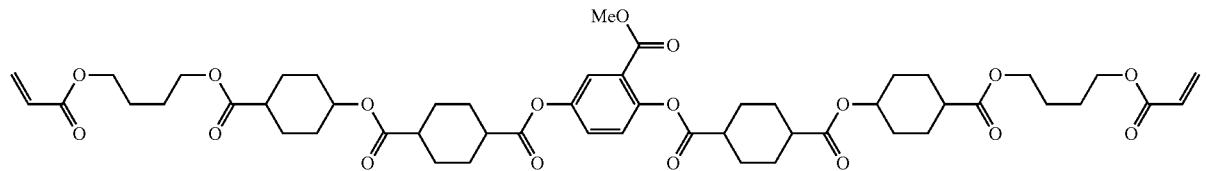
[Chem. 80]
(D-11)
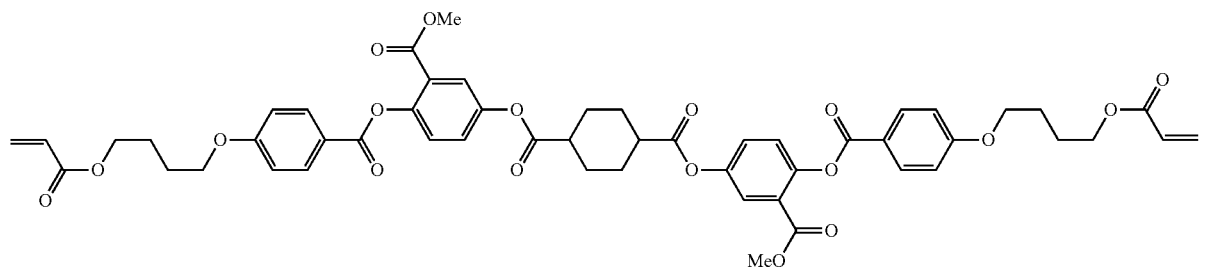

(D-12)
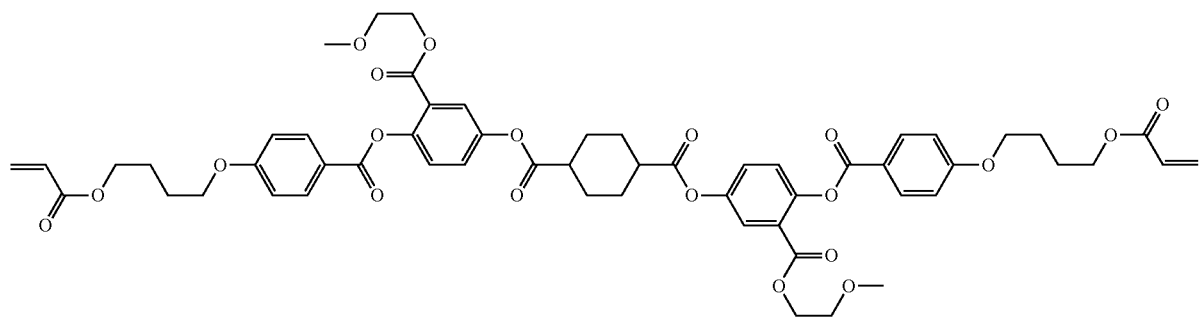
[Chem. 81]
(E-1)
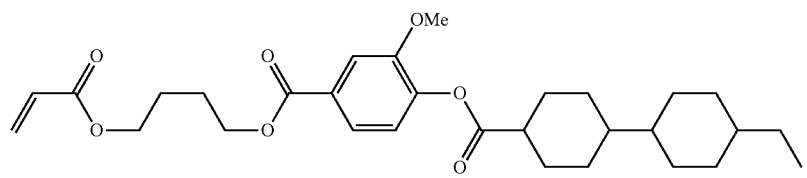
(E-2)
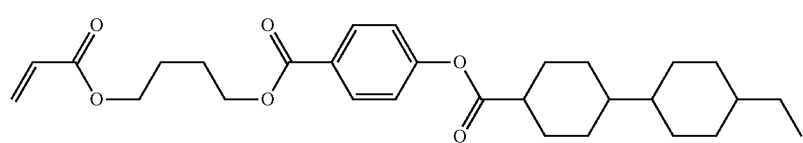
(E-3)
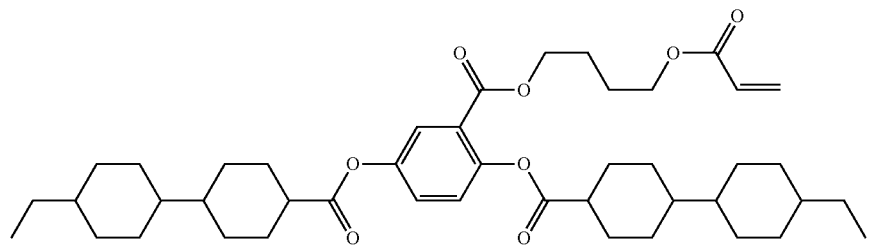
(E-4)
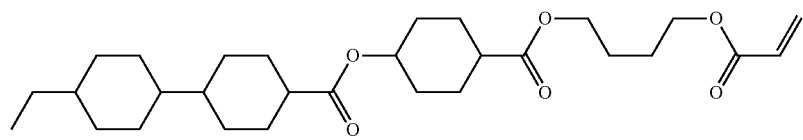
(E-5)
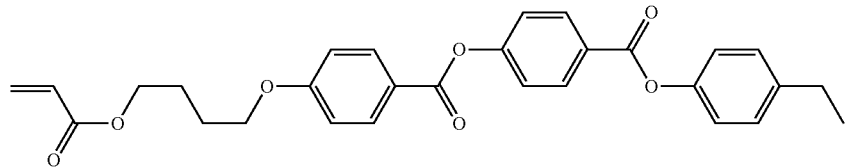
[Chem. 82]
(E-6)
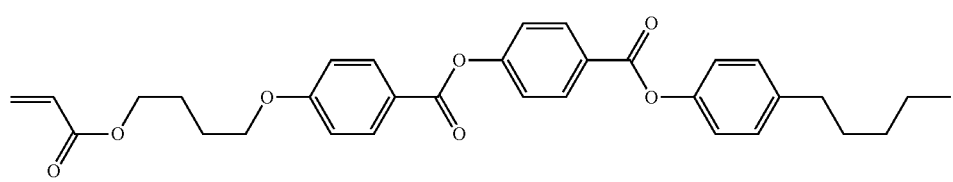
(E-7)
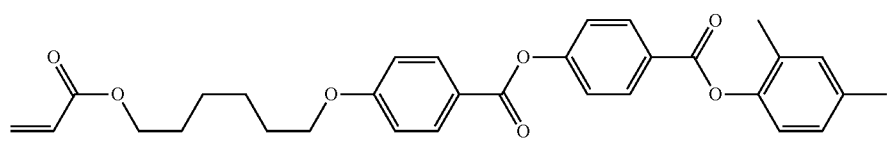

-continued
(E-8)
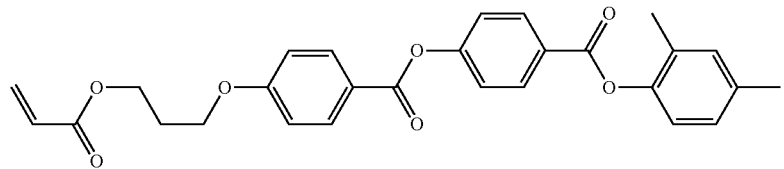
[Chem. 83]
(F-1)
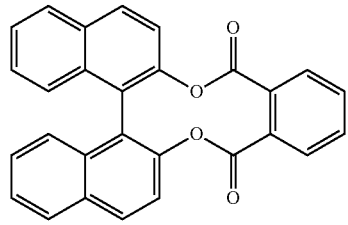
(F-2)
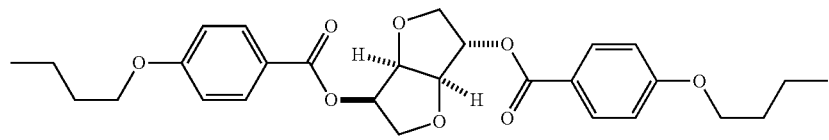
(F-3)
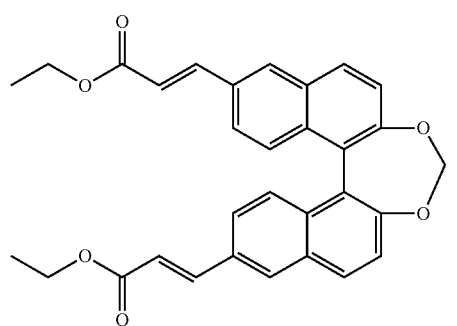
(F-5)
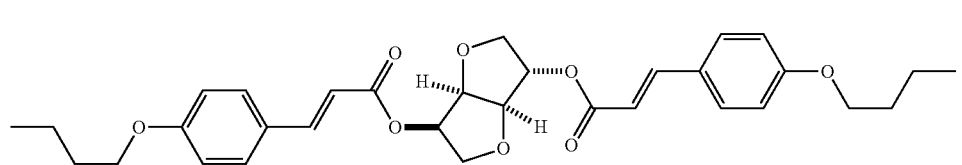
[Chem. 84]
(F-6)
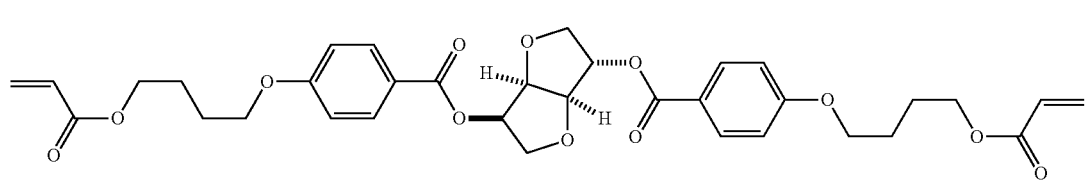
(F-7)
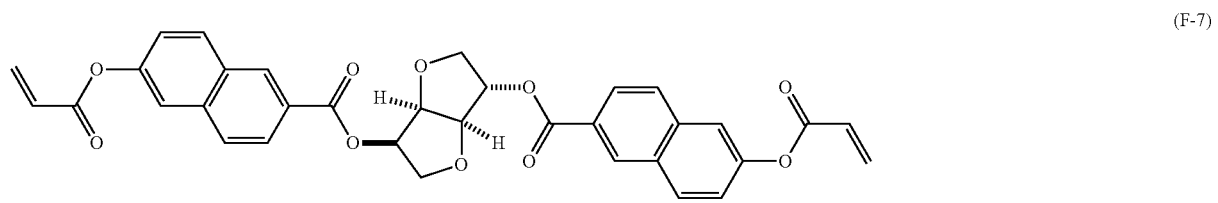

[Chem. 85]

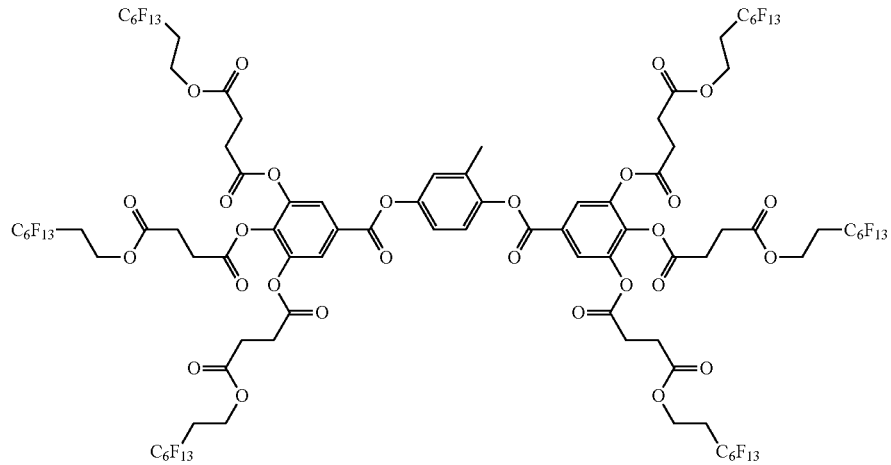

(G-1)

[Chem. 86]

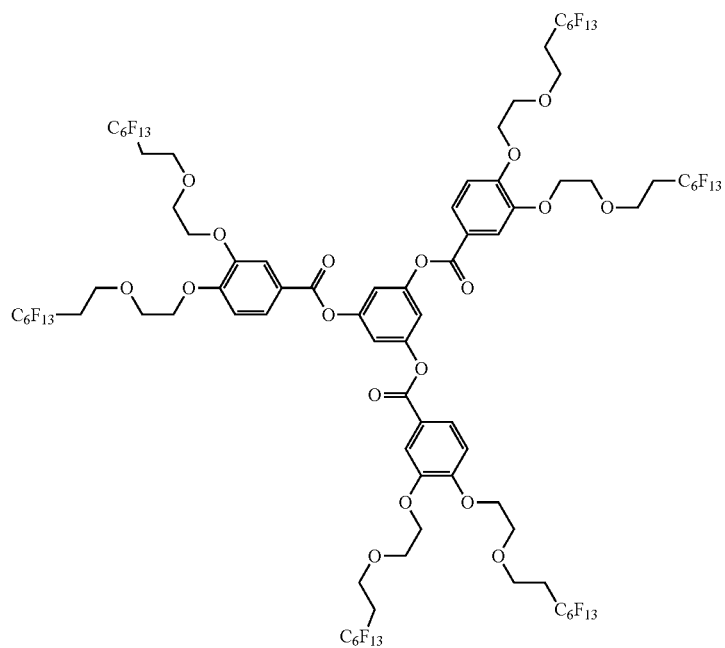

(G-2)

[Chem. 87]

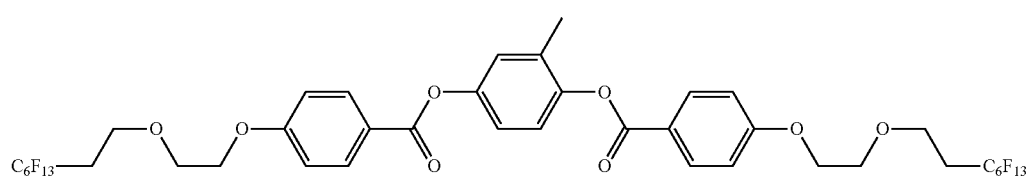

(G-3)

Into a lightproof reactor equipped with a stirrer, 100 parts of each composition in which the compounds and/or mixtures represented by the formulae (A-1-1) to (F-7) described above were added at a composition ratio shown in the following tables, 300 parts of methyl ethyl ketone, 100 parts of cyclohexanone, 0.1 parts of p-methoxyphenol, 2 parts of IRGACURE 819 (manufactured by BASF), and a compound (compounds) represented by the following formulae (G-1) to (G-3) or polypropylene (weight average molecular weight 1275) as a compound (G-4) were added in parts by weight shown in the following tables. The mixture was stirred with heat at 50° C. for 1 hour, thereby producing an application liquid of a polymerizable composition to be used in each of Examples 1 to 156 and Comparative Examples 1 to 16.

TABLE 1

| Compound to be evaluated | Composition ratio (%) | | | | | | | | |
|---|---|---|---|---|---|---|---|---|---|
| | Ex. 1 | Ex. 2 | Ex. 3 | Ex. 4 | Ex. 5 | Ex. 6 | Ex. 7 | Ex. 8 | Ex. 9 |
| (A-1) | 95 | 95 | 95 | 80 | 80 | 80 | 60 | 60 | 50 |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | | | | | | | | | |
| (A-9) | | | | | | | | | |
| (A-10) | | | | | | | | | |
| (A-11) | | | | | | | | | |
| (B-1) | | | | | | | | | |
| (B-2) | | | | | | | | | |
| (B-3) | | | | | | | | | |
| (B-4) | | | | | | | | | |
| (B-5) | | | | | | | | | |
| (B-6) | | | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | | | | 15 | 15 | 15 | 35 | 35 | 45 |
| (D-2) | | | | | | | | | |
| (D-3) | | | | | | | | | |
| (D-4) | | | | | | | | | |
| (D-5) | | | | | | | | | |
| (D-6) | | | | | | | | | |
| (D-7) | | | | | | | | | |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | | | | | | | | |
| (E-2) | | | | | | | | | |
| (E-3) | | | | | | | | | |
| (E-4) | | | | | | | | | |
| (E-5) | | | | | | | | | |
| (E-6) | | | | | | | | | |
| (E-7) | | | | | | | | | |
| (E-8) | | | | | | | | | |
| (F-1) | | 5 | | | | | 5 | | |
| (F-2) | | | 5 | | | | | | |
| (F-3) | | | | | | | | 5 | |
| (F-4) | 5 | | | 5 | | | 5 | | 5 |
| (F-5) | | | | | | | | | |
| (F-6) | | | | | 5 | | | | |
| (F-7) | | | | | | | | | |
| Total | 100 | 100 | 100 | 100 | 100 | 100 | 100 | 100 | 100 |

TABLE 2

| Compound to be evaluated | Composition ratio (%) | | | | | | | | |
|---|---|---|---|---|---|---|---|---|---|
| | Ex. 10 | Ex. 11 | Ex. 12 | Ex. 13 | Ex. 14 | Ex. 15 | Ex. 16 | Ex. 17 | Ex. 18 |
| (A-1) | 50 | 40 | 30 | 20 | 20 | 20 | 10 | 5 | 2 |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | | | | | | | | | |
| (A-9) | | | | | | | | | |
| (A-10) | | | | | | | | | |
| (A-11) | | | | | | | | | |
| (B-1) | | | | | | | | | |
| (B-2) | | | | | | | | | |
| (B-3) | | | | | | | | | |

TABLE 2-continued

| Compound to be evaluated | Composition ratio (%) | | | | | | | | |
|---|---|---|---|---|---|---|---|---|---|
| | Ex. 10 | Ex. 11 | Ex. 12 | Ex. 13 | Ex. 14 | Ex. 15 | Ex. 16 | Ex. 17 | Ex. 18 |
| (B-4) | | | | | | | | | |
| (B-5) | | | | | | | | | |
| (B-6) | | | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | 40 | 45 | 60 | 70 | 60 | 45 | 75 | 40 | 63 |
| (D-2) | | | | | 5 | | | | |
| (D-3) | | | | | | | | | |
| (D-4) | | | | | | | | | |
| (D-5) | | | | | | | | | |
| (D-6) | | | | | | | | | |
| (D-7) | | | | | | | | | |
| (D-8) | | | | | | | 5 | | |
| (D-9) | | | | | | | | 5 | |
| (D-10) | | | | | | | 5 | | |
| (D-11) | | | | | | | | | 5 |
| (D-12) | | | | | | | | 5 | |
| (E-1) | | 10 | | | | 28 | | 37 | 25 |
| (E-2) | 5 | | | | | | | | |
| (E-3) | | | 5 | | | | | | |
| (E-4) | | | | | 5 | | | | |
| (E-5) | | | | | | | | 5 | |
| (E-6) | | | | | 5 | | | | |
| (E-7) | | | | | | | | | |
| (E-8) | | | | | | | | | |
| (F-1) | | | | | | | | | |
| (F-2) | | | | | | | | | |
| (F-3) | | | | | | | | | |
| (F-4) | | 5 | | 5 | 10 | 2 | 5 | 8 | 5 |
| (F-5) | 5 | | | | | | | | |
| (F-6) | | | 5 | | | | | | |
| (F-7) | | | | | | | | | |
| Total | 100 | 100 | 100 | 100 | 100 | 100 | 100 | 100 | 100 |

TABLE 3

| Compound to be evaluated | Composition ratio (%) | | | | | | | | |
|---|---|---|---|---|---|---|---|---|---|
| | Ex. 19 | Ex. 20 | Ex. 21 | Ex. 22 | Ex. 23 | Ex. 24 | Ex. 25 | Ex. 26 | Ex. 27 |
| (A-1) | | | | | | | | | |
| (A-2) | | | | | 40 | | | | |
| (A-3) | | | | | | 40 | | | |
| (A-4) | | | | | | | 40 | | |
| (A-5) | | | | | | | 20 | | |
| (A-6) | | | | | | | | | 10 |
| (A-7) | | | | | | | | | 10 |
| (A-8) | | | | | | | | | |
| (A-9) | | | | | | | | | |
| (A-10) | | | | | | | | | |
| (A-11) | | | | | | | | | |
| (B-1) | | | | | | 5 | | 5 | |
| (B-2) | | | | | 10 | | | | |
| (B-3) | | | | | | | 10 | | |
| (B-4) | | | | | | | | | 5 |
| (B-5) | | | | | | | | | |
| (B-6) | | | | | | | | | |
| (C-1) | 70 | | | | | | | | |
| (C-2) | | 40 | | | | | | | |
| (C-3) | | | 10 | | | | | | |
| (C-4) | | | | 5 | | | | | |
| (R-1) | | | | | | | | | |
| (R-2) | | | | | | | | | |
| (D-1) | 30 | 50 | 85 | 90 | | | | | |
| (D-2) | | | | | 30 | 30 | | | |
| (D-3) | | | | | | | 20 | | |
| (D-4) | | | | | | | 20 | 30 | 20 |
| (D-5) | | | | | | | | | |

TABLE 3-continued

| Compound to be evaluated | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| (D-6) | | | | | | | | 20 | |
| (D-7) | | | | | | | | 20 | 40 |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | 10 | | | | | | | |
| (E-2) | | | 5 | | | | | | |
| (E-3) | | | | | | | | | |
| (E-4) | | | | | | | | | |
| (E-5) | | | | 5 | | | | | |
| (E-6) | | | | | | | | | |
| (E-7) | | | | | 15 | 10 | 5 | | 10 |
| (E-8) | | | | | | 10 | | | |
| (F-1) | | | | | | | | | |
| (F-2) | | | | | | | | | |
| (F-3) | | | | | | | | | |
| (F-4) | | | | | 5 | 5 | 5 | | |
| (F-5) | | | | | | | | | |
| (F-6) | | | | | | | | | |
| (F-7) | | | | | | | | 5 | 5 |
| Total | 100 | 100 | 100 | 100 | 100 | 100 | 100 | 100 | 100 |

TABLE 4

| Compound to be evaluated | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|
| (A-1) | | | | | | | | | |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | 20 | | | | | | | | |
| (A-9) | | 40 | | | | | | | |
| (A-10) | | | 30 | | | | | | |
| (A-11) | | | | 95 | 95 | 95 | 80 | 80 | 80 |
| (B-1) | | | | | | | | | |
| (B-2) | | | | | | | | | |
| (B-3) | | | | | | | | | |
| (B-4) | | | | | | | | | |
| (B-5) | 10 | | | | | | | | |
| (B-6) | | 10 | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | | | | | | | 15 | 15 | 15 |
| (D-2) | | | | | | | | | |
| (D-3) | | | | | | | | | |
| (D-4) | | | | | | | | | |
| (D-5) | 65 | 10 | | | | | | | |
| (D-6) | | | 20 | | | | | | |
| (D-7) | | | 20 | | | | | | |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | 20 | | | | | | | |
| (E-2) | | | | | | | | | |
| (E-3) | | | | | | | | | |
| (E-4) | | | | | | | | | |
| (E-5) | | | | | | | | | |
| (E-6) | | 15 | | | | | | | |
| (E-7) | | | 15 | | | | | | |

TABLE 4-continued

| Compound to be evaluated | Composition ratio (%) | | | | | | | | |
|---|---|---|---|---|---|---|---|---|---|
| | Ex. 28 | Ex. 29 | Ex. 30 | Ex. 31 | Ex. 32 | Ex. 33 | Ex. 34 | Ex. 35 | Ex. 36 |
| (E-8) | | | 10 | | | | | | |
| (F-1) | | | | | 5 | | | | 5 |
| (F-2) | | | | | | | 5 | | |
| (F-3) | | | | | | | | | |
| (F-4) | 5 | 5 | | 5 | | | 5 | | |
| (F-5) | | | | | | | | | |
| (F-6) | | | | | | | | 5 | |
| (F-7) | | 5 | | | | | | | |
| Total | 100 | 100 | 100 | 100 | 100 | 100 | 100 | 100 | 100 |

TABLE 5

| Compound to be evaluated | Composition ratio (%) | | | | | | | | |
|---|---|---|---|---|---|---|---|---|---|
| | Ex. 37 | Ex. 38 | Ex. 39 | Ex. 40 | Ex. 41 | Ex. 42 | Ex. 43 | Ex. 44 | Ex. 45 |
| (A-1) | | | | | | | | | |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | | | | | | | | | |
| (A-9) | | | | | | | | | |
| (A-10) | | | | | | | | | |
| (A-11) | 60 | 60 | 50 | 50 | 40 | 30 | 20 | 20 | 20 |
| (B-1) | | | | | | | | | |
| (B-2) | | | | | | | | | |
| (B-3) | | | | | | | | | |
| (B-4) | | | | | | | | | |
| (B-5) | | | | | | | | | |
| (B-6) | | | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | 35 | 35 | 45 | 40 | 45 | 60 | 70 | 60 | 45 |
| (D-2) | | | | | | | | 5 | |
| (D-3) | | | | | | | | | |
| (D-4) | | | | | | | | | |
| (D-5) | | | | | | | | | |
| (D-6) | | | | | | | | | |
| (D-7) | | | | | | | | | |
| (D-8) | | | | | | | | | 5 |
| (D-9) | | | | | | | | | |
| (D-10) | | | | | | | | | |
| (D-11) | | | | | | | | | |
| (D-12) | | | | | | | | | |
| (E-1) | | | | | 10 | | | | 28 |
| (E-2) | | | | 5 | | | | | |
| (E-3) | | | | | | 5 | | | |
| (E-4) | | | | | | | 5 | | |
| (E-5) | | | | | | | | | |
| (E-6) | | | | | | | | 5 | |
| (E-7) | | | | | | | | | |
| (E-8) | | | | | | | | | |
| (F-1) | | | | | | | | | |
| (F-2) | | | | | | | | | |
| (F-3) | | 5 | | | | | | | |
| (F-4) | 5 | | 5 | | 5 | | 5 | 10 | 2 |
| (F-5) | | | | 5 | | | | | |
| (F-6) | | | | | | 5 | | | |
| (F-7) | | | | | | | | | |
| Total | 100 | 100 | 100 | 100 | 100 | 100 | 100 | 100 | 100 |

TABLE 6

| Compound to be evaluated | Ex. 46 | Ex. 47 | Ex. 48 | Comp. Ex. 1 | Comp. Ex. 2 | Comp. Ex. 3 | Comp. Ex. 4 |
|---|---|---|---|---|---|---|---|
| (A-1) | | | | | | | |
| (A-2) | | | | | | | |
| (A-3) | | | | | | | |
| (A-4) | | | | | | | |
| (A-5) | | | | | | | |
| (A-6) | | | | | | | |
| (A-7) | | | | | | | |
| (A-8) | | | | | | | |
| (A-9) | | | | | | | |
| (A-10) | | | | | | | |
| (A-11) | 10 | 5 | 2 | | | | |
| (B-1) | | | | | | | |
| (B-2) | | | | | | | |
| (B-3) | | | | | | | |
| (B-4) | | | | | | | |
| (B-5) | | | | | | | |
| (B-6) | | | | | | | |
| (C-1) | | | | | | | |
| (C-2) | | | | | | | |
| (C-3) | | | | | | | |
| (C-4) | | | | | | | |
| (R-1) | | | | 60 | 30 | | |
| (R-2) | | | | | | 50 | 20 |
| (D-1) | 75 | 40 | 63 | 35 | 60 | 45 | 70 |
| (D-2) | | | | | | | |
| (D-3) | | | | | | | |
| (D-4) | | | | | | | |
| (D-5) | | | | | | | |
| (D-6) | | | | | | | |
| (D-7) | | | | | | | |
| (D-8) | | | | | | | |
| (D-9) | | 5 | | | | | |
| (D-10) | 5 | | | | | | |
| (D-11) | | | 5 | | | | |
| (D-12) | | 5 | | | | | |
| (E-1) | | 37 | 25 | | | | |
| (E-2) | | | | | | | |
| (E-3) | | | | | | 5 | |
| (E-4) | | | | | | | 5 |
| (E-5) | 5 | | | | | | |
| (E-6) | | | | | | | |
| (E-7) | | | | | | | |
| (E-8) | | | | | | | |
| (F-1) | | | | | | | |
| (F-2) | | | | | | | |
| (F-3) | | | | | | | |
| (F-4) | 5 | 8 | 5 | 5 | 5 | 5 | 5 |
| (F-5) | | | | | | | |
| (F-6) | | | | | | | |
| (F-7) | | | | | | | |
| Total | 100 | 100 | 100 | 100 | 100 | 100 | 100 |

TABLE 7

| Compound to be evaluated | Ex. 49 | Ex. 50 | Ex. 51 | Ex. 52 | Ex. 53 | Ex. 54 | Ex. 55 | Ex. 56 | Ex. 57 |
|---|---|---|---|---|---|---|---|---|---|
| (A-1) | 100 | 90 | 80 | 50 | 40 | 30 | 20 | 10 | 5 |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | | | | | | | | | |
| (A-9) | | | | | | | | | |
| (A-10) | | | | | | | | | |
| (A-11) | | | | | | | | | |
| (B-1) | | | | | | | | | |
| (B-2) | | | | | | | | | |
| (B-3) | | | | | | | | | |
| (B-4) | | | | | | | | | |
| (B-5) | | | | | | | | | |
| (B-6) | | | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | | 10 | 20 | 50 | 60 | 70 | 80 | 85 | 55 |
| (D-2) | | | | | | | | | |
| (D-3) | | | | | | | | | |
| (D-4) | | | | | | | | | |
| (D-5) | | | | | | | | | |
| (D-6) | | | | | | | | | |
| (D-7) | | | | | | | | | |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | | | | | | | 5 | 40 |
| (E-2) | | | | | | | | | |
| (E-3) | | | | | | | | | |
| (E-4) | | | | | | | | | |

TABLE 7-continued

| Compound to | Composition ratio (%) | | | | | | | | |
|---|---|---|---|---|---|---|---|---|---|
| be evaluated | Ex. 49 | Ex. 50 | Ex. 51 | Ex. 52 | Ex. 53 | Ex. 54 | Ex. 55 | Ex. 56 | Ex. 57 |
| (E-5) | | | | | | | | | |
| (E-6) | | | | | | | | | |
| (E-7) | | | | | | | | | |
| (E-8) | | | | | | | | | |
| Total | 100 | 100 | 100 | 100 | 100 | 100 | 100 | 100 | 100 |

TABLE 8

| Compound to | Composition ratio (%) | | | | | | | | |
|---|---|---|---|---|---|---|---|---|---|
| be evaluated | Ex. 58 | Ex. 59 | Ex. 60 | Ex. 61 | Ex. 62 | Ex. 63 | Ex. 64 | Ex. 65 | Ex. 66 |
| (A-1) | 5 | 2 | | | | | | | |
| (A-2) | | | 50 | | | | | | |
| (A-3) | | | | 40 | | | | | |
| (A-4) | | | | | 20 | | | | |
| (A-5) | | | | | | 40 | | | |
| (A-6) | | | | | | | 10 | | |
| (A-7) | | | | | | | | 30 | |
| (A-8) | | | | | | | | | 5 |
| (A-9) | | | | | | | | | 5 |
| (A-10) | | | | | | | | | |
| (A-11) | | | | | | | | | |
| (B-1) | | | 30 | | | | | | |
| (B-2) | | | | 30 | | | | | |
| (B-3) | | | | 10 | | | | | |
| (B-4) | | | | | 60 | | | | |
| (B-5) | | | | | | 30 | | | |
| (B-6) | | | | | | | 50 | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | 95 | 98 | 20 | | | | | | |
| (D-2) | | | | 20 | | | | | |
| (D-3) | | | | | 10 | 10 | | | 80 |
| (D-4) | | | | | | 10 | 20 | | |
| (D-5) | | | | | | | | 20 | |
| (D-6) | | | | | | | | 20 | |
| (D-7) | | | | | | | 15 | | |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | | | | | | | | |
| (E-2) | | | | | | | | | |
| (E-3) | | | | | | | | | |
| (E-4) | | | | | | | | | |
| (E-5) | | | | | | | | | |
| (E-6) | | | | | | | | | |
| (E-7) | | | | | 10 | 10 | 5 | 15 | |
| (E-8) | | | | | | | | 15 | 10 |
| Total | 100 | 100 | 100 | 100 | 100 | 100 | 100 | 100 | 100 |

TABLE 9

| Compound to be evaluated | Ex. 67 | Ex. 68 | Ex. 69 | Ex. 70 | Ex. 71 | Ex. 72 | Ex. 73 | Ex. 74 | Ex. 75 |
|---|---|---|---|---|---|---|---|---|---|
| (A-1) | | | | | | | | | |
| (A-2) | | | | | | | | | |
| (A-3) | | | | | | | | | |
| (A-4) | | | | | | | | | |
| (A-5) | | | | | | | | | |
| (A-6) | | | | | | | | | |
| (A-7) | | | | | | | | | |
| (A-8) | | | | | | | | | |
| (A-9) | | | | | | | | | |
| (A-10) | 10 | | | | | | | | |
| (A-11) | | 100 | 90 | 80 | 50 | 40 | 30 | 20 | 10 |
| (B-1) | | | | | | | | | |
| (B-2) | | | | | | | | | |
| (B-3) | | | | | | | | | |
| (B-4) | | | | | | | | | |
| (B-5) | | | | | | | | | |
| (B-6) | | | | | | | | | |
| (C-1) | | | | | | | | | |
| (C-2) | | | | | | | | | |
| (C-3) | | | | | | | | | |
| (C-4) | | | | | | | | | |
| (R-1) | | | | | | | | | |
| (R-2) | | | | | | | | | |
| (D-1) | | | 10 | 20 | 50 | 60 | 70 | 80 | 85 |
| (D-2) | | | | | | | | | |
| (D-3) | | | | | | | | | |
| (D-4) | | | | | | | | | |
| (D-5) | 90 | | | | | | | | |
| (D-6) | | | | | | | | | |
| (D-7) | | | | | | | | | |
| (D-8) | | | | | | | | | |
| (D-9) | | | | | | | | | |
| (D-10) | | | | | | | | | |
| (D-11) | | | | | | | | | |
| (D-12) | | | | | | | | | |
| (E-1) | | | | | | | | | 5 |
| (E-2) | | | | | | | | | |
| (E-3) | | | | | | | | | |
| (E-4) | | | | | | | | | |
| (E-5) | | | | | | | | | |
| (E-6) | | | | | | | | | |
| (E-7) | | | | | | | | | |
| (E-8) | | | | | | | | | |
| Total | 100 | 100 | 100 | 100 | 100 | 100 | 100 | 100 | 100 |

TABLE 10

| Compound to be evaluated | Ex. 76 | Ex. 77 | Ex. 78 | Comp. Ex. 5 | Comp. Ex. 6 | Comp. Ex. 7 | Comp. Ex. 8 |
|---|---|---|---|---|---|---|---|
| (A-1) | | | | | | | |
| (A-2) | | | | | | | |
| (A-3) | | | | | | | |
| (A-4) | | | | | | | |
| (A-5) | | | | | | | |
| (A-6) | | | | | | | |
| (A-7) | | | | | | | |
| (A-8) | | | | | | | |
| (A-9) | | | | | | | |
| (A-10) | | | | | | | |
| (A-11) | 5 | 5 | 2 | | | | |
| (B-1) | | | | | | | |
| (B-2) | | | | | | | |
| (B-3) | | | | | | | |
| (B-4) | | | | | | | |
| (B-5) | | | | | | | |
| (B-6) | | | | | | | |
| (C-1) | | | | | | | |
| (C-2) | | | | | | | |
| (C-3) | | | | | | | |
| (C-4) | | | | | | | |
| (R-1) | | | | 80 | 40 | | |
| (R-2) | | | | | | 50 | 20 |
| (D-1) | 55 | 95 | 98 | 20 | 60 | 50 | 80 |
| (D-2) | | | | | | | |
| (D-3) | | | | | | | |
| (D-4) | | | | | | | |
| (D-5) | | | | | | | |
| (D-6) | | | | | | | |
| (D-7) | | | | | | | |
| (D-8) | | | | | | | |
| (D-9) | | | | | | | |
| (D-10) | | | | | | | |
| (D-11) | | | | | | | |
| (D-12) | | | | | | | |
| (E-1) | 40 | | | | | | |
| (E-2) | | | | | | | |
| (E-3) | | | | | | | |
| (E-4) | | | | | | | |
| (E-5) | | | | | | | |

TABLE 10-continued

| Compound to be evaluated | Ex. 76 | Ex. 77 | Ex. 78 | Comp. Ex. 5 | Comp. Ex. 6 | Comp. Ex. 7 | Comp. Ex. 8 |
|---|---|---|---|---|---|---|---|
| (E-6) | | | | | | | |
| (E-7) | | | | | | | |
| (E-8) | | | | | | | |
| Total | 100 | 100 | 100 | 100 | 100 | 100 | 100 |

TABLE 11

| Other additives | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| (G-1) | 0.1 | 0.1 | 0.1 | 0.1 | 0.01 | 0.01 | | | |
| (G-2) | | | | | | 0.01 | 0.1 | 0.1 | 0.1 |
| (G-3) | | | | | | | | | |
| (G-4) | | | | | | | | | |

TABLE 12

| Other additives | Ex. 10 | Ex. 11 | Ex. 12 | Ex. 13 | Ex. 14 | Ex. 15 | Ex. 16 | Ex. 17 | Ex. 18 |
|---|---|---|---|---|---|---|---|---|---|
| (G-1) | | | | | | | | | |
| (G-2) | 0.1 | 0.1 | 0.05 | | 0.01 | 0.01 | 0.01 | 0.01 | 0.01 |
| (G-3) | | | 0.01 | | 0.01 | 0.01 | 0.01 | 0.01 | 0.01 |
| (G-4) | | | | 0.1 | | | | | |

TABLE 13

| Other additives | Ex. 19 | Ex. 20 | Ex. 21 | Ex. 22 | Ex. 23 | Ex. 24 | Ex. 25 | Ex. 26 | Ex. 27 |
|---|---|---|---|---|---|---|---|---|---|
| (G-1) | 0.1 | 0.1 | | | | | | | |
| (G-2) | | | 0.1 | | | | | | |
| (G-3) | | | | 0.1 | | | | | |
| (G-4) | | | | | 0.2 | 0.2 | 0.2 | 0.2 | 0.2 |

TABLE 14

| Other additives | Ex. 28 | Ex. 29 | Ex. 30 | Ex. 31 | Ex. 32 | Ex. 33 | Ex. 34 | Ex. 35 | Ex. 36 |
|---|---|---|---|---|---|---|---|---|---|
| (G-1) | | | | 0.1 | 0.1 | 0.1 | 0.1 | 0.01 | 0.01 |
| (G-2) | | | | | | | | | 0.01 |
| (G-3) | | | | | | | | | |
| (G-4) | 0.2 | 0.2 | 0.2 | | | | | | |

TABLE 15

| Other additives | Ex. 37 | Ex. 38 | Ex. 39 | Ex. 40 | Ex. 41 | Ex. 42 | Ex. 43 | Ex. 44 | Ex. 45 |
|---|---|---|---|---|---|---|---|---|---|
| (G-1) | | | | | | | | | |
| (G-2) | 0.1 | 0.1 | 0.1 | 0.1 | 0.1 | 0.05 | | 0.01 | 0.01 |
| (G-3) | | | | | | | 0.01 | | 0.01 |
| (G-4) | | | | | | | 0.1 | | |

TABLE 16

| Other additives | Addition amount (parts by weight) | | | | | | |
|---|---|---|---|---|---|---|---|
| | Ex. 46 | Ex. 47 | Ex. 48 | Comp. Ex. 1 | Comp. Ex. 2 | Comp. Ex. 3 | Comp. Ex. 4 |
| (G-1) | | | | 0.5 | 0.5 | | |
| (G-2) | 0.01 | 0.01 | 0.01 | | | 0.1 | 0.1 |
| (G-3) | 0.01 | 0.01 | 0.01 | | | 0.1 | 0.1 |
| (G-4) | | | | | | | |

TABLE 17

| Other additives | Addition amount (parts by weight) | | | | | | | | |
|---|---|---|---|---|---|---|---|---|---|
| | Ex. 49 | Ex. 50 | Ex. 51 | Ex. 52 | Ex. 53 | Ex. 54 | Ex. 55 | Ex. 56 | Ex. 57 |
| (G-1) | 0.2 | 0.2 | 0.2 | 0.2 | 0.1 | 0.1 | 0.1 | | |
| (G-2) | | | | | | | | 0.2 | 0.1 |
| (G-3) | | | | | | | | | 0.1 |
| (G-4) | | | | | | | | | |

TABLE 18

| Other additives | Addition amount (parts by weight) | | | | | | | | |
|---|---|---|---|---|---|---|---|---|---|
| | Ex. 58 | Ex. 59 | Ex. 60 | Ex. 61 | Ex. 62 | Ex. 63 | Ex. 64 | Ex. 65 | Ex. 66 |
| (G-1) | | | 0.1 | | | | | | |
| (G-2) | 0.1 | 0.05 | | | | | | | |
| (G-3) | 0.1 | 0.05 | | | | | | | |
| (G-4) | | | | 0.1 | 0.1 | 0.1 | 0.2 | 0.1 | 0.3 |

TABLE 19

| Other additives | Addition amount (parts by weight) | | | | | | | | |
|---|---|---|---|---|---|---|---|---|---|
| | Ex. 67 | Ex. 68 | Ex. 69 | Ex. 70 | Ex. 71 | Ex. 72 | Ex. 73 | Ex. 74 | Ex. 75 |
| (G-1) | | 0.2 | 0.2 | 0.2 | 0.2 | 0.1 | 0.1 | 0.1 | |
| (G-2) | | | | | | | | | 0.2 |
| (G-3) | | | | | | | | | |
| (G-4) | 0.2 | | | | | | | | |

TABLE 20

| Other additives | Addition amount (parts by weight) | | | | | | |
|---|---|---|---|---|---|---|---|
| | Ex. 76 | Ex. 77 | Ex. 78 | Comp. Ex. 5 | Comp. Ex. 6 | Comp. Ex. 7 | Comp. Ex. 8 |
| (G-1) | | | | 0.2 | 0.1 | 0.2 | 0.1 |
| (G-2) | 0.1 | 0.1 | 0.05 | | | | |
| (G-3) | 0.1 | 0.1 | 0.05 | | | | |
| (G-4) | | | | | | | |

On PET subjected to a rubbing treatment, an application liquid of each polymerizable composition was applied at room temperature using a bar coater #4, and then dried at 80° C. for 2 minutes. After that, the resultant was allowed to stand at room temperature for 2 minutes and then irradiated with UV (500 mJ/cm$^2$). The resulting film was evaluated for the alignment defects by observation with a polarization microscope. The applied film was divided into 100 squares in total of 10 squares in vertical direction×10 squares in horizontal direction, and the number of squares in which an alignment defect occurred was counted. A lower value means less alignment defects. The results are shown in the following tables.

TABLE 21

| | Alignment defects |
|---|---|
| Example 1 | 2 |
| Example 2 | 2 |
| Example 3 | 2 |
| Example 4 | 0 |
| Example 5 | 0 |
| Example 6 | 1 |
| Example 7 | 0 |
| Example 8 | 1 |
| Example 9 | 0 |
| Example 10 | 0 |
| Example 11 | 0 |
| Example 12 | 0 |
| Example 13 | 0 |
| Example 14 | 2 |
| Example 15 | 0 |
| Example 16 | 2 |
| Example 17 | 3 |

TABLE 22

| | Alignment defects |
|---|---|
| Example 18 | 3 |
| Example 19 | 2 |
| Example 20 | 2 |
| Example 21 | 2 |
| Example 22 | 2 |
| Example 23 | 3 |
| Example 24 | 3 |
| Example 25 | 3 |
| Example 26 | 4 |
| Example 27 | 4 |
| Example 28 | 3 |
| Example 29 | 4 |
| Example 30 | 3 |
| Example 31 | 2 |
| Example 32 | 2 |
| Example 33 | 2 |
| Example 34 | 0 |

TABLE 23

| | Alignment defects |
|---|---|
| Example 35 | 0 |
| Example 36 | 1 |
| Example 37 | 0 |
| Example 38 | 1 |
| Example 39 | 0 |
| Example 40 | 0 |
| Example 41 | 0 |
| Example 42 | 0 |
| Example 43 | 0 |
| Example 44 | 2 |
| Example 45 | 0 |
| Example 46 | 2 |
| Example 47 | 3 |
| Example 48 | 3 |
| Comparative Example 1 | 12 |
| Comparative Example 2 | 10 |
| Comparative Example 3 | 15 |
| Comparative Example 4 | 11 |

TABLE 24

| | Alignment defects |
|---|---|
| Example 49 | 1 |
| Example 50 | 0 |
| Example 51 | 0 |
| Example 52 | 0 |
| Example 53 | 1 |
| Example 54 | 1 |
| Example 55 | 1 |
| Example 56 | 1 |
| Example 57 | 1 |
| Example 58 | 1 |
| Example 59 | 1 |
| Example 60 | 3 |

TABLE 25

| | Alignment defects |
|---|---|
| Example 61 | 3 |
| Example 62 | 3 |
| Example 63 | 3 |
| Example 64 | 3 |
| Example 65 | 3 |
| Example 66 | 4 |
| Example 67 | 4 |
| Example 68 | 1 |
| Example 69 | 0 |
| Example 70 | 0 |
| Example 71 | 0 |
| Example 72 | 1 |

TABLE 26

| | Alignment defects |
|---|---|
| Example 73 | 1 |
| Example 74 | 1 |
| Example 75 | 1 |
| Example 76 | 1 |
| Example 77 | 1 |
| Example 78 | 1 |
| Comparative Example 5 | 15 |
| Comparative Example 6 | 10 |
| Comparative Example 7 | 12 |
| Comparative Example 8 | 9 |

It can be seen from the table that the optical films of the present invention have less alignment defects as compared with the optical films of Comparative Examples. Next, each optical film was subjected to a heat treatment at 120° C. for 5 hours. For the optical films having cholesteric alignment produced in Examples 1 to 48 and Comparative Examples 1 to 4, the absolute value of variation in the central value of the selective reflection wavelength before and after the heat treatment was measured. In addition, for the optical films having homogeneous alignment produced in Examples 49 to 78 and Comparative Examples 5 to 8, the absolute value of variation in the phase difference Re before and after the heat treatment was measured. The results are shown in the following tables.

TABLE 27

| | Optical film to be evaluated | Variation in selective reflection wavelength (nm) |
|---|---|---|
| Example 79 | Optical film produced in Example 1 | 0.2 |
| Example 80 | Optical film produced in Example 2 | 0.2 |
| Example 81 | Optical film produced in Example 3 | 0.2 |
| Example 82 | Optical film produced in Example 4 | 0.1 |
| Example 83 | Optical film produced in Example 5 | 0.2 |
| Example 84 | Optical film produced in Example 6 | 0.2 |
| Example 85 | Optical film produced in Example 7 | 0.2 |
| Example 86 | Optical film produced in Example 8 | 0.1 |
| Example 87 | Optical film produced in Example 9 | 0.2 |
| Example 88 | Optical film produced in Example 10 | 0.1 |
| Example 89 | Optical film produced in Example 11 | 0.2 |
| Example 90 | Optical film produced in Example 12 | 0.0 |
| Example 91 | Optical film produced in Example 13 | 0.2 |
| Example 92 | Optical film produced in Example 14 | 0.2 |
| Example 93 | Optical film produced in Example 15 | 0.1 |
| Example 94 | Optical film produced in Example 16 | 0.1 |
| Example 95 | Optical film produced in Example 17 | 0.1 |

TABLE 28

| Optical film to be evaluated | | Variation in selective reflection wavelength (nm) |
|---|---|---|
| Example 96 | Optical film produced in Example 18 | 0.1 |
| Example 97 | Optical film produced in Example 19 | 0.3 |
| Example 98 | Optical film produced in Example 20 | 0.3 |
| Example 99 | Optical film produced in Example 21 | 0.3 |
| Example 100 | Optical film produced in Example 22 | 0.3 |
| Example 101 | Optical film produced in Example 23 | 0.5 |
| Example 102 | Optical film produced in Example 24 | 0.5 |
| Example 103 | Optical film produced in Example 25 | 0.5 |
| Example 104 | Optical film produced in Example 26 | 0.4 |
| Example 105 | Optical film produced in Example 27 | 0.4 |
| Example 106 | Optical film produced in Example 28 | 0.5 |
| Example 107 | Optical film produced in Example 29 | 0.5 |
| Example 108 | Optical film produced in Example 30 | 0.4 |
| Example 109 | Optical film produced in Example 31 | 0.2 |
| Example 110 | Optical film produced in Example 32 | 0.2 |
| Example 111 | Optical film produced in Example 33 | 0.2 |
| Example 112 | Optical film produced in Example 34 | 0.1 |

TABLE 29

| Optical film to be evaluated | | Variation in selective reflection wavelength (nm) |
|---|---|---|
| Example 113 | Optical film produced in Example 35 | 0.2 |
| Example 114 | Optical film produced in Example 36 | 0.2 |
| Example 115 | Optical film produced in Example 37 | 0.2 |
| Example 116 | Optical film produced in Example 38 | 0.1 |
| Example 117 | Optical film produced in Example 39 | 0.2 |
| Example 118 | Optical film produced in Example 40 | 0.1 |
| Example 119 | Optical film produced in Example 41 | 0.2 |
| Example 120 | Optical film produced in Example 42 | 0.2 |
| Example 121 | Optical film produced in Example 43 | 0.2 |
| Example 122 | Optical film produced in Example 44 | 0.2 |
| Example 123 | Optical film produced in Example 45 | 0.1 |
| Example 124 | Optical film produced in Example 46 | 0.1 |
| Example 125 | Optical film produced in Example 47 | 0.1 |
| Example 126 | Optical film produced in Example 48 | 0.1 |
| Comparative Example 9 | Optical film produced in Comparative Example 1 | 2.0 |
| Comparative Example 10 | Optical film produced in Comparative Example 2 | 1.9 |
| Comparative Example 11 | Optical film produced in Comparative Example 3 | 2.1 |
| Comparative Example 12 | Optical film produced in Comparative Example 4 | 2.0 |

TABLE 30

| Optical film to be evaluated | | Variation in phase difference (nm) |
|---|---|---|
| Example 127 | Optical film produced in Example 49 | 0.2 |
| Example 128 | Optical film produced in Example 50 | 0.1 |
| Example 129 | Optical film produced in Example 51 | 0.1 |
| Example 130 | Optical film produced in Example 52 | 0.1 |
| Example 131 | Optical film produced in Example 53 | 0.1 |
| Example 132 | Optical film produced in Example 54 | 0.1 |
| Example 133 | Optical film produced in Example 55 | 0.1 |
| Example 134 | Optical film produced in Example 56 | 0.1 |
| Example 135 | Optical film produced in Example 57 | 0.2 |
| Example 136 | Optical film produced in Example 58 | 0.2 |
| Example 137 | Optical film produced in Example 59 | 0.2 |
| Example 138 | Optical film produced in Example 60 | 0.3 |

TABLE 31

| Optical film to be evaluated | | Variation in phase difference (nm) |
|---|---|---|
| Example 139 | Optical film produced in Example 61 | 0.3 |
| Example 140 | Optical film produced in Example 62 | 0.4 |
| Example 141 | Optical film produced in Example 63 | 0.4 |
| Example 142 | Optical film produced in Example 64 | 0.4 |
| Example 143 | Optical film produced in Example 65 | 0.4 |
| Example 144 | Optical film produced in Example 66 | 0.4 |
| Example 145 | Optical film produced in Example 67 | 0.4 |
| Example 146 | Optical film produced in Example 68 | 0.2 |
| Example 147 | Optical film produced in Example 69 | 0.1 |
| Example 148 | Optical film produced in Example 70 | 0.1 |
| Example 149 | Optical film produced in Example 71 | 0.1 |
| Example 150 | Optical film produced in Example 72 | 0.1 |

TABLE 32

| Optical film to be evaluated | | Variation in phase difference (nm) |
|---|---|---|
| Example 151 | Optical film produced in Example 73 | 0.1 |
| Example 152 | Optical film produced in Example 74 | 0.1 |
| Example 153 | Optical film produced in Example 75 | 0.1 |
| Example 154 | Optical film produced in Example 76 | 0.2 |
| Example 155 | Optical film produced in Example 77 | 0.2 |
| Example 156 | Optical film produced in Example 78 | 0.2 |
| Comparative Example 13 | Optical film produced in Comparative Example 5 | 2.5 |
| Comparative Example 14 | Optical film produced in Comparative Example 6 | 2.3 |
| Comparative Example 15 | Optical film produced in Comparative Example 7 | 2.1 |
| Comparative Example 16 | Optical film produced in Comparative Example 8 | 2.0 |

It can be seen from the tables that the optical films of the present invention show smaller variation in the selective reflection wavelength and smaller variation in the phase difference after the heat treatment as compared with the optical films of Comparative Examples. As be seen in the above results, the optical film of the present invention has less alignment defects and is less liable to vary in the optical characteristics when placed in a high temperature state, and therefore is useful as a phase difference film, a selective reflection film, and the like in the display device application.

The invention claimed is:

1. An optical film,
which comprises a structural unit derived from a compound represented by the following general formula (I-A-111), a structural unit derived from a compound represented by the following general formula (I-A-221), a structural unit derived from a compound represented by the following general formula (I-A-121), and a structural unit derived from a compound represented by the following general formula (I-A-211):

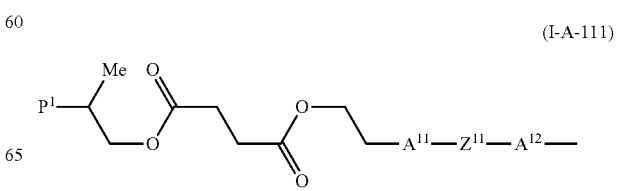

(I-A-111)

-continued

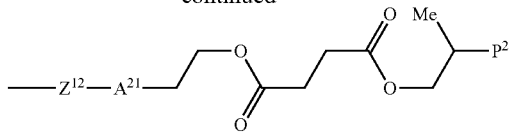

wherein $P^1$ and $P^2$ respectively represent a group selected from the formulae (P-1) to (P-3):

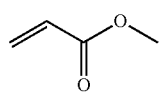
(P-1)

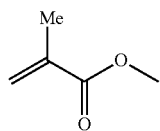
(P-2)

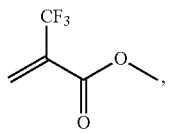
(P-3)

and $A^{11}$, $A^{12}$, and $A^{21}$ each independently represent a 1,4-phenylene group or a 1,4-cyclohexylene group, wherein the group may be unsubstituted or substituted with one or more substituents L's, and L represents a fluorine atom, a chlorine atom, a bromine atom, an iodine atom, a pentafluorosulfuranyl group, a nitro group, a cyano group, an isocyano group, an amino group, a hydroxyl group, a mercapto group, a methylamino group, a dimethylamino group, a diethylamino group, a diisopropylamino group, a trimethylsilyl group, a dimethylsilyl group, a thioisocyano group, or a linear or branched alkyl group having 1 to 20 carbon atoms in which one —$CH_2$— group or two or more —$CH_2$— groups that are not adjacent to each other each may be independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and one or more of arbitrary hydrogen atoms in the alkyl group may be substituted by a fluorine atom, or L represents a group represented by the following formula (I-RL):

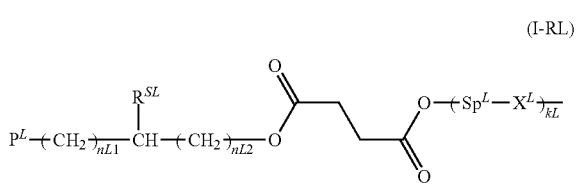
(I-RL)

wherein, $P^L$ represents a group selected from the above formulae (P-1) to (P-3), $R^{SL}$ represents a linear or branched alkyl group having 1 to 20 carbon atoms in which one —$CH_2$— group or two or more —$CH_2$— groups that are not adjacent to each other each may be independently substituted by —O—, —S—, —CO—, —COO—, —OCO—, —CO—S—, —S—CO—, —O—CO—O—, —CO—NH—, —NH—CO—, —CH=CH—COO—, —CH=CH—OCO—, —COO—CH=CH—, —OCO—CH=CH—, —CH=CH—, —CF=CF—, or —C≡C—, and one or more of arbitrary hydrogen atoms in the alkyl group may be substituted by a fluorine atom or a chlorine atom, $Sp^L$ represents an alkylene group having 1 to 20 carbon atoms, wherein plural $Sp^L$ groups, if present, may be the same or different, $X^L$ represents —O—, —S—, —$OCH_2$—, —$CH_2O$—, —CO—, —COO—, —OCO—, —CO—S—, —S—CO—, —O—CO—O—, —CO—NH—, —NH—CO—, —$SCH_2$—, —$CH_2S$—, —$CF_2O$—, —$OCF_2$—, —$CF_2S$—, —$SCF_2$—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, —COO—$CH_2$—, —OCO—$CH_2$—, —$CH_2$—COO—, —$CH_2$—OCO—, —CH=CH—, —CH=N—N=CH—, —CF=CF—, —C≡C—, or a single bond, wherein plural $X^L$ groups, if present, may be the same or different, kL represents an integer of 0 to 10, and nL1 and nL2 each independently represent an integer of 0 to 8), wherein plural L groups, if present in the compound, may be the same or different, and $Z^{11}$ and $Z^{12}$ each independently represent —$OCH_2$—, —$CH_2O$—, —$CH_2CH_2$—, —COO—, —OCO—, —CO—NH—, —NH—CO—, —CH=CH—COO—, —CH=CH—OCO—, —COO—CH=CH—, —OCO—CH=CH—, —COO—$CH_2CH_2$—, —OCO—$CH_2CH_2$—, —$CH_2CH_2$—COO—, —$CH_2CH_2$—OCO—, or a single bond;

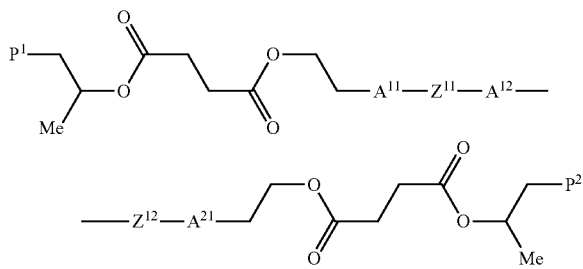
(I-A-221)

wherein $P^1$ and $P^2$ respectively represent the same meanings as in $P^1$ and $P^2$ in the general formula (I-A-111), and $A^{11}$, $A^{12}$, $A^{21}$, $Z^{11}$, and $Z^{12}$ respectively represent the same meanings as in $A^{11}$, $A^{12}$, $Z^{11}$, and $Z^{12}$ in the general formula (I-A-111);

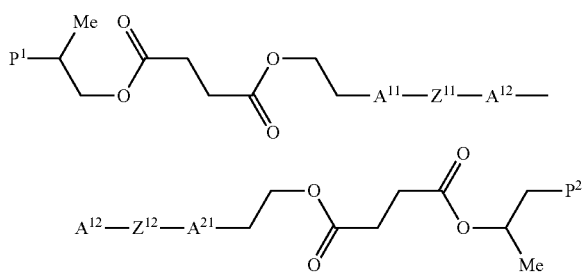
(I-A-121)

wherein $P^1$ and $P^2$ respectively represent the same meanings as in $P^1$ and $P^2$ the general formula (I-A-111), and $A^{11}$, $A^{12}$ and $Z^{12}$ respectively represent the same meanings as in $A^{11}$, $A^{12}$, $A^{21}$, $Z^{11}$, and $Z^{12}$ in the general formula (I-A-111); and (I-A-211)

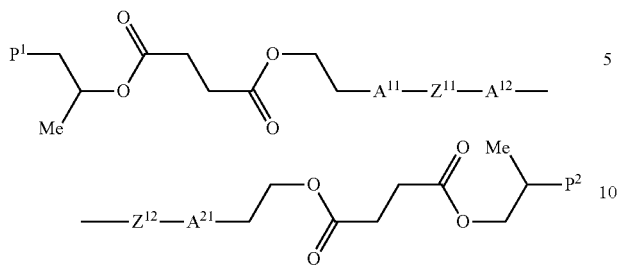

wherein P¹ and P² respectively represent the same meanings as in P¹ and P² in the general formula (I-A-111), and A¹¹, A¹², A²¹, Z¹¹, and Z¹² respectively represent the same meanings as in A¹¹, A¹², A²¹, Z¹¹, and Z¹² in the general formula (I-A-111).

2. The optical film according to claim 1, which further comprises a structural unit derived from a compound represented by the following general formula (II):

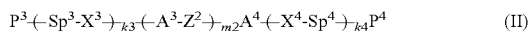

$$P^3\text{-}(\text{-}Sp^3\text{-}X^3\text{-})_{k3}\text{-}(\text{-}A^3\text{-}Z^2\text{-})_{m2}A^4\text{-}(\text{-}X^4\text{-}Sp^4\text{-})_{k4}P^4 \quad (II)$$

wherein P³ and P⁴ each independently represent a group which undergoes polymerization by radical polymerization, cation polymerization, or anion polymerization, Sp³ and Sp⁴ each independently represent a spacer group, wherein plural Sp³ groups, if present, may be the same or different, and plural Sp⁴ groups, if present, may be the same or different, X³ and X⁴ each independently represent —O—, —S—, —OCH₂—, —CH₂O—, —CO—, —COO—, —OCO—, —CO—S—, —S—CO—, —O—CO—O—, —CO—NH—, —NH—CO—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—N=CH—, —CF=CF—, —C≡C—, or a single bond, wherein plural X³ groups, if present, may be the same or different, and plural X⁴ groups, if present, may be the same or different, k3 and k4 each independently represent an integer of 0 to 10, A³ and A⁴ each independently represent a 1,4-phenylene group, a 1,4-cyclohexylene group, a bicyclo[2.2.2]octane-1,4-diyl group, a pyridine-2,5-diyl group, a pyrimidine-2,5-diyl group, a naphthalene-2,6-diyl group, a naphthalene-1,4-diyl group, a tetrahydronaphthalene-2,6-diyl group, a decahydronaphthalene-2,6-diyl group, or a 1,3-dioxane-2,5-diyl group, which may be unsubstituted or substituted with one or more substituents Us, wherein plural A³ groups, if present, may be the same or different, Z² represents —O—, —S—, —OCH₂—, —CH₂O—, —CH₂CH₂—, —CO—, —COO—, —OCO—, —CO—S—, —S—CO—, —O—CO—O—, —CO—NH—, —NH—CO—, —OCO—NH—, —NH—COO—, —NH—CO—NH—, —NH—O—, —O—NH—, —SCH₂—, —CH₂S—, —CF₂O—, —OCF₂—, —CF₂S—, —SCF₂—, —CH=CH—COO—, —CH=CH—OCO—, —COO—CH=CH—, —OCO—CH=CH—, —COO—CH₂CH₂—, —OCO—CH₂CH₂—, —CH₂CH₂—COO—, —CH₂CH₂—OCO—, —COO—CH₂—, —OCO—CH₂—, —CH₂—COO—, —CH₂—OCO—, —CH=CH—, —N=N—, —CH=N—, —N=CH—, —CH=N—N=CH—, —CF=CF—, —C≡C—, or a single bond, wherein plural Z² groups, if present, may be the same or different, and m2 represents an integer of 0 to 5.

3. The optical film according to claim 1, which further comprises a structural unit derived from a chiral compound.

4. The optical film according to claim 1, which has a cholesteric structure.

5. A compound, which is represented by the general formula (I-A-111), the general formula (I-A-221), the general formula (I-A-121), or the general formula (I-A-211) as set forth in claim 1.

6. A laminate film, comprising the optical film as set forth in claim 1.

7. A display device, comprising the optical film as set forth in claim 1.

8. A display device, comprising the laminate film as set forth in claim 6.

* * * * *